US012293422B2

(12) United States Patent
Fukata et al.

(10) Patent No.: US 12,293,422 B2
(45) Date of Patent: May 6, 2025

(54) INFORMATION PROCESSING DEVICE, INFORMATION PROCESSING METHOD, AND PROGRAM

(71) Applicant: SONY GROUP CORPORATION, Tokyo (JP)

(72) Inventors: Yoko Fukata, Tokyo (JP); Hiroyuki Kobayashi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 289 days.

(21) Appl. No.: 17/775,870

(22) PCT Filed: Oct. 28, 2020

(86) PCT No.: PCT/JP2020/040522
§ 371 (c)(1),
(2) Date: May 10, 2022

(87) PCT Pub. No.: WO2021/100430
PCT Pub. Date: May 27, 2021

(65) Prior Publication Data
US 2022/0405863 A1    Dec. 22, 2022

(30) Foreign Application Priority Data
Nov. 18, 2019    (JP) .................................. 2019-208267

(51) Int. Cl.
*G06T 7/11*    (2017.01)
*A01G 7/00*    (2006.01)
(Continued)

(52) U.S. Cl.
CPC ............... *G06Q 50/02* (2013.01); *A01G 7/00* (2013.01); *G06T 7/11* (2017.01); *G06V 10/443* (2022.01); *G06V 10/761* (2022.01)

(58) Field of Classification Search
CPC .. G06Q 50/02; A01G 7/00; G06T 7/11; G06T 11/206; G06V 10/443; G06V 10/761; G06V 20/17; G06V 20/188; A01C 21/005
(Continued)

(56) References Cited

U.S. PATENT DOCUMENTS

2013/0174040 A1* 7/2013 Johnson ................. G06Q 50/02
715/733
2014/0089045 A1   3/2014 Johnson
(Continued)

FOREIGN PATENT DOCUMENTS

CN    109564155 A    4/2019
EP    3502663 A1     6/2019
(Continued)

OTHER PUBLICATIONS

International Search Report and Written Opinion of PCT Application No. PCT/JP2020/040522, issued on Feb. 2, 2021, 09 pages of ISRWO.

*Primary Examiner* — Stephen P Coleman
(74) *Attorney, Agent, or Firm* — CHIP LAW GROUP

(57) ABSTRACT

An information processing device calculates a rate related to growth of a plant from sensing data, and performs control to display a sample position image arranged according to a sensing position of each piece of the sensing data in a map region of a user interface screen in an image mode determined according to a rate calculated from each piece of the sensing data.

20 Claims, 37 Drawing Sheets

(51) Int. Cl.
  *G06Q 50/02*   (2012.01)
  *G06V 10/44*   (2022.01)
  *G06V 10/74*   (2022.01)

(58) Field of Classification Search
  USPC .......................................................... 382/110
  See application file for complete search history.

(56) References Cited

U.S. PATENT DOCUMENTS

2014/0095261 A1* 4/2014 Johnson ................. G06Q 50/02
                                                            705/7.34
2015/0278640 A1* 10/2015 Johnson ............... G06V 20/188
                                                            382/110
2019/0310184 A1* 10/2019 Otani ..................... G01N 21/35

FOREIGN PATENT DOCUMENTS

| JP | 5162890 B2 | 3/2013 |
| WO | 2016/035149 A1 | 3/2016 |
| WO | 2018/034166 A1 | 2/2018 |
| WO | WO-2018081759 A1 | 5/2018 |
| WO | 2019/107179 A1 | 6/2019 |

* cited by examiner

INFORMATION PROCESSING DEVICE, INFORMATION PROCESSING METHOD, AND PROGRAM

CROSS REFERENCE TO RELATED APPLICATIONS

This application is a U.S. National Phase of International Patent Application No. PCT/JP2020/040522 filed on Oct. 28, 2020, which claims priority benefit of Japanese Patent Application No. JP 2019-208267 filed in the Japan Patent Office on Nov. 18, 2019. Each of the above-referenced applications is hereby incorporated herein by reference in its entirety.

TECHNICAL FIELD

The present technology relates to an information processing device, an information processing method, and a program, and particularly relates to a technology of presenting information suitable for management of a farm field.

BACKGROUND ART

In recent years, automatic planting of crops has been performed due to enlargement of farms. In the automatic planting, it is very important to check whether a crop has been planted correctly or whether the crop has grown as expected. In a case where there is a position where the crop is not planted or grown as expected, the staff of the farm also has to determine whether or not to replant the crop. Replanting means that replanting (sowing or the like again) is performed at a place where the planting has already been performed.

On the other hand, with development of an image capturing technique from the sky by a camera or the like mounted on a flying object such as a drone, attempts have been made to simplify and automate work by eliminating work of patrolling farmlands by human in a large-scale farm. Detection of a defect in the planting described above is also automated by such aerial image capturing technology.

Patent Document 1 discloses a technique for capturing an image of a farm field and performing remote sensing of a vegetation state.

CITATION LIST

Patent Document

Patent Document 1: Japanese Patent No. 5162890

SUMMARY OF THE INVENTION

Problems to be Solved by the Invention

Incidentally, while it is possible to check defects in planting from a captured image, in practice, there is a difference in degree at each position even though it is said to be a defect, and it is not necessary to replant the crop at all positions. Furthermore, it is needless to say that costs are required for replanting, and for example, even if the number of germinated seeds is slightly smaller than the planned number, it may be better to grow the seeds as it is without replanting. Of course, it may be better to perform the replanting even if the cost is increased.

Furthermore, there is a demand for early determination of replanting. This is because, when considering convenience at the time of harvesting, it is desired to harvest the crop together without causing a significant difference in the growth of the crop between an already germinated part and a part for which the replanting is performed.

In view of the above, the present disclosure proposes a technique for presenting appropriate information for quick replant determination.

Solutions to Problems

An information processing device according to the present technology includes a calculation unit that calculates a rate related to growth of a plant from sensing data, and a user interface control unit that performs control to display a sample position image arranged according to a sensing position of each piece of the sensing data in a map region of a user interface screen in an image mode determined according to a rate calculated from each piece of the sensing data.

The sensing data is, for example, various data sensed with respect to a farm field. Examples thereof include image data obtained by capturing an image of a farm field, and data from sensors such as a thermo-sensor and an ultrasonic sensor, or the like. The farm field widely includes farm lands where cultivation of farm crops is performed, such as a cultivation land, a cropland, a hydroponic field, a house cultivation land, and the like of crops.

The rate related to growth of a plant is widely rate information regarding growth of a plant, and is, for example, a ratio of normally growing crops such as a ratio of crops germinated after planting. The term "crop" refers to a crop artificially intended for harvest, but the term "plant" as used herein includes, for example, trees of fruits, weeds, and the like besides the crop.

The sample position image is an image for displaying a user interface indicating a position where an image of image data of a sample is captured on a map image or a position where an image is captured in the farm field. The sample position image is displayed in the image mode according to the rate. The image mode refers to elements constituting the sample position image such as color, luminance, shape, and contour line. Furthermore, the sample position image as an image displayed in the user interface may be an image of a text or a numerical value, an image of only a color, or an image of any other form.

In the above-described information processing device according to the present technology, it is conceivable that the sensing data is image data obtained by capturing an image of a farm field, and the rate is a ratio between a number of crops per unit area obtained from the image data and a number of planting instructions per unit area with respect to an image capturing region of the image data.

In a case of planting in the farm field, information (number of planting instructions) giving an instruction on the number of plantings such as seeds, stocks, or seedlings of crops per acre, for example, is given to a tractor for each place in the farm field where planting is performed, so as to execute planting. A ratio of the number of crops per unit area calculated on the basis of image data after actual germination or growth with respect to such a number of planting instructions is set as a rate related to the growth of crops.

In the above-described information processing device according to the present technology, it is conceivable that the sensing data is image data obtained by capturing an image of a farm field, and the rate is a ratio between a number of crops per unit area obtained from the image data and an actual result number of plantings per unit area with respect to an image capturing region of the image data.

A ratio of the number of crops per unit area calculated on the basis of image data with respect to the actual number of plantings performed with the tractor is set as a rate related to the growth of crops.

In the above-described information processing device according to the present technology, it is conceivable that the sensing data is image data obtained by capturing an image of a farm field, and whether the rate is a ratio between a number of crops per unit area obtained from the image data and a number of planting instructions per unit area with respect to an image capturing region of the image data or a ratio between a number of crops per unit area obtained from the image data and an actual result number of plantings per unit area with respect to an image capturing region of the image data can be selected.

That is, it is made possible to select whether a reference value for the rate as the germination rate is the number of planting instructions to the tractor or the actual result number of plantings by the tractor.

In the above-described information processing device according to the present technology, it is conceivable that the user interface control unit performs control to display, in the map region, a rate map image that presents differences in values used for calculating the rate in a farm field together with the sample position image.

For example, the number of planting instructions to the tractor, which is a reference value for the rate, or the actual result number of plantings may be different for each place of the farm field. The rate map image as an image to be displayed on the user interface is displayed together with the sample position image. The rate map image is also an image displayed as a user interface, and may be an image of a text or a numerical value, an image of only a color, or an image of any other form.

In the above-described information processing device according to the present technology, it is conceivable that the user interface control unit performs control to display an area definition image that defines areas obtained by dividing a farm field in the map region.

As the area definition image, for example, an image such as a grid pattern in a lattice shape is displayed in a map region so that the user can recognize a definition of each area obtained by dividing the farm field.

In the above-described information processing device according to the present technology, it is conceivable that the user interface control unit performs control to display each area indicated by the area definition image in an image mode determined according to a rate calculated for the area.

Each area defined by the area definition image is displayed in the image mode according to the rate. In this case, the image mode refers to elements constituting the area definition image such as a grid pattern, such as color, luminance, and contour lines.

In the above-described information processing device according to the present technology, it is conceivable that the calculation unit calculates a rate of the each area indicated by the area definition image by interpolation calculation using a rate related to growth of a crop for sensing data related to the area.

The rate of each area defined by the area definition image is, for example, calculated using a rate for sensing data such as related image data, such as those obtained by capturing an image of the vicinity of a center point of the area.

In the above-described information processing device according to the present technology, it is conceivable that sensing data related to one area that refers to the rate related to growth of the crop in the interpolation calculation is sensing data obtained by sensing within a predetermined distance from a center point of the one area.

For example, the rate of the area is calculated by an interpolation calculation using a rate for image data obtained by capturing an image of an area within a predetermined distance from the center point of the area.

In the above-described information processing device according to the present technology, it is conceivable that sensing data related to one area that refers to the rate related to growth of the crop in the interpolation calculation is a predetermined number of pieces of sensing data in an order in which an image capturing region is closer to a center point of the one area.

The rate of the area is calculated by interpolation calculation using the rate for a predetermined number of pieces of sensing data in the order in which the image capturing region is closer to the center point of the area.

In the above-described information processing device according to the present technology, it is conceivable that the calculation unit performs the interpolation calculation by weighting a rate for sensing data obtained by sensing a region having a same number of planting instructions or actual result number of plantings as one area among the sensing data related to the one area.

If there is related sensing data, for example, image data obtained by capturing an image of a region having the same number of planting instructions or actual result number of plantings as the area, interpolation calculation is performed by weighting the rate for the image data, and the rate of the area is calculated.

In the above-described information processing device according to the present technology, it is conceivable that the user interface control unit performs interface control for performing a setting operation of the area definition image.

For example, the user can designate the size of the area defined by the area definition image.

In the above-described information processing device according to the present technology, it is conceivable that the user interface control unit performs interface control to perform an operation of designating a replant candidate area for each area defined by the area definition image.

For example, the user can set an arbitrary area on the area definition image as a replant candidate.

In the above-described information processing device according to the present technology, it is conceivable that the user interface control unit performs interface control to perform an operation of designating a replant candidate area for each area defined by the area definition image, and performs control to present cost information regarding replanting in response to an operation of designating the replant candidate area.

For example, when the user sets an arbitrary area as the replant candidate area on the area definition image, cost presentation corresponding thereto is performed.

In the above-described information processing device according to the present technology, it is conceivable that the user interface control unit performs interface control to enable individual designation of each area defined by the area definition image as a replant candidate area.

For example, the user can designate an arbitrary area by clicking the arbitrary area on the area definition image.

In the above-described information processing device according to the present technology, it is conceivable that the user interface control unit performs interface control to enable designation of a plurality of areas as replant candidate areas by a range designation operation on the area definition image.

For example, when the user designates a range on the area definition image, a plurality of areas included in the range can be designated.

In the above-described information processing device according to the present technology, it is conceivable to further include a file generation unit that generates a replant instruction file in response to determination of a replant execution area in the area definition image.

For example, after the user sets an arbitrary area as a replant candidate on the area definition image, an instruction file for executing the replanting is generated in response to determination of an area for which the replanting is performed by a predetermined operation.

It is conceivable that the user interface control unit performs control to present a determination result as to whether or not to perform the replanting for each area indicated by the area definition image.

Whether or not the replanting is performed for each area defined by the area definition image is determined, and a determination result is indicated. For example, each area is displayed in an image mode according to the determination result. In this case, the image mode refers to elements constituting a grid image, such as color, luminance, and contour lines.

An information processing method according to the present technology includes calculating a rate related to growth of a plant from sensing data, and performing control to display a sample position image arranged according to a sensing position of each piece of the sensing data in a map region of a user interface screen in an image mode determined according to a rate calculated from each piece of the sensing data.

Thus, information suitable for replant determination is presented in the information processing device.

A program according to the present technology is a program that causes an information processing device to execute processes of the above method. Thus, it is easy to achieve an information processing device that performs information presentation suitable for replant determination.

MODE FOR CARRYING OUT THE INVENTION

Hereinafter, embodiments will be described in the following order.

<1. Configuration of sensing system>
<2. Configuration of information processing device>
<3. Work procedure>

<4. User interface screen>
<5. Preparation processing of embodiment>
<6. User interface processing of first embodiment>
<7. User interface processing of second embodiment>
<8. Summary and modification example>

Here, some terms used in the embodiment will be described.

A "stand" refers to each and every crop (plant) planted and germinated in the farm field.

A "stand number" or "stand count" is the number of stands measured from the image data.

A "population" refers to the number of stands obtained by converting the number of stands measured from image data into a number per unit area (for example, one acre). This population can also be regarded as a germination rate in a case of considering in a unit area.

A "stand rate" indicates the ratio of grown crops such as a germination rate per unit area and, in the present embodiment, is the ratio of the number of stands (population) per unit area to the number of planting instructions per unit area or the actual result number of plantings indicated in a rate map (instruction rate map or actual result rate map) described later. The stand rate can also be said to be a germination achievement rate.

1. Configuration of Sensing System

First, a sensing system according to an embodiment will be described.

Figure 1:
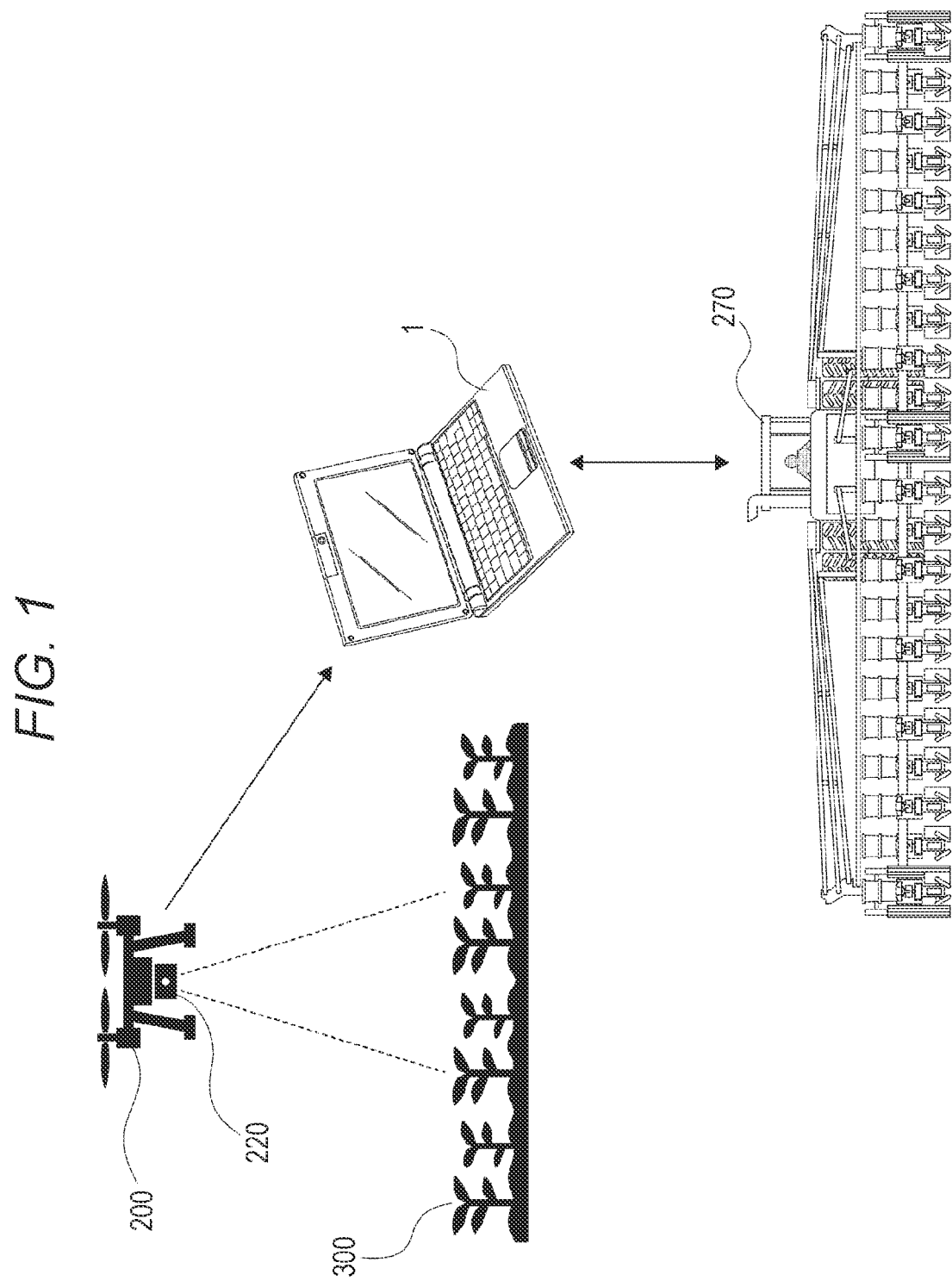
FIG. 1 is an explanatory diagram of a sensing system according to an embodiment of the present technology.

FIG. 1 illustrates an information processing device 1 constituting a sensing system and an imaging device 220 mounted on a small flying object 200 such as a drone for example. Furthermore, a tractor 270 for planting is also illustrated.

The flying object 200 can move above the farm field 300 by, for example, wireless control by an operator or automatic control or the like.

An imaging device 220 is set in the flying object 200, for example, so as to capture an image of the lower side. When the flying object 200 moves above the farm field 300 on a predetermined route, the imaging device 220 periodically captures still images, for example.

Note that the flying object 200 flies at a relatively low altitude (for example, at an altitude of about 10 m to 20 m), so that one captured image shows a part of the farm field 300.

By capturing still images at short time intervals, a stitching process of each captured image can be performed to obtain a composite image showing the entire farm field. However, in a case of sensing according to the present embodiment, such a process is not necessarily required, and for example, it is only required to capture an image of a discrete region in the farm field 300 as a sensing sample to obtain a plurality of pieces of image data.

Hereinafter, image data as a captured still image for each image will be referred to as a "sample".

As the imaging device 220 mounted on the flying object 200, a visible light image sensor (image sensor for capturing an image of visible light of Red (R), Green (G), and Blue (B)), a camera for capturing a near infrared (NIR) image, a multi-spectrum camera that captures an image of a plurality of wavelength bands, a hyperspectrum camera, a Fourier transform infrared spectroscopy (FTIR), an infrared sensor, and the like are assumed. Of course, a plurality of types of cameras (sensors) may be mounted on the flying object 200.

As the multi spectrum camera, for example, one that captures an NIR image and a red (R) image and can calculate a normalized difference vegetation index (NDVI) from the obtained image is also assumed to be used. The NDVI is a vegetation index indicating plant likeness, and can be used as an index indicating a distribution status and an activity degree of vegetation.

The NDVI can be obtained from the R image and the NIR image. That is, the value of NDVI is obtained as:

$$NDVI=(NIR-R)/(NIR+R)$$

Tag information is added to an image obtained by image capturing by the imaging device 220. The tag information includes image capturing date and time information, position information (latitude and longitude information) as global positioning system (GPS) data, information regarding the flight altitude of the flying object 200 at the time of image capturing, imaging device information (individual identification information, model information, and the like of the camera), information regarding each piece of image data (information such as image size, wavelength, and image capturing parameters), and the like.

Image data captured by the imaging device 220 attached to such a flying object 200 and the tag information are acquired by the information processing device 1.

For example, the image data and the tag information are transferred by wireless communication, network communication, or the like between the imaging device 220 and the information processing device 1. As the network, for example, the Internet, a home network, a local area network (LAN) or the like, a satellite communication network, and other various networks are assumed.

Alternatively, the image data and the tag information are delivered to the information processing device 1 in a mode such that a recording medium (for example, a memory card or the like) attached to the imaging device 220 is read by the information processing device 1 side.

The information processing device 1 uses the image data and the tag information to generate analysis information for the farm field 300 as a measurement target. Furthermore, processing of presenting the analysis result to the user as an image is performed.

Specifically, it is possible to perform counting of crops captured in the image data, and the like, generate information that can be used for management of the farm field 300, such as the number of crops, the number of crops per unit area, a germination rate, a predicted harvest amount, and a crop ratio for example, on the basis of the counting and the like, and present the information to the user.

Furthermore, the information processing device 1 also performs execution control of display of presenting the position of each sample (image data) and display of information regarding replanting on the map image including the farm field 300.

The information processing device 1 is achieved as, for example, a personal computer (PC), a field-programmable gate array (FPGA), or a terminal device such as a smartphone or a tablet.

Note that, in FIG. 1, the information processing device 1 is separated from the imaging device 220, but for example, an arithmetic device (a microcomputer or the like) to be the information processing device 1 may be provided in a unit including the imaging device 220.

In a case of the sensing system according to the present embodiment, for example, a position regarded as "row" in the farm field 300 is automatically determined on the image data, and crops planted on the basis of the determination are counted.

The row is a line in which a crop is planted, and for example, a ridge formed for seed planting in the farm field 300 is also a kind of the row. Furthermore, the row is not particularly limited to a row in which soil is raised like a ridge, and a line formed when seeds are sown on flat land is also a row. For example, a planting line formed when sowing is performed by a tractor (seeder) is called a row.

Figure 2:
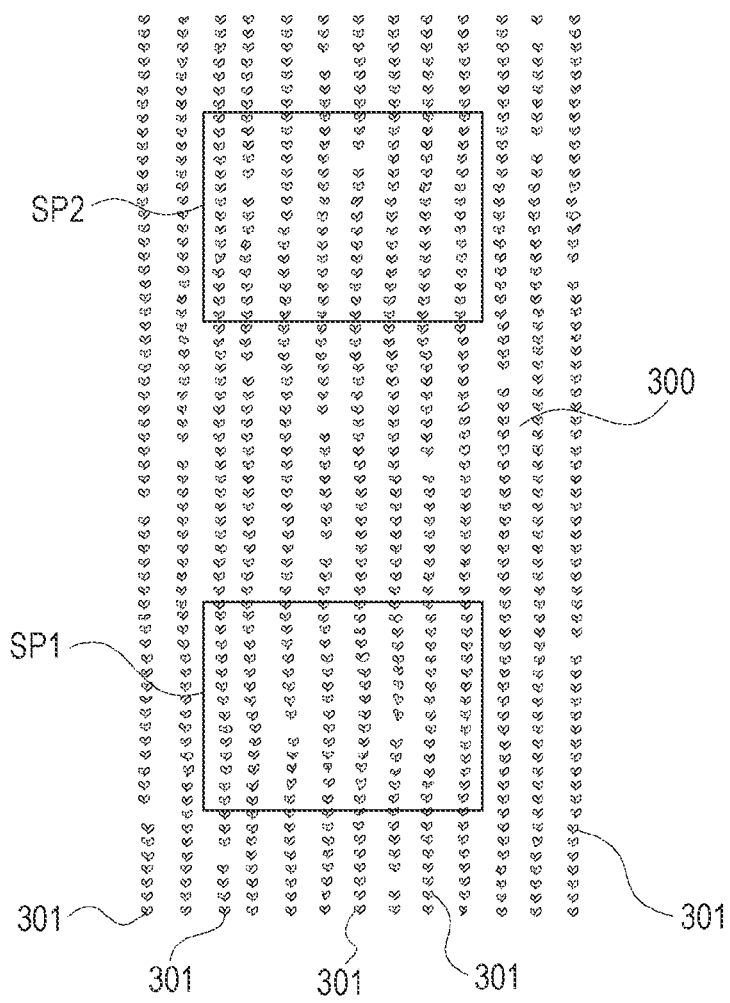
FIG. 2 is an explanatory diagram of rows and image capturing ranges in a farm field.

FIG. 2 schematically illustrates rows 301 formed in the farm field 300. For example, a line in which seeds germinate as the date elapses from the sowing and leaves of the crop are arranged as illustrated in the drawing becomes a row 301.

In a case of the present embodiment, the farm field 300 is imaged by the imaging device 220 while the flying object 200 is moving, but each place is imaged at an appropriate timing, for example, as in the image capturing ranges SP1 and SP2 in the diagram. For example, image data in the image capturing range SP1 and image data in the image capturing range SP2 are obtained by the imaging device 220 as a one-frame captured still image, and are each taken into the information processing device 1 as samples.

Note that although linear rows 301 are illustrated in FIG. 2, the row 301 is not necessarily always a straight line. The straight row 301 may bend at an end of the farm field 300 or the like. Furthermore, depending on the shape of the farm field 300, a path at the time of sowing, obstacles, and the like, the row 301 may be partially curved, or the row 301 may be formed in a spiral shape or a concentric shape, for example.

The tractor 270 plants seeds and the like (seeds, seedlings, stumps, and the like) in the farm field 300. The tractor 270 autonomously travels and plants seeds and the like on the basis of instruction data of planting provided from the information processing device 1, for example. Consequently, the row 301 described above is formed in the farm field 300.

A computer device is mounted on the tractor 270, and the computer device controls traveling and planting operations on the basis of the instruction data. For example, when a data file including planting instruction data (a rate map data including the number of planting instructions per unit area for each position) as indicated by an instruction rate map to be described later is imported, the computer device controls the traveling and the planting operation of the tractor 270 on the basis of the instruction data.

Furthermore, an actual result of a planting operation by the tractor 270 (actual result number of plantings per unit area for each position) is provided to the information processing device 1 as actual data.

2. Configuration of Information Processing Device

The information processing device 1 that acquires image data from the imaging device 220 and performs processing in the above sensing system will be described.

Figure 3:
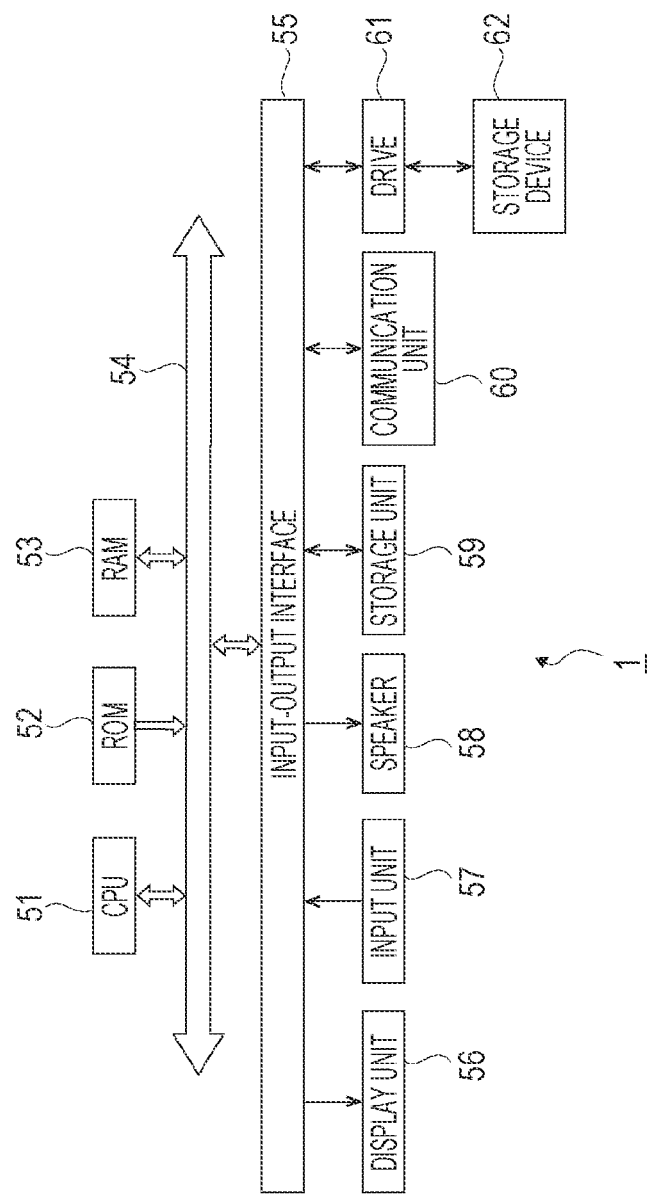
FIG. 3 is a block diagram of a hardware configuration of an information processing device according to the embodiment.

FIG. 3 illustrates a hardware configuration of the information processing device 1. The information processing device 1 includes a central processing unit (CPU) 51, a read only memory (ROM) 52, and a random access memory (RAM) 53.

The CPU 51 executes various processes according to a program stored in the ROM 52 or a program loaded from the storage unit 59 into the RAM 53. The RAM 53 also appropriately stores data and the like necessary for the CPU 51 to execute various processes.

The CPU 51, the ROM 52, and the RAM 53 are connected to one another via a bus 54. An input-output interface 55 is also connected to the bus 54.

A display unit 56 including a liquid crystal panel, an organic electroluminescence (EL) panel, or the like, an input unit 57 including a keyboard, a mouse, or the like, a speaker 58, a storage unit 59, a communication unit 60, or the like can be connected to the input-output interface 55.

The display unit 56 may be integrated with the information processing device 1 or may be a separate device.

In the display unit 56, a captured image, various calculation results, and the like are displayed on a display screen on the basis of an instruction from the CPU 51. Furthermore, the display unit 56 displays various operation menus, icons, messages, and the like, that is, displays as a graphical user interface (GUI) on the basis of an instruction from the CPU 51.

The input unit 57 means an input device used by a user who uses the information processing device 1.

For example, as the input unit 57, various operators and operation devices such as a keyboard, a mouse, a key, a dial, a touch panel, a touch pad, and a remote controller are assumed.

An operation by the user is detected by the input unit 57, and a signal corresponding to the input operation is interpreted by the CPU 51.

The storage unit 59 includes, for example, a storage medium such as a hard disk drive (HDD) or a solid state memory. The storage unit 59 stores, for example, image data captured by the imaging device 220, the tag information, and other various types of information. Furthermore, the storage unit 59 is also used to store program data for various processes.

The communication unit 60 performs communication processing via a network including the Internet and communication with devices of peripheral units.

The communication unit 60 may be, for example, a communication device that communicates with the imaging device 220 or the tractor 270.

Furthermore, a drive 61 is connected to the input-output interface 55 as necessary, a storage device 62 such as a memory card is attached thereto, and writing and reading of data are performed.

For example, a computer program read from the storage device 62 is installed in the storage unit 59 as necessary, or data processed by the CPU 51 is stored. Of course, the drive 61 may be a recording-reproducing drive for a removable storage medium such as a magnetic disk, an optical disk, or a magneto-optical disk. These magnetic disks, optical disks, magneto-optical disks, and the like are one aspect of the storage device 62.

Note that the information processing device 1 according to the embodiment is not limited to the single information processing device (computer device) 1 having the hardware configuration as illustrated in FIG. 3, and may be configured by systematizing a plurality of computer devices. The plurality of computer devices may be systematized by a LAN or the like, or may be arranged in a remote place by a virtual private network (VPN) or the like using the Internet or the like. The plurality of computer devices may include computer devices available by cloud computing services.

Furthermore, the information processing device 1 in FIG. 3 can be achieved as a personal computer such as a stationary type or a notebook type, or a portable terminal such as a tablet terminal or a smartphone. Moreover, the information processing device 1 according to the present embodiment can also be mounted in an electronic device such as a measurement device, a television device, a monitor device, an imaging device, or an equipment management device having a function as the information processing device 1.

Figure 4:
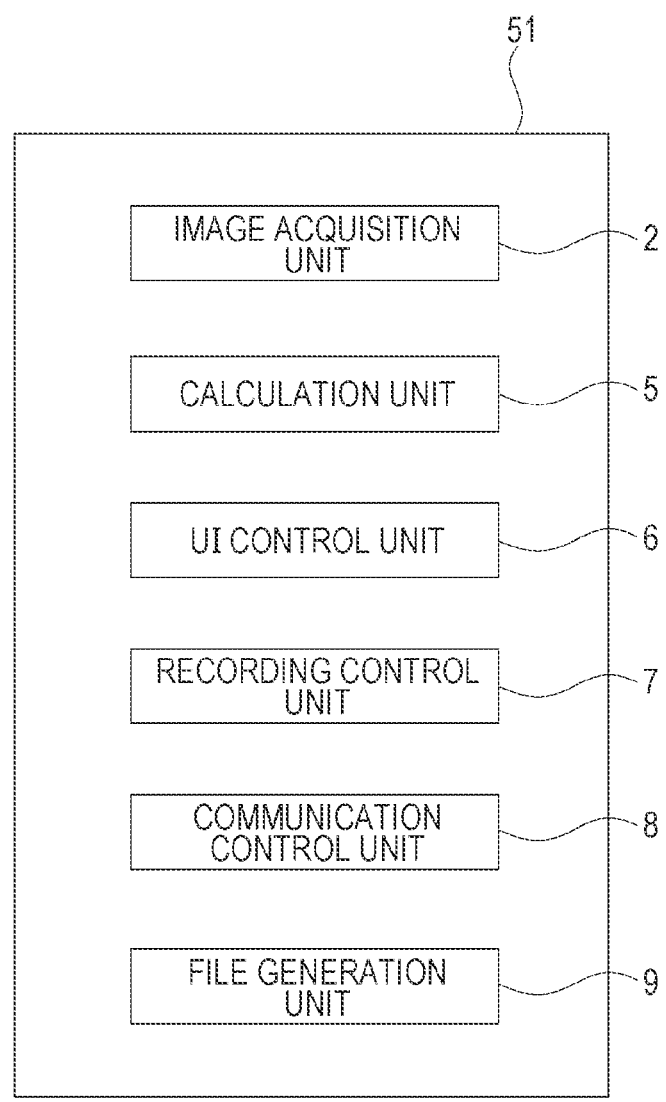
FIG. 4 is an explanatory diagram of a functional configuration of the information processing device according to the embodiment.

For example, the information processing device 1 having such a hardware configuration has a calculation function by the CPU 51, a storage function by the ROM 52, the RAM 53, and the storage unit 59, a data acquisition function by the communication unit 60 and the drive 61, and an output function by the display unit 56 or the like, and the installed software functions to have a functional configuration as illustrated in FIG. 4.

That is, the information processing device 1 includes an image acquisition unit 2, a calculation unit 5, a user interface control unit 6 (hereinafter, "user interface" will be referred to as "UI"), a recording control unit 7, a communication control unit 8, and a file generation unit 9 illustrated in FIG. 4.

These processing functions are implemented by software activated by the CPU 51.

The program constituting the software is downloaded from the network or read from the storage device 62 (for example, a removable storage medium) and installed in the information processing device 1 of FIG. 3. Alternatively, the program may be stored in advance in the storage unit 59 or the like. Then, when the program is activated in the CPU 51, the functions of the above respective units are expressed.

Furthermore, the calculation progress and the result of each function are stored using, for example, a storage area of the RAM 53 or a storage area of the storage unit 59.

The image acquisition unit 2 is a function of acquiring image data as a processing target and tag information accompanying the image data. For example, image data captured by the imaging device 220 is stored in the storage unit 59 or the like, and the CPU 51 reads specific image data to be subjected to calculation processing.

The calculation unit 5 performs various calculations on the basis of the image data. For example, the calculation unit 5 performs crop detection in image data obtained by capturing an image of the farm field 300, that is, image data as a processing target by the image acquisition unit 2, and determines a row 301 (a portion where the row 301 is included in the image) in the image data on the basis of a result of the crop detection. Then, the number of stands is calculated by counting the crop portion on the row. By counting the number of stands after detecting the row 301, weeds outside the row and the like can be excluded from the counting, and highly accurate counting can be performed.

Furthermore, the calculation unit 5 calculates the number of crops (population) per unit area (for example, one acre), the germination rate (stand rate), the predicted harvest amount, the replanting cost, and the like on the basis of the count number of crops included in the image data.

The UI control unit 6 is a function of performing, for example, display control of the display unit 56, acquisition processing of operation information input by the input unit 57, and the like. That is, the UI control unit 6 performs presenting an image and information calculated by the calculation unit 5, recognizing a user operation, and the like. In particular, the UI control unit 6 performs control to cause a display for setting the number of stands, a stand rate, and an area for replanting to be executed on the map image. Specifically, the UI control unit 6 performs control to display the sample position image arranged according to the image capturing position of each piece of image data in the map region of a UI screen in an image mode determined according to the rate calculated from each piece of image data.

The file generation unit 9 is a function of generating an instruction file including instruction data for replanting in a case where an area for which the replanting is performed is determined by a user operation using the UI screen. This instruction file is provided to the tractor 270.

The recording control unit 7 is a function of performing control to store various kinds of information such as the number of stands, the population, the stand rate, the predicted harvest amount, cost information, and the setting information of the UI screen calculated by the calculation unit 5, the instruction file generated by the file generation unit 9, and the like in the storage unit 59.

The communication control unit 8 is a function of performing control to transmit information by the calculation unit 5 or the file generation unit 9 as described above to an external device by the communication unit 60.

3. Work Procedure

Figure 5:
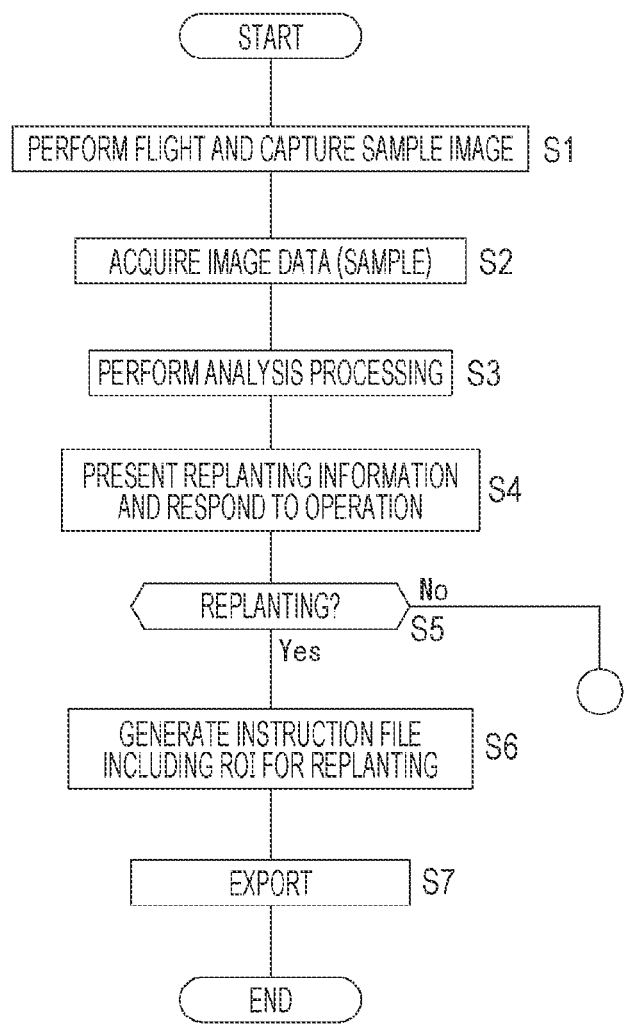
FIG. 5 is a flowchart illustrating a work procedure for farm field management according to the embodiment.

FIG. 5 illustrates an example of a work procedure for managing a farm.

In step S1, the flying object 200 flies above the farm field 300, and an image is captured by the imaging device 220. Consequently, image data as a large number of samples is obtained.

In step S2, the information processing device 1 acquires image data. For example, by wired or wireless communication from the imaging device 220 or delivery of the storage device 62 such as a memory card, the information processing device 1 captures image data obtained by image capturing at the time of flight. The information processing device 1 causes the image data to be stored in, for example, the storage unit 59.

In step S3, the information processing device 1 performs analysis processing based on the image data. For example, stand count or the like using each piece of image data is performed. A specific processing example will be described later as preparation processing.

In step S4, the information processing device 1 presents a situation and various types of information of the farm field 300 to the user (for example, a staff member of the farm) on the UI screen for the purpose of replant determination, and responds to an operation by the user. Specifically, information presentation is performed to consider whether or not the user performs replanting or for which area the replanting is performed, or the like, and processing is performed to receive designation of an area where the replanting is assumed.

In a case where the replanting is performed as a result of input and output on the UI screen, the processing proceeds from step S5 to step S6, and the information processing device 1 performs processing of generating an instruction file including a region of interest (ROI) for the replanting. The instruction file is provided to the tractor 270, and the ROI is information indicating an area for which the replanting is performed.

Then, in step S7, the information processing device 1 exports the instruction file.

When the tractor 270 receives the instruction file, actual replanting is then performed.

Among the above procedures, the information processing device 1 according to the present embodiment performs information presentation suitable for replant determination by the user particularly in input and output on the UI screen in step S4.

Hereinafter, a specific example of the UI screen will be described.

4. User Interface Screen

Figure 6:
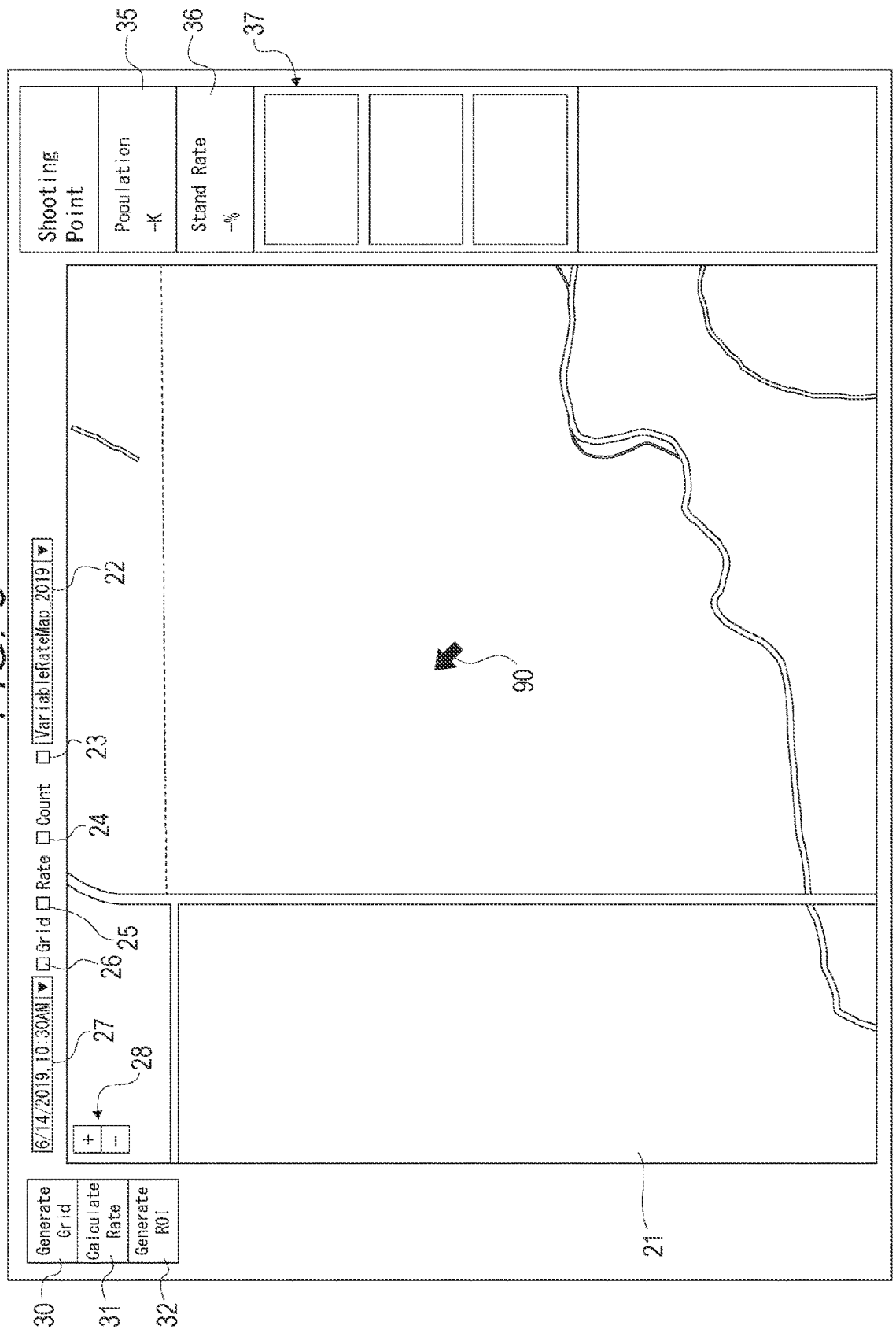
FIG. 6 is an explanatory diagram of a user interface screen according to the embodiment.

FIG. 6 illustrates an example of a UI screen displayed on the display unit 56 or the like, for example. In FIG. 6, a map image is displayed on the UI screen, but information is not particularly presented for replanting.

A map region 21 is prepared on the UI screen. A map image including the farm field 300 is displayed in the map region 21. FIG. 6 illustrates only a state in which the peripheral map of the farm field 300 is merely displayed.

The scale of the map image in the map region 21 can be arbitrarily set by the user by a magnification and reduction button 28.

Furthermore, the range displayed on the map in the map region 21 can be moved by a drag operation of a cursor 90 or the like by the user.

The UI screen is provided with a map selection section 22, and the user can perform an operation of selecting a rate map by a pull-down menu, for example. The rate map is an instruction rate map, an actual result rate map, or the like to be described later.

A map display check box 23, a count display check box 24, a rate display check box 25, and a grid display check box 26 are prepared on the UI screen, and the user can select presence or absence of rate map display, stand count display, stand rate display, and grid display by performing a check operation.

A date and time selection section 27 is provided on the UI screen, and the user can select the date and time (date and time of flight/image capturing) of the processing target sample by, for example, a pull-down menu.

The UI screen is provided with a grid generation button 30, a rate calculation button 31, and an ROI generation button 32, which can be operated by the user.

The grid generation button 30 is a button for performing an operation of setting a grid to be described later.

The rate calculation button 31 is a button for giving an instruction on calculation of a stand rate.

The ROI generation button 32 is a button for performing an operation for generating the instruction file.

Examples of the display state and the process according to an operation of each button will be described later.

The UI screen is provided with a population display section 35, a stand rate display section 36, and a sample image display section 37.

When a sample is designated, the population display section 35 displays the population for the sample.

When a sample is designated, the stand rate display section 36 displays the number of stands for the sample.

An image of the sample is displayed on the sample image display section 37. Respective specific examples will be described later.

Figure 7:
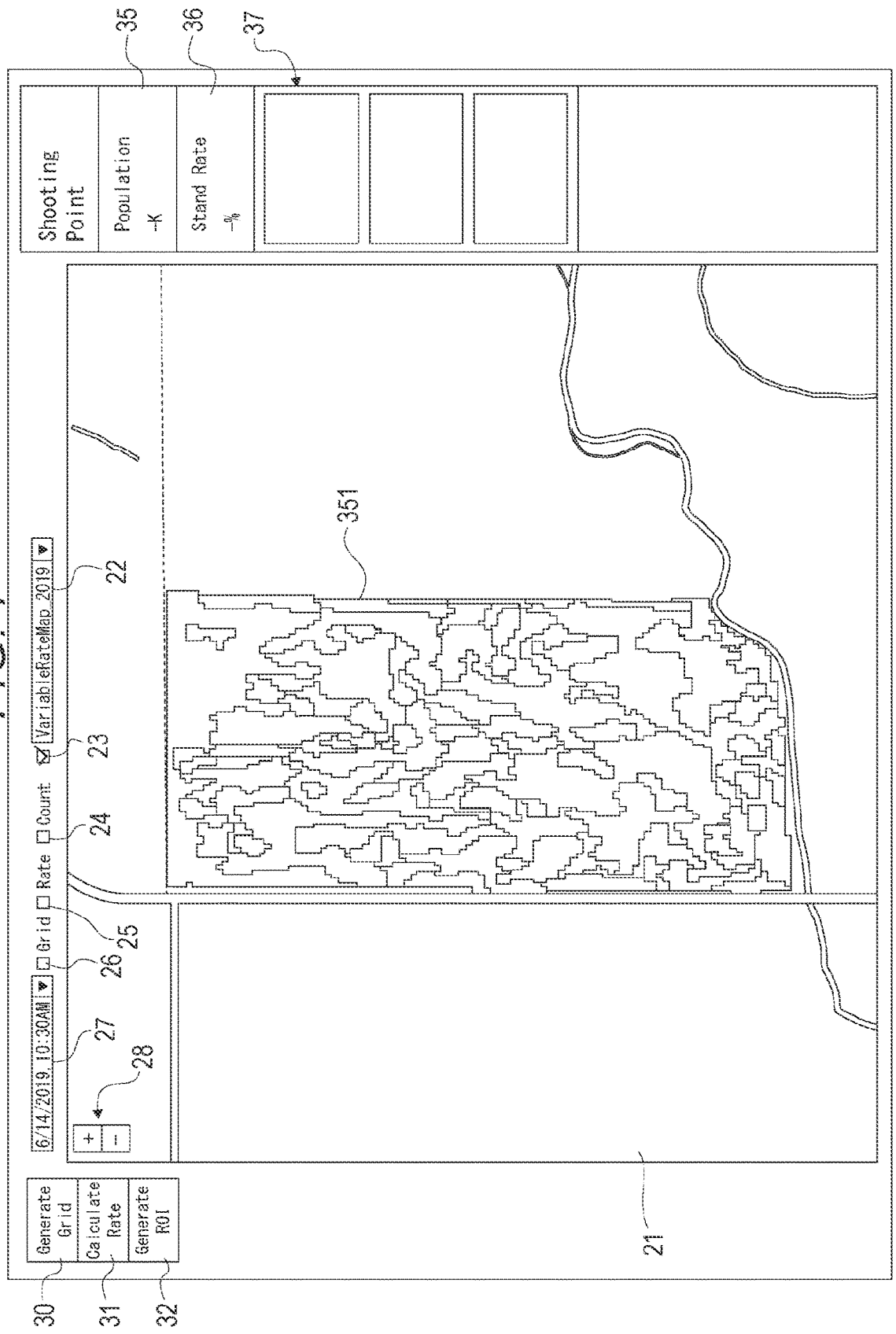
FIG. 7 is an explanatory diagram of a display state of an instruction rate map according to the embodiment.

FIG. 7 illustrates a state in which an instruction rate map 351 is displayed in the map region 21.

When the user checks on the map display check box 23, the rate map selected by the map selection section 22 at that time is displayed. FIG. 7 illustrates a state in which the instruction rate map 351 corresponding to "Variable Rate Map 2019" is displayed by checking on the map display check box 23 since "Variable Rate Map 2019" indicating the instruction rate map 351 is selected by the map selection section 22.

Figure 8:
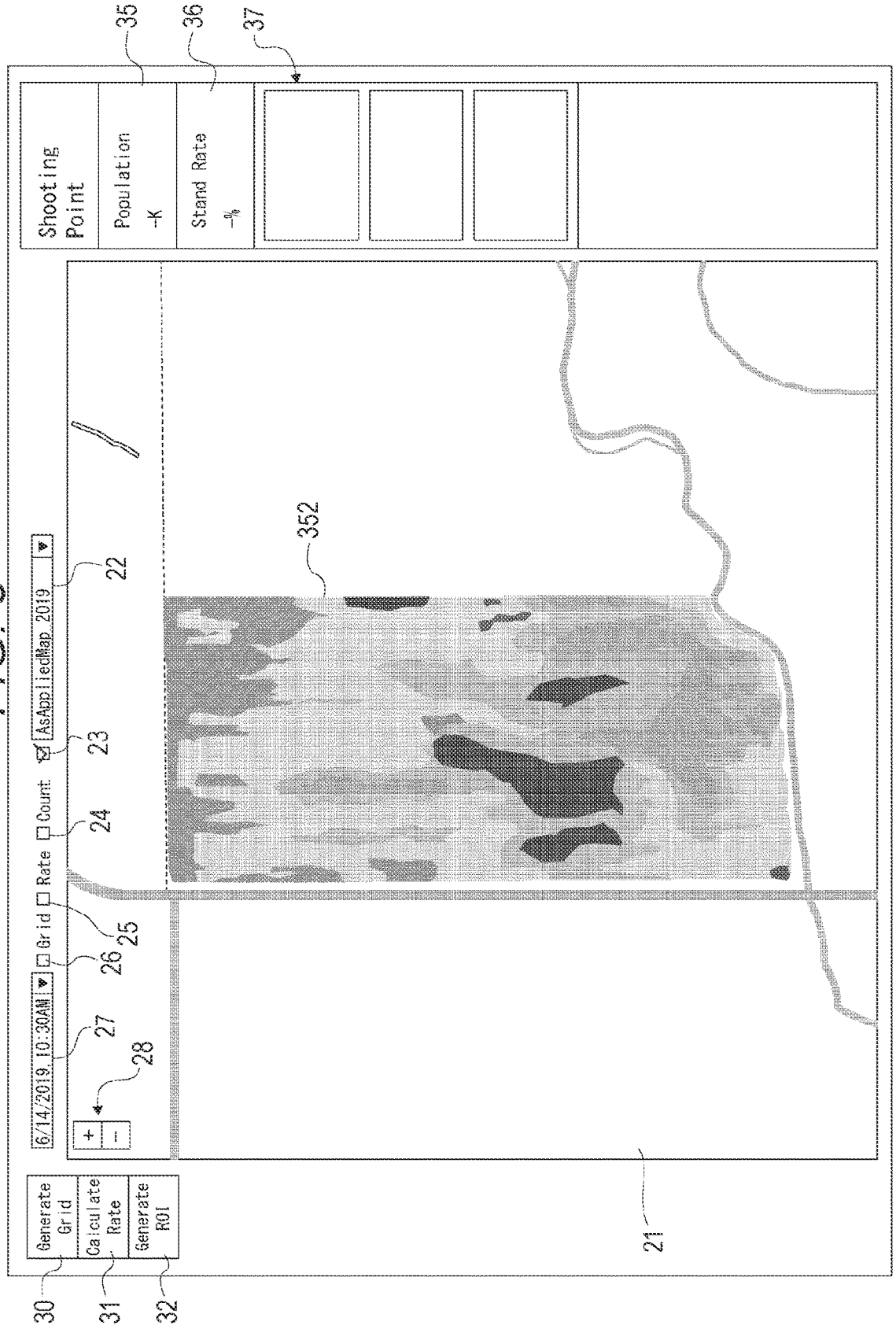
FIG. 8 is an explanatory diagram of a display state of an actual result rate map according to the embodiment.

In a case where another rate map is selected by the map selection section 22, another rate map is displayed by checking on the map display check box 23. FIG. 8 illustrates an example in which an actual result rate map 352 corresponding to "As Applied Map 2019" is displayed in the map region 21 by that the "As Applied Map 2019" indicating the actual result rate map is selected in the map selection section 22.

The instruction rate map 351 illustrated in FIG. 7 indicates the number of planting instructions for each district in the farm field 300, and the actual result rate map 352 of FIG. 8 indicates the actual result number of plantings for each district in the farm field 300.

The number of planting instructions is set as the number of stands per unit area (for example, one acre).

In the farm field 300, for example, the number of planting instructions may be made different for each district such as 10 acres or 100 acres.

The instruction rate map 351 is a map indicating the number of planting instructions created by the planting plan such that the number of stands per unit area (that is, population) is set to "35000" in a certain district and the number of stands per unit area (population) is set to "30000" in a certain district. That is, it is a map showing population values on which the tractor 270 is instructed at the time of planting for each district in the farm field 300.

On the other hand, the actual result rate map 352 indicates actual results of planting actually performed by the tractor 270 in accordance with the instruction indicated by the instruction rate map 351. The tractor 270 performs planting according to the number of planting instructions per unit area indicated by the instruction file in each district, but a slight deviation occurs due to performance of the tractor 270, position detection accuracy, and the like. The actual result rate map 352 indicates the number per unit area (actual result number of plantings) as an actual result that has been planted consequently. Therefore, in the instruction rate map 351 and the actual result rate map 352, the boundary of districts may be slightly shifted.

In the instruction rate map 351 of FIG. 7 and the actual result rate map 352 of FIG. 8, each district is displayed by color coding according to the number of stands per unit area. Although not illustrated, for example, display by color coding such as green, yellow, and red is performed.

Thus, the user can easily recognize the number of planting instructions or the actual result number of plantings in each district.

Note that changing the number of planting instructions per unit area for each district is due to various reasons such as convenience of soil and geology in each district, a difference in planting period, or convenience of harvesting work. Of course, planting may be performed with the same number of planting instructions in the entire farm field 300.

Figure 9:
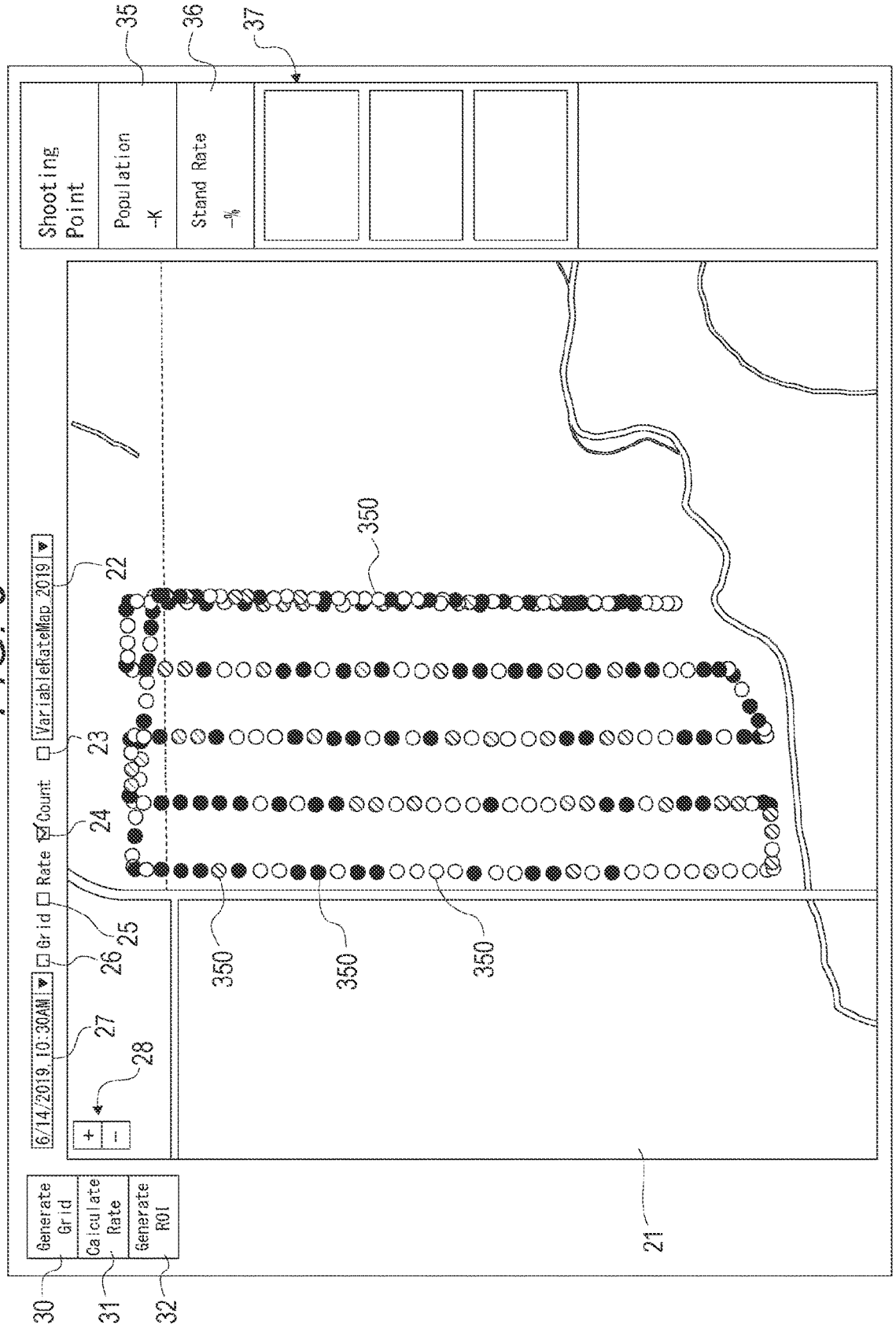
FIG. 9 is an explanatory diagram of a display state of a stand count according to the embodiment.

Next, FIG. 9 is an example in which a circular sample position mark 350 is illustrated as an example in the map region 21, and the sample position mark 350 is in a display mode according to the population. When the user checks on the count display check box 24, such a sample position mark 350 is displayed.

Note that in FIG. 9, in order to avoid complication of the diagram, the sample position mark is partially denoted by a reference sign "350". The same applies to the other drawings.

Each sample position mark 350 illustrated as a circular image in the map region 21 indicates the image capturing position of one sample (image data), that is, the position of the imaging device 220 at the time of image capturing. Alternatively, the sample position mark 350 may indicate an imaged position, that is, a position of a portion set as image capturing ranges SP1 and SP2 on the farm field 300 side.

Since image capturing is performed, for example, periodically during a flight of the flying object 200 as described above, each sample position mark 350 is displayed at each position so as to indicate a flight trajectory.

In this case, each sample position mark 350 is displayed by color coding according to the population. For example, display by color coding with green (white portion in the drawing), yellow (shaded portion in the drawing), and red (black portion in the drawing) is performed.

The population in each sample position mark 350 is a value obtained by converting the number of stands calculated from image data of the sample position mark 350 into the number of stands per unit area such as one acre, for example.

As illustrated as the image capturing ranges SP1 and SP2 in FIG. 2, the image capturing range by one piece of image data is a very partial range when viewed from the entire farm field 300. For example, the number of stands is calculated from image data of the image capturing range SP1, but the number of stands varies depending on the size of the image capturing range SP1. That is, it varies depending on conditions such as the altitude of the flying object 200 and the angle of view of the imaging device 220. Therefore, not the number of stands itself calculated from the image data but a population value obtained by converting the number of stands per unit area is used. The population of the image capturing range SP1 can be obtained by obtaining the ratio between the area of the image capturing range SP1 and the unit area and multiplying the ratio by the number of stands calculated from the image.

Note that the area may be calculated from a ratio between a specific length on the image and an actual length. For example, a length between a certain row and a certain row is input (10 m), and the number of stands per certain length of the row is calculated by image recognition (30 stands per 10 m). Then, population can be obtained as 30 pieces/(10 m×10 m)=0.3 (stand/m$^2$).

The sample position mark 350 is displayed by color coding according to such population. Of course, depending on the type of crops and the like, for example, display by color coding is performed such as displaying in green if the population is equal to or more than 35000, displaying in yellow if the population is less than 35000 and equal to or more than 33000, and displaying in red if the population is less than 33000. Note that the color-coding in three stages is merely an example.

With such display by color coding, the user can check the population, that is, the growth state such as germination at each sample position.

Figure 10:
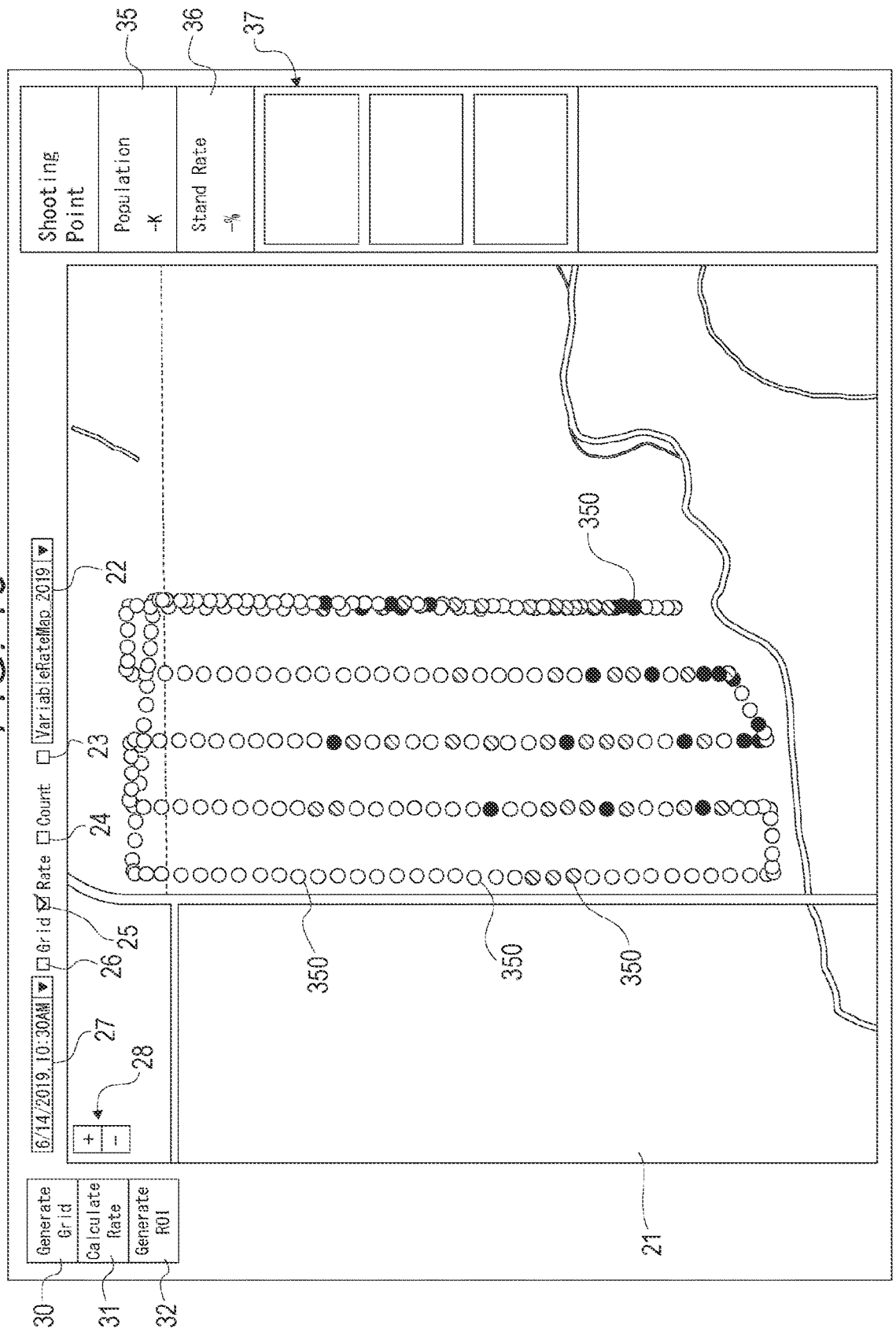
FIG. 10 is an explanatory diagram of a display state of a stand rate according to the embodiment.

FIG. 10 illustrates an example in which a circular sample position mark 350 is illustrated in the map region 21, and the sample position mark 350 is in a display mode according to the stand rate. When the user checks on the rate display check box 25, such a sample position mark 350 is displayed.

As in a case of FIG. 9, each sample position mark 350 illustrated as a circular image in the map region 21 indicates the image capturing position of one sample (image data), but in a case of FIG. 10, each sample position mark 350 is displayed by color coding according to the stand rate. For example, display by color coding with green (white circle in the figure), yellow (shaded circle in the figure), and red (black circle in the figure) is performed.

The stand rate in each sample position mark 350 can be considered as a ratio of population calculated from the image data of the sample position mark 350 to a population scheduled at the position.

The scheduled population is the number of planting instructions indicated by the instruction rate map 351 and the actual result number of plantings indicated by the actual result rate map 352. That is, it is the number of crops scheduled to be grown.

For example, if the population calculated from the image data is 35000 at a position where an instruction is given such that the number of stands per unit area is 35000, the stand rate is 100%. If the population calculated from the image data is 34000 at a position where an instruction is given such that the number of stands per unit area is 35000, the stand rate is 97%.

The sample position mark 350 is displayed by color coding according to such a stand rate. For example, display by color coding is performed such as displaying in green if a stand rate is 98% or more (white circle in the drawing), displaying in yellow if a stand rate is 90% or more and less than 98% (shaded circle in the drawing), and displaying in red if a stand rate is less than 90% (black circle in the drawing). Note that the color-coding in three stages is merely an example.

With such display by color coding, the user can check the stand rate, for example, the germination rate at each sample position.

The stand rate is calculated with reference to the scheduled population at each sample position. This reference is a scheduled population (the number of planting instructions per unit area) at the sample position indicated by the instruction rate map 351 or a scheduled population (the actual result number of plantings per unit area) at the sample position indicated by the actual result rate map 352. The user can select which is used as a reference.

As a processing example, it is conceivable that the calculation of the stand rate corresponding to each of such sample position marks 350 is performed when the user operates the rate calculation button 31.

Figure 11:
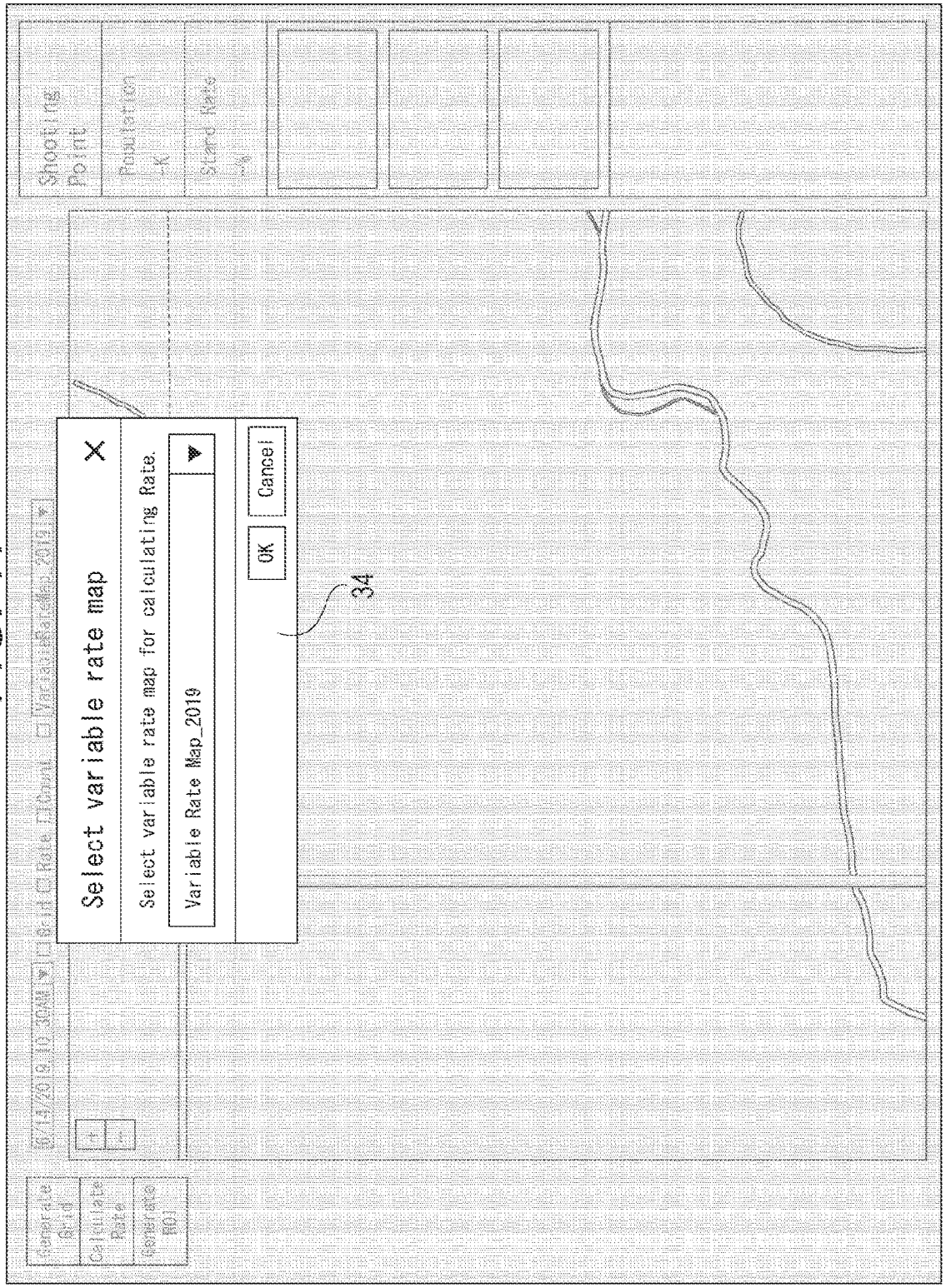
FIG. 11 is an explanatory diagram of a selection dialog for a rate map according to the embodiment.

When the user operates the rate calculation button 31, a selection dialog 34 is displayed as illustrated in FIG. 11, and the user can select a reference rate map by, for example, a pull-down menu.

For example, the instruction rate map 351 named "Variable Rate Map 2019", the actual result rate map 352 named "As Applied Map 2019", and the like are displayed from the pull-down menu, and the user can select any rate map.

In response to the selection, the CPU 51 calculates the stand rate corresponding to each sample position mark 350 and causes the stand rate to be displayed by color coding as illustrated in FIG. 10.

Note that in a case where an instruction value is constant or there is no instruction data, calculation may be performed assuming that the entire farm field 300 is a uniform value.

Furthermore, the user may be able to select the rate map in another mode, such as providing not only the pull-down menu but also an input form of numerical data so that the user can select the rate map.

Figure 12:
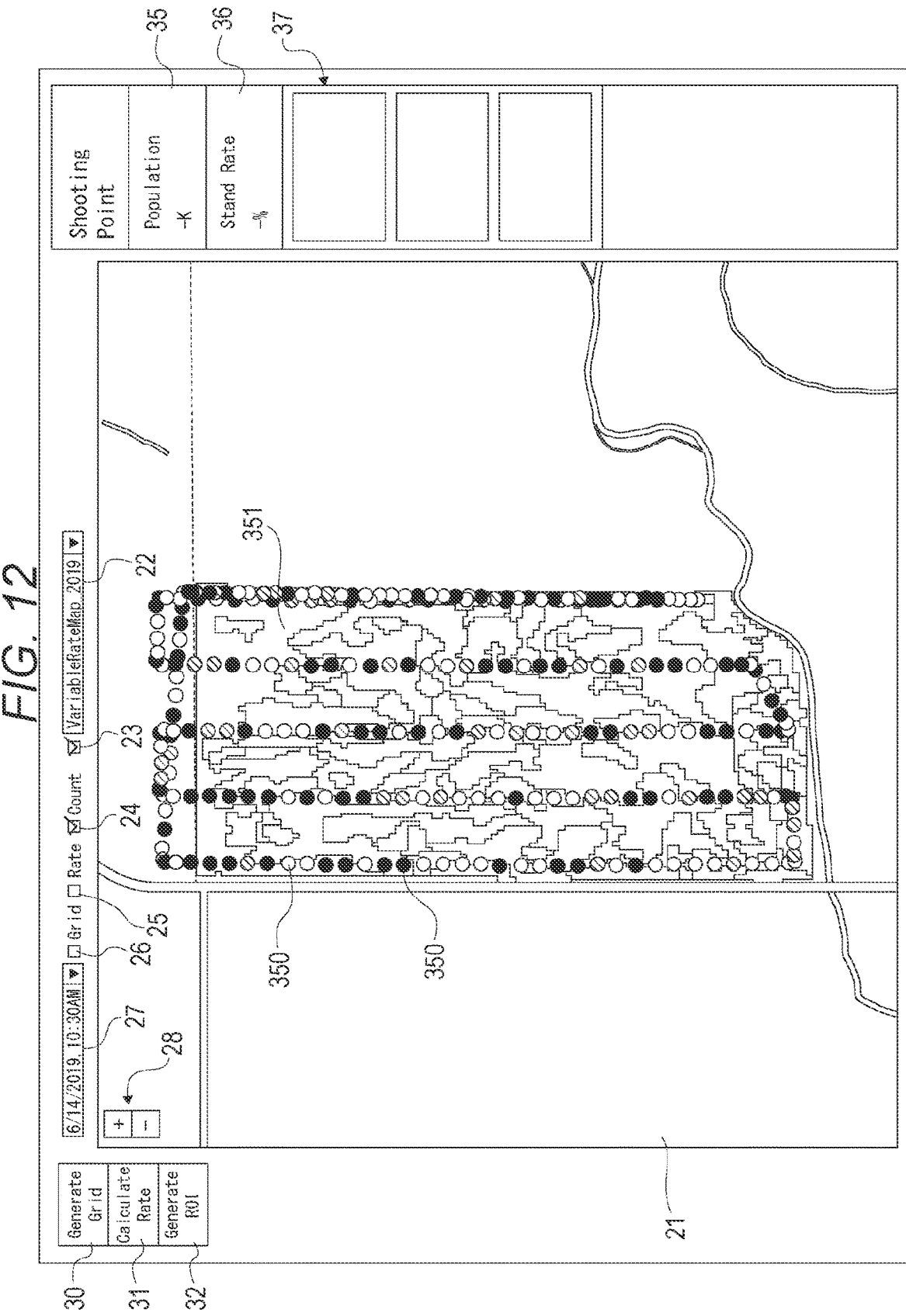
FIG. 12 is an explanatory diagram of display states of the stand count and a rate map image according to the embodiment.

Next, FIG. 12 illustrates a case where the user checks on the map display check box 23 and the count display check box 24 together.

In this case, the selected rate map (for example, the instruction rate map 351) is displayed in the map region 21, and the sample position mark 350 color-coded by population is further displayed in an overlapping manner.

This results in an image that allows the user to easily compare the population scheduled for each district with the population (actual population) calculated from the image data.

Figure 13:
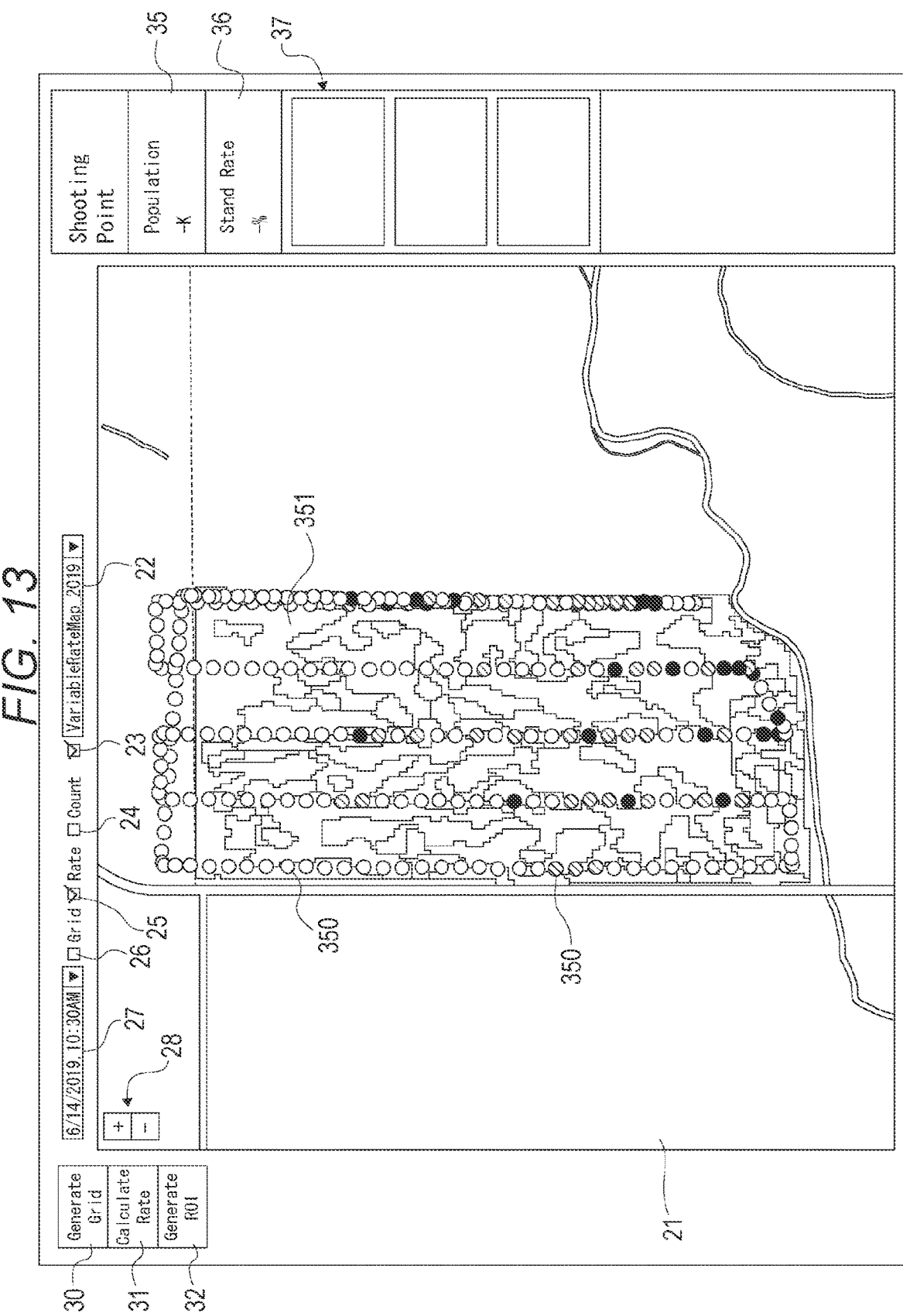
FIG. 13 is an explanatory diagram of display states of the stand rate and the rate map image according to the embodiment.

FIG. 13 illustrates a case where the user checks on the map display check box 23 and the rate display check box 25 together.

In this case, the selected rate map (for example, the instruction rate map 351) is displayed in the map region 21, and the sample position mark 350 color-coded by the stand rate is displayed in an overlapping manner.

This results in an image that allows the user to easily compare the population scheduled for each district with the stand rate at the position of each piece of image data.

The population display by the sample position mark 350 in FIG. 12 is display by color coding with reference to the number of stands, and the stand rate display by the sample position mark 350 in FIG. 13 is display by color coding with reference to the rate, which are thus pieces of information having different meanings. The user can easily grasp a situation of the farm field 300 by arbitrarily displaying them.

Figure 14:
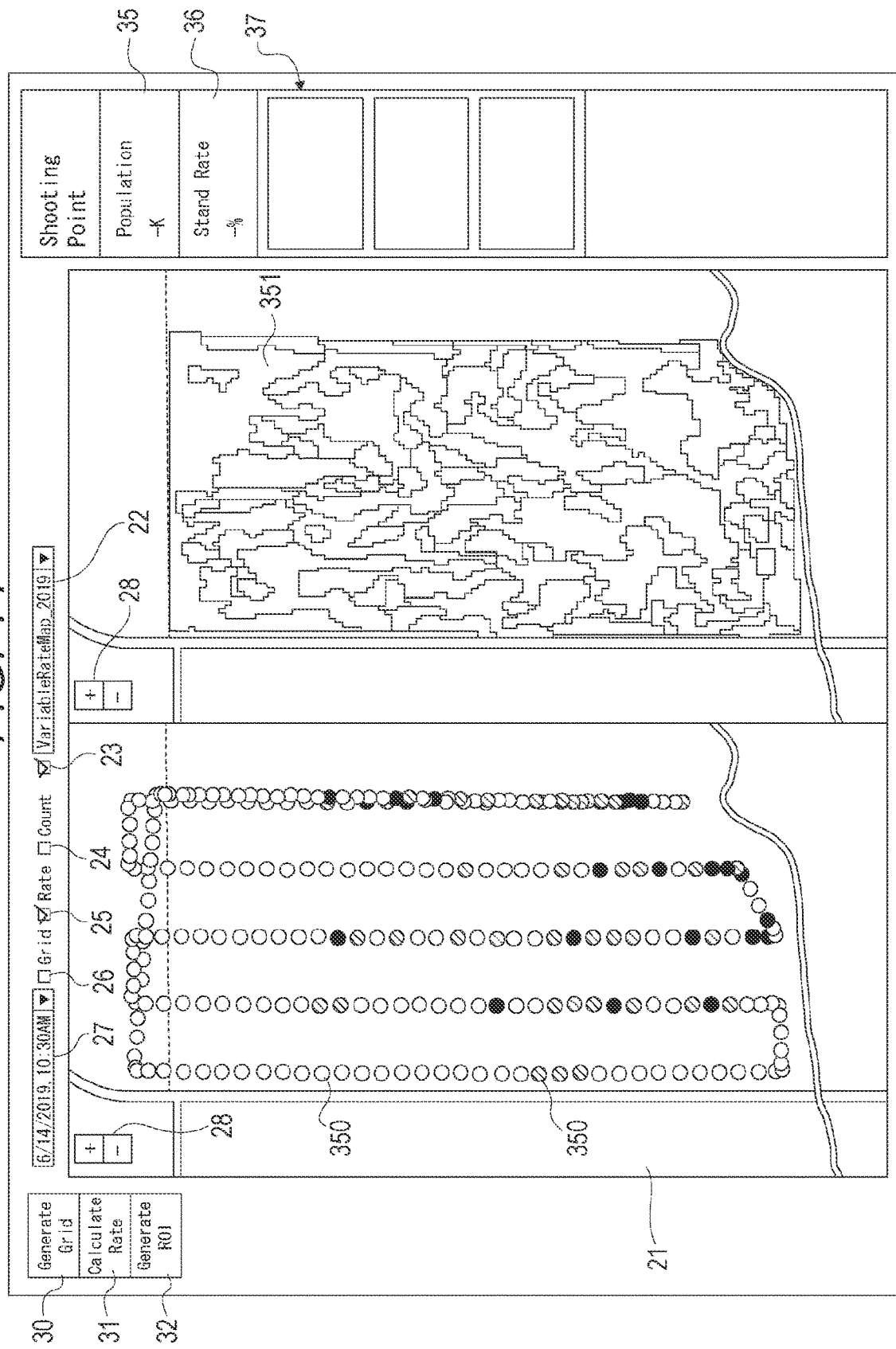
FIG. 14 is an explanatory diagram of other display states of the stand rate and the rate map image according to the embodiment.

Note that, although FIGS. 12 and 13 illustrate the example in which the sample position mark 350 is displayed to be superimposed on the rate map, the sample position mark 350 and the rate map (for example, the instruction rate map 351) may be displayed separately, as illustrated in FIG. 14.

Alternatively, the user may be allowed to select performing display separately as illustrated in FIG. 14 and performing display in an overlapping manner as illustrated in FIGS. 12 and 13.

Figure 15:
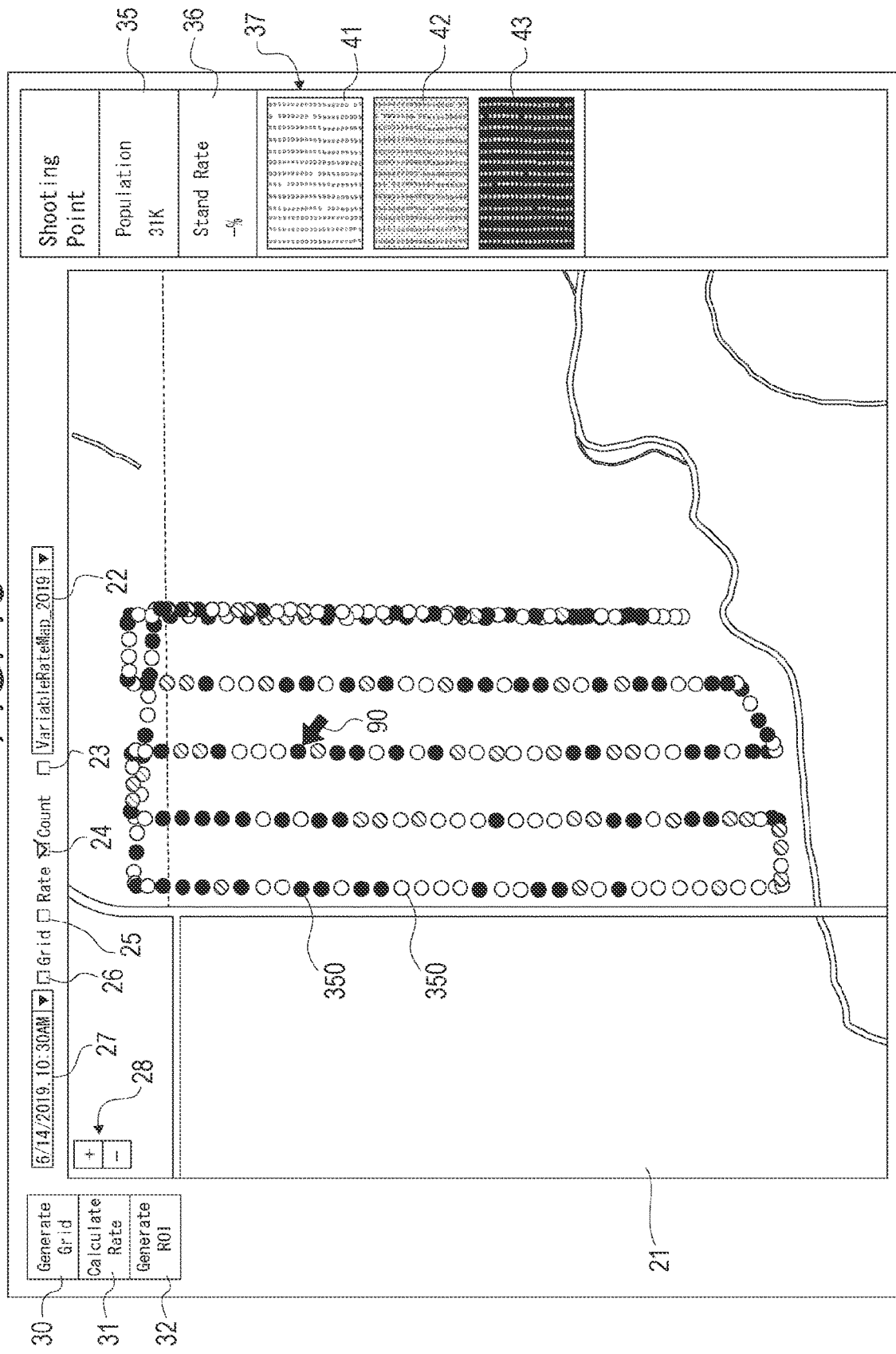
FIG. 15 is an explanatory diagram of a display state when a sample is designated on the stand count according to the embodiment.

FIG. 15 illustrates a case where the user designates one sample position mark 350 in a state where the population is displayed by the sample position mark 350.

For example, it is assumed that the user performs an operation of designating one sample position mark 350 by clicking the cursor 90 in contact with the one sample position mark 350, or the like.

In this case, the population display section 35 displays the population value for the designated sample position mark 350. The diagram illustrates an example in which a population value of "31000" is displayed as "31K".

Furthermore, an image corresponding to the sample position mark 350, that is, an image related to image capturing at the position of the sample position mark 350 is displayed on the sample image display section 37. Here, an example is illustrated in which an RGB image 41, a stand count image 42, and an NDVI image 43 are displayed. The RGB image 41 is, for example, an image captured in a case where the imaging device 220 is an RGB camera. The NDVI image 43 is an NDVI image obtained from R and NIR. The stand count image 42 is an image processed for stand calculation, for example.

The user can also magnify and display these images. For example, by performing an operation such as clicking a portion of the RGB image 41, the RGB image 41 is magnified and displayed as illustrated in FIG. 16.

The user can end the magnified display and return to the state of FIG. 15 by operating an end button 45.

Figure 16:
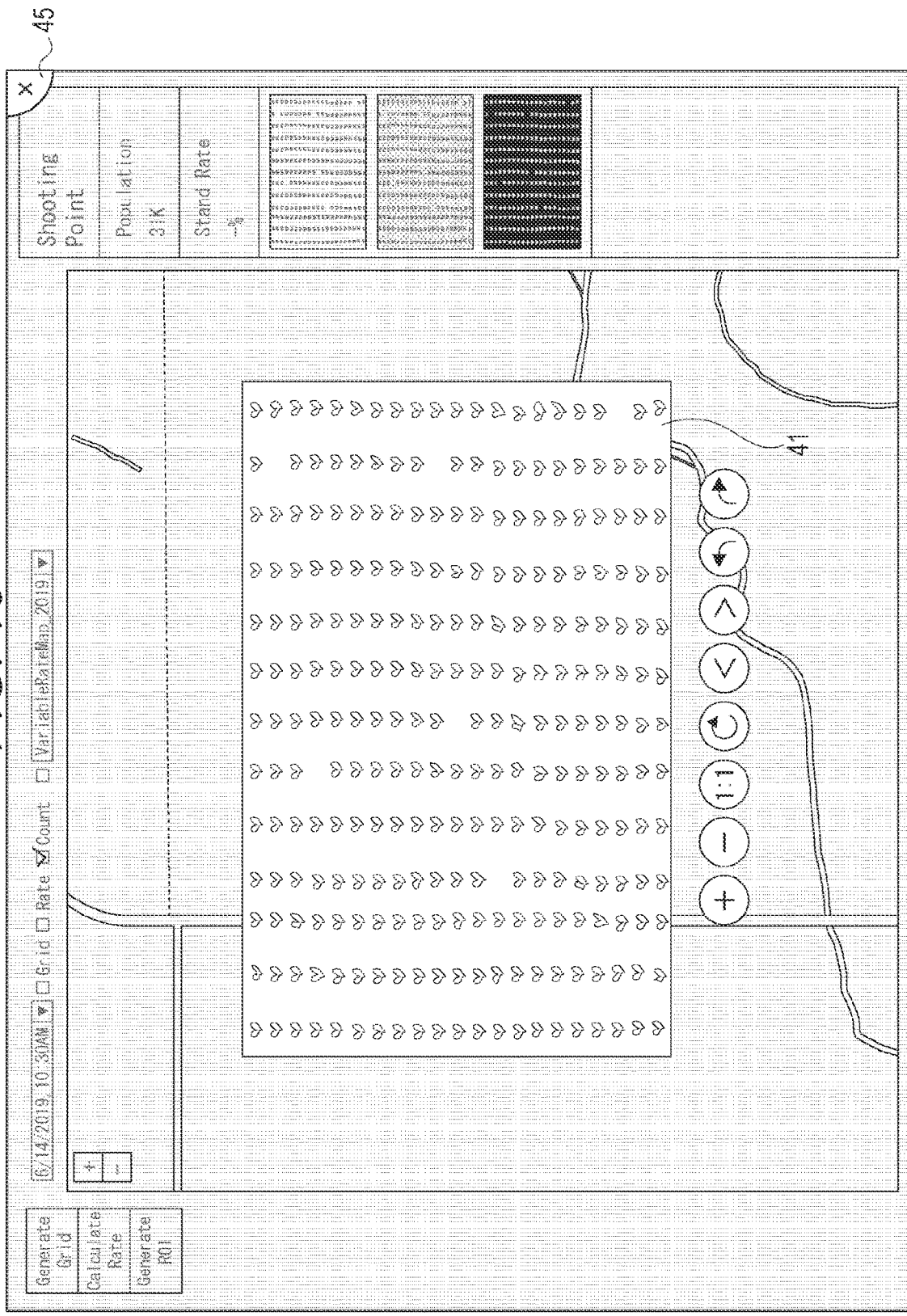
FIG. 16 is an explanatory diagram of an image display state according to the embodiment.

With the display as illustrated in FIGS. 15 and 16, the user can check the population value or check the image at an arbitrary position (position of the sample position mark 350). That is, it is possible to check more detailed information than the rough population by the color-coding of the sample position mark 350.

Figure 17:
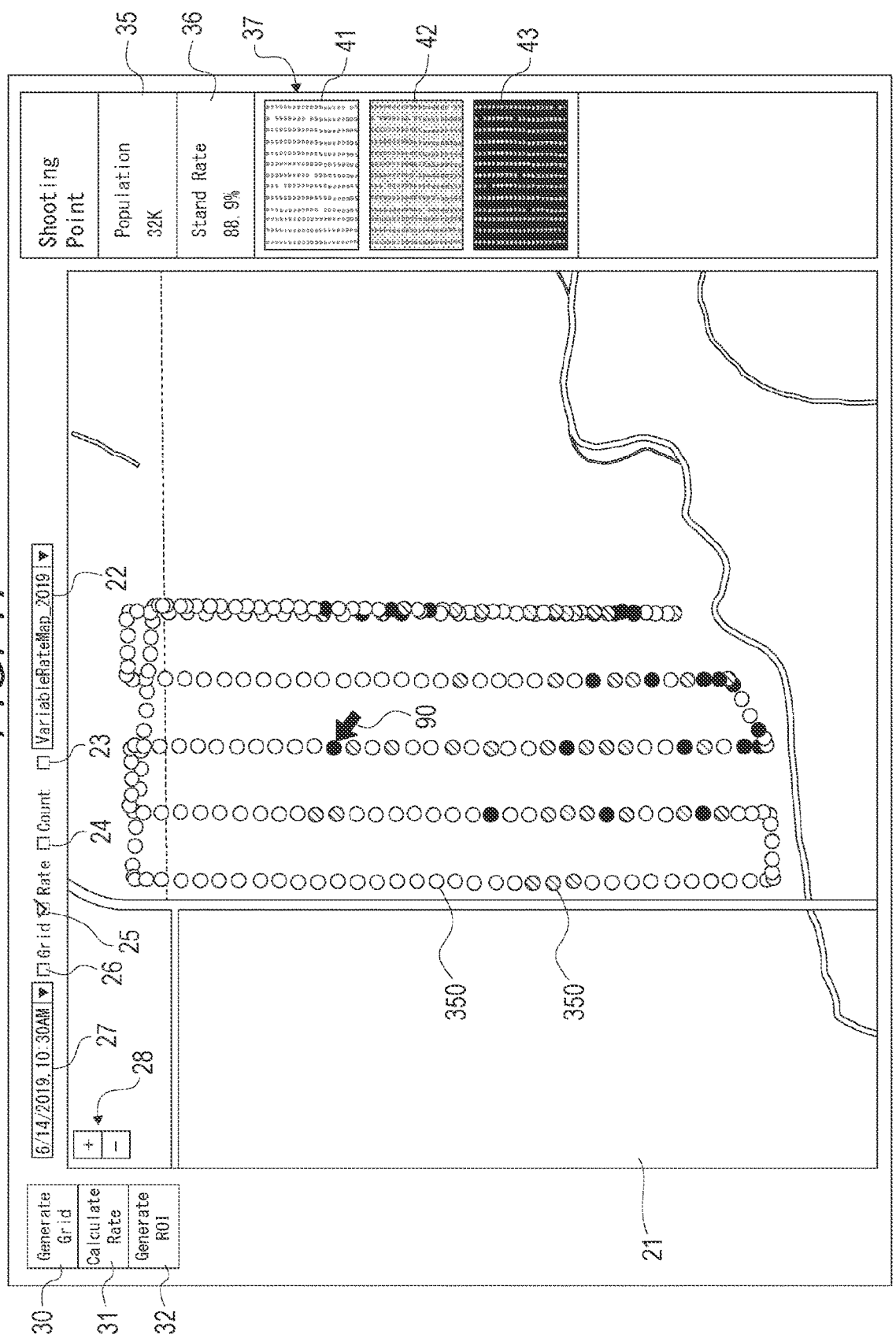
FIG. 17 is an explanatory diagram of a display state when a sample is designated on the stand rate according to the embodiment.

FIG. 17 illustrates a case where the user designates one sample position mark 350 in a state where the stand rate is displayed by the sample position mark 350.

For example, in a case where the user performs an operation of designating one sample position mark 350 with the cursor 90, the population for the designated sample position mark 350 is displayed on the population display section 35, and the stand rate is displayed on the stand rate display section 36. The diagram illustrates an example in which a population value of "32000" is displayed as "32K" and the stand rate "88.9%" is displayed.

Note that, also in this case, the sample image display section 37 displays an image corresponding to the sample position mark 350, for example, an RGB image 41, a stand count image 42, an NDVI image 43, and the like. Furthermore, when these images are designated, magnified display of the images is performed similarly to the case of FIGS. 15 and 16 described above.

In the case of FIG. 17, the user can check the value of the stand rate in addition to the rough stand rate by the color coding of the sample position mark 350.

Figure 18:
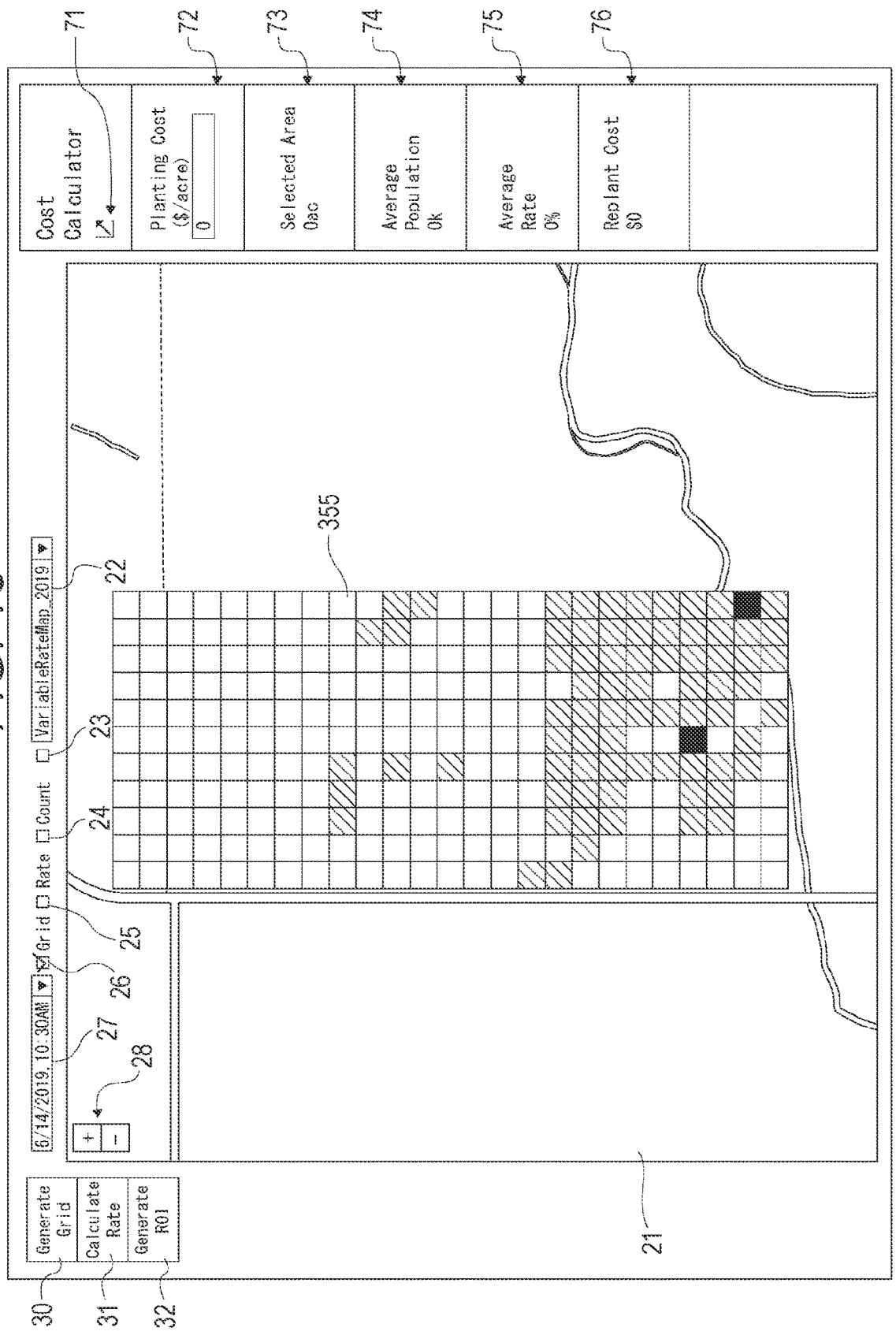
FIG. 18 is an explanatory diagram of a display state of a grid according to the embodiment.

FIG. 18 illustrates a state in which a grid 355 of a lattice pattern is displayed in the map region 21.

When the user checks on the grid display check box 26, display of such grids 355 is performed.

The grid 355 is an area definition image, and is a display that defines the area of the farm field 300 by a grid line. That is, each area obtained by dividing the farm field 300 is presented to the user as a range partitioned by a grid (grid square).

The grid 355 is mainly used to designate an area for which the replanting is performed.

Each area indicated by a square of the grid 355 is displayed in an image mode determined according to the stand rate calculated for the area, here, in a color-coded manner.

Note that each area of the grid 355 does not necessarily correspond to each sample (image data indicated by the sample position mark 350) at a ratio of 1:1. Therefore, the stand rate of each area of the grid 355 is calculated by interpolation calculation or the like using the neighboring sample position mark 350 or the like. Specific examples will be described later.

Each area of the grid 355 is displayed by, for example, color coding such as displaying in green if a stand rate is 98% or more (white square in the drawing), displaying in yellow if a stand rate is 90% or more and less than 98% (shaded square in the drawing), and displaying in red if a stand rate is less than 90% (black square in the drawing). Note that the color-coding in three stages is merely an example.

With such display by color coding, the user can check the stand rate in each area defined by the grid 355.

The user can set the size of the frame of the grid 355.

Figure 19:
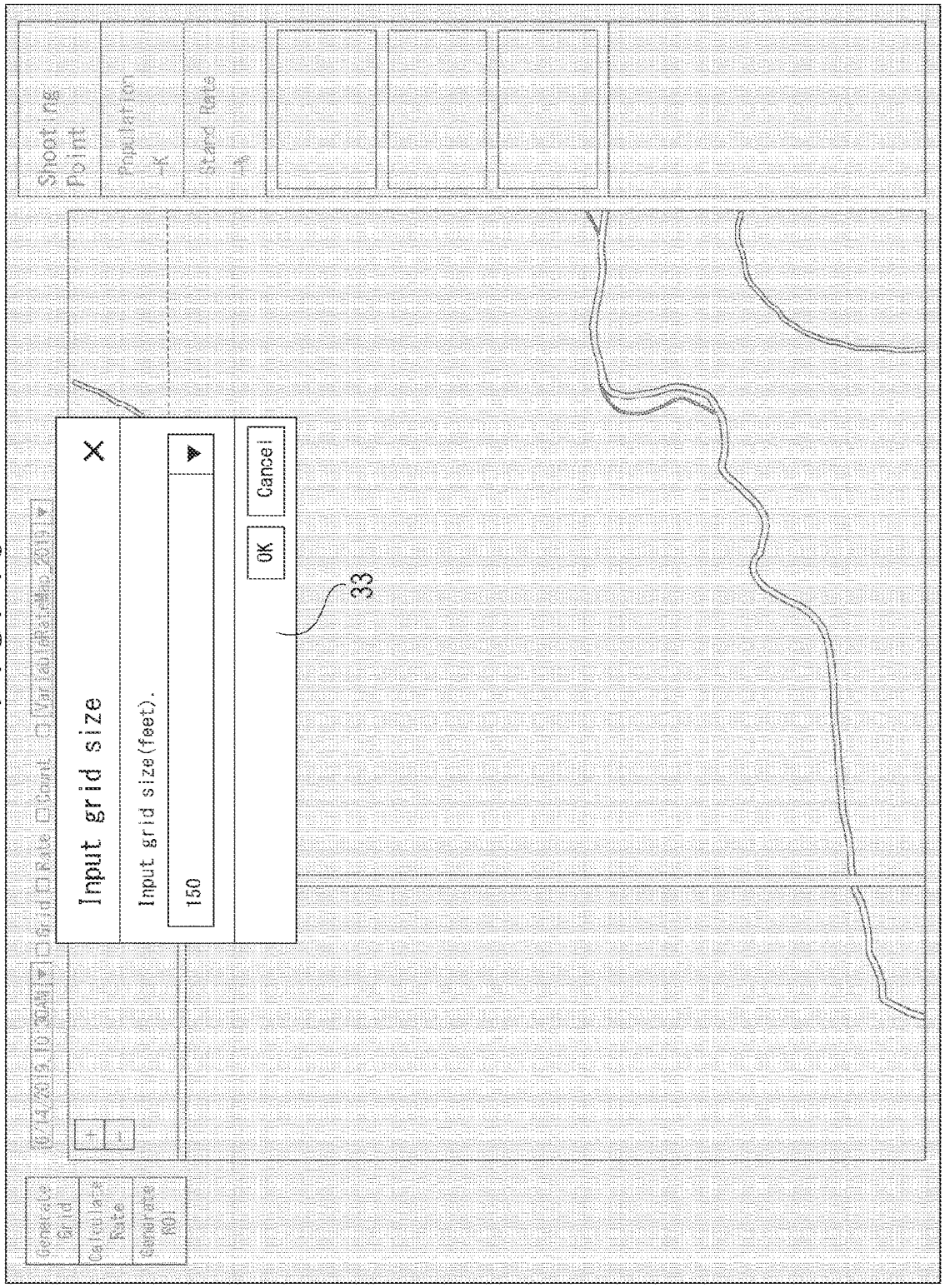
FIG. 19 is an explanatory diagram of a setting dialog of the grid according to the embodiment.

When the user operates the grid generation button 30, a setting dialog 33 for setting the size of the grid is displayed as illustrated in FIG. 19. The setting dialog 33 allows the user to arbitrarily set the size of one side of the grid.

The grid 355 displayed as illustrated in FIG. 18 is an image of a grid pattern forming a square of the size set in this manner.

When the grid 355 is displayed, as illustrated, a calculation button 71, a planning cost display section 72, a selected area display section 73, an average population display section 74, an average stand rate display section 75, and a replant cost display section 76 appear.

However, in particular, when an area on the grid 355 is not selected, a specific numerical value is not displayed in these grids as illustrated in FIG. 18.

Figure 20:
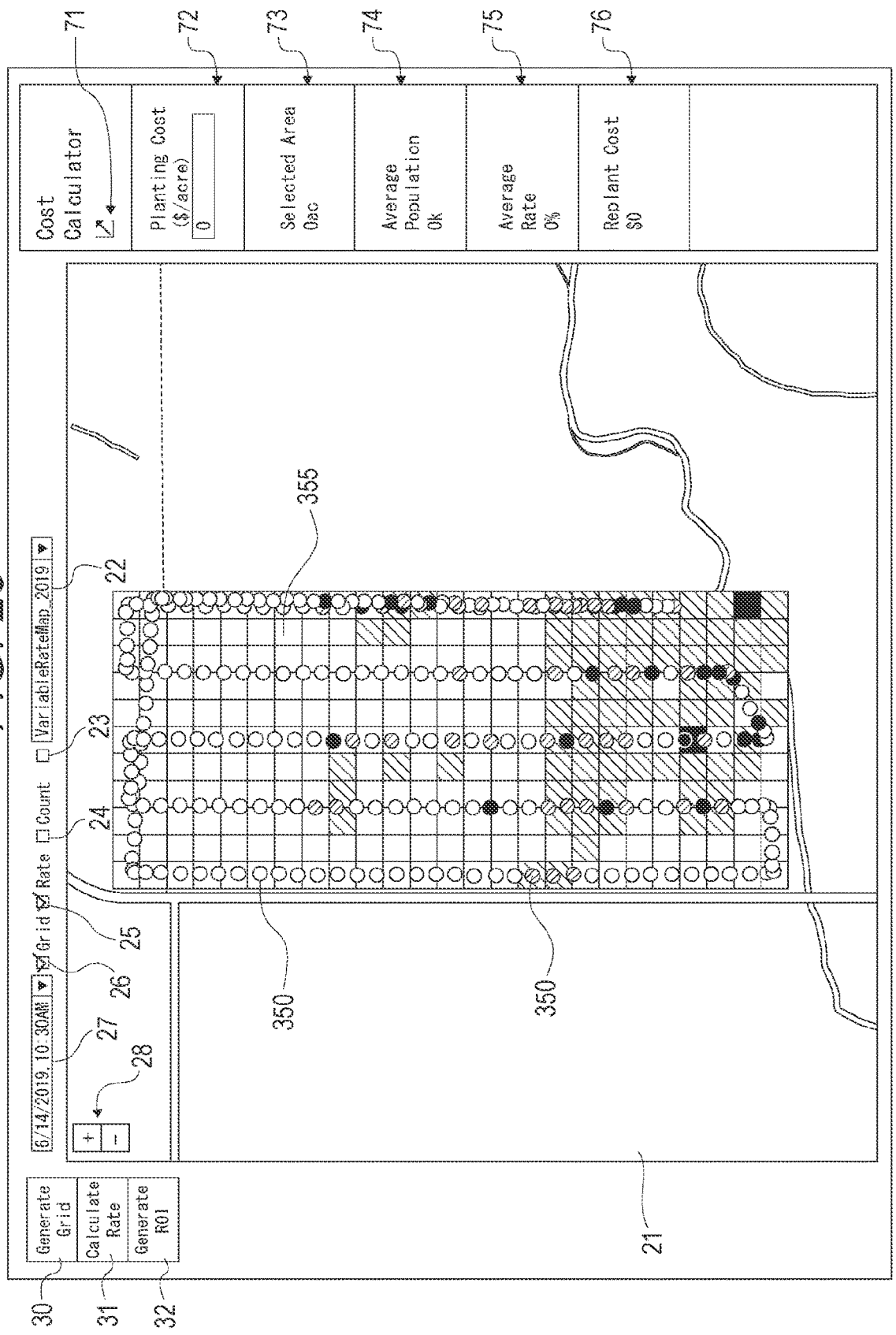
FIG. 20 is an explanatory diagram of display states of the grid and the stand rate according to the embodiment.

FIG. 20 illustrates a case where the user checks on the grid display check box 26 and the rate display check box 25 together.

In this case, in the map region 21, the sample position mark 350 and the grid 355 color-coded according to the stand rate are displayed in an overlapping manner.

This results in an image that allows the user to easily understand the relationship between each area defined by the grid 355 and the sample position.

Figure 21:
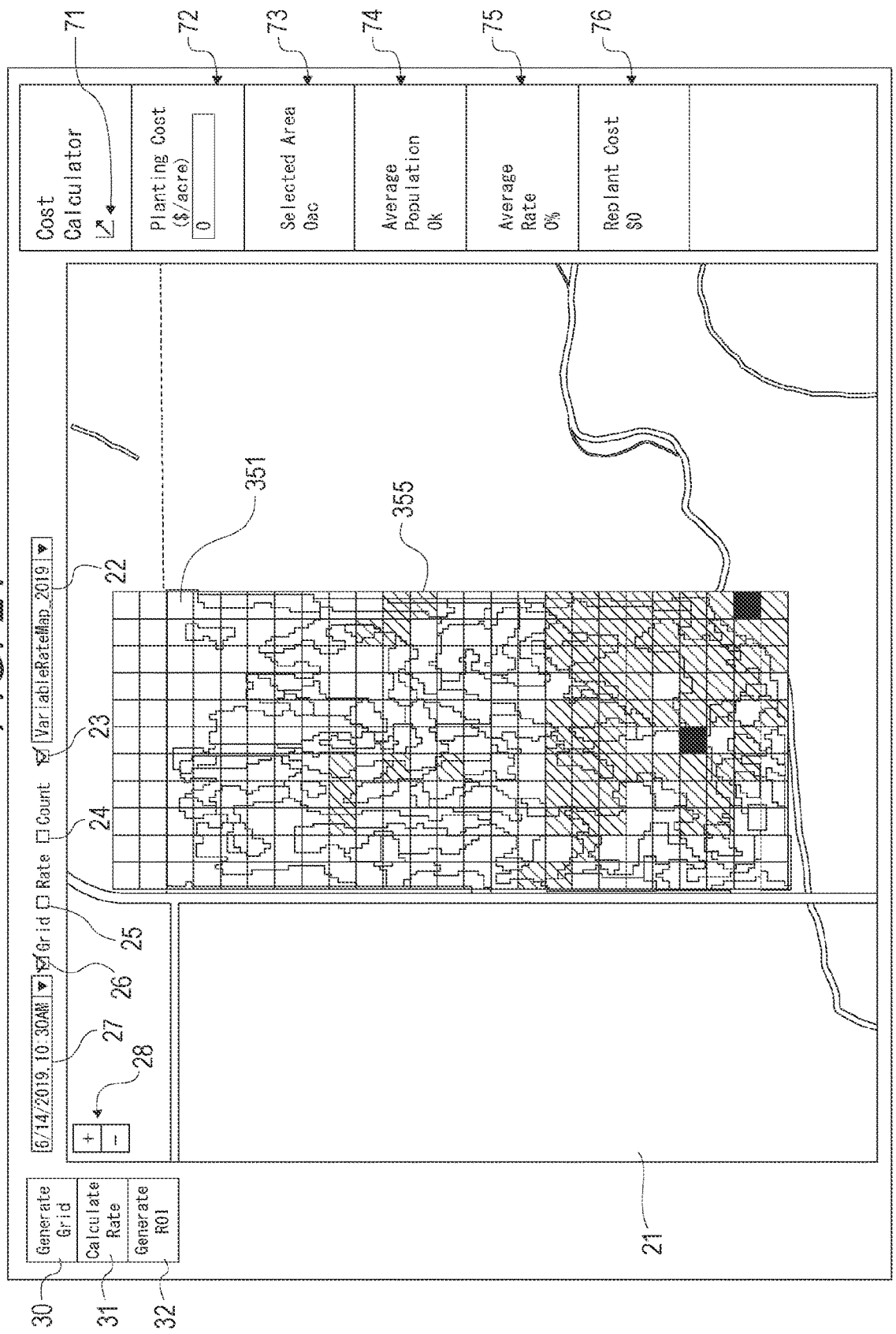
FIG. 21 is an explanatory diagram of display states of the grid and the rate map according to the embodiment.

FIG. 21 illustrates a case where the user checks on the grid display check box 26 and the map display check box 23 together.

In this case, the selected rate map (for example, the instruction rate map 351) is displayed in the map region 21, and the grid 355 is further superimposed and displayed.

This results in an image that allows the user to simultaneously check a population scheduled for each district and an area defined by the grid 355.

Figure 22:
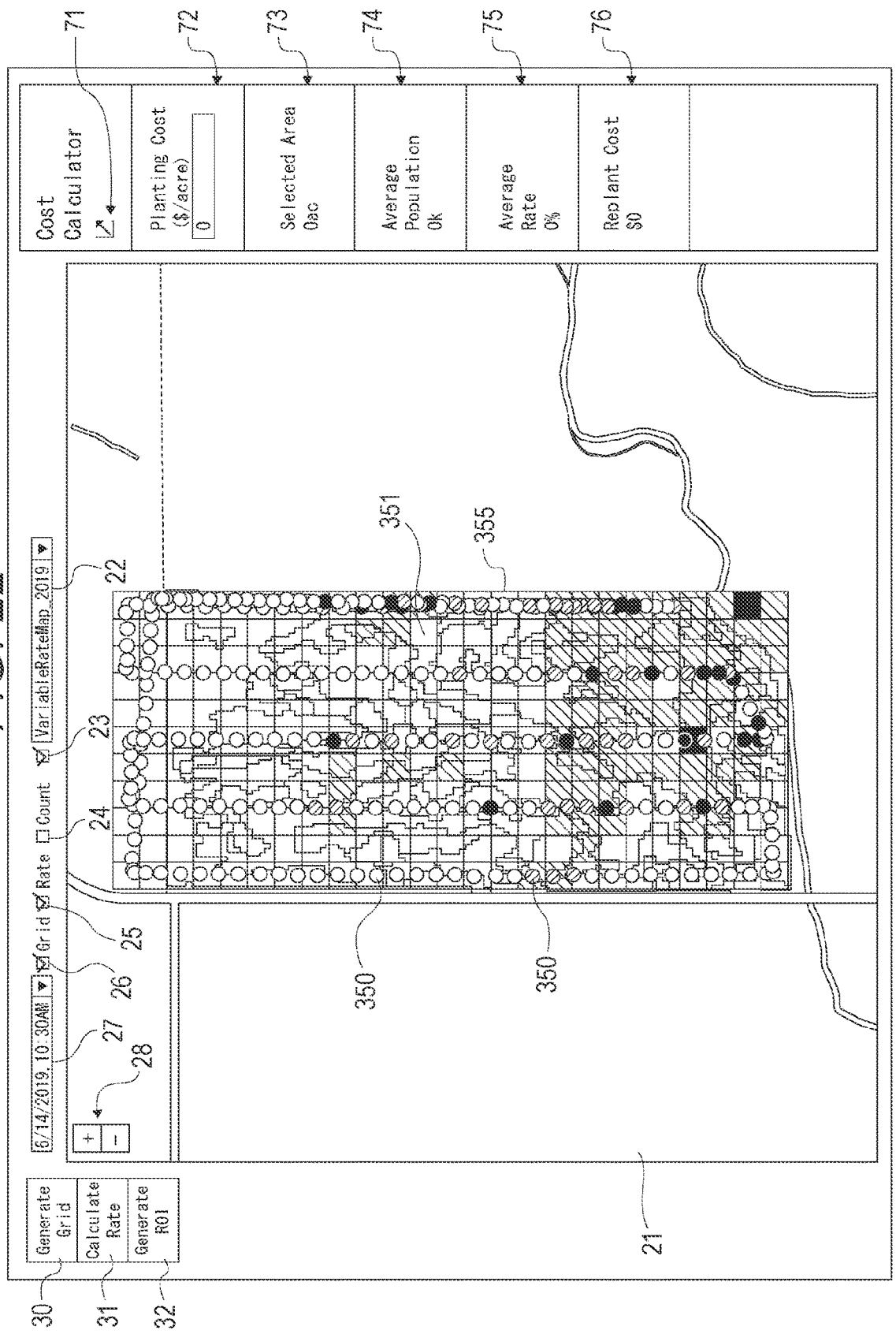
FIG. 22 is an explanatory diagram of display states of the grid, the stand rate, and the rate map image according to the embodiment.

FIG. 22 illustrates a case where the user has checked on the grid display check box 26, the map display check box 23, and the rate display check box 25 together.

In this case, in the map region 21, the selected rate map (for example, the instruction rate map 351) is displayed, the grid 355 is displayed in an overlapping manner, and the sample position mark 350 color-coded according to the stand rate is displayed in an overlapping manner.

This results in an image that allows the user to simultaneously check the population scheduled for each district, the area defined by the grid 355, and the sample position.

Note that, although not illustrated, in a case where the user checks on all of the grid display check box 26, the map display check box 23, and the count display check box 24 together, the rate map, the grid 355, and the sample position mark 350 color-coded by population are displayed in an overlapping manner.

Furthermore, in a case where the user checks on the grid display check box 26 and the count display check box 24 together, the grid 355 and the sample position mark 350 color-coded by population are displayed in an overlapping manner.

Furthermore, in each case, both the count display check box 24 and the rate display check box 25 can be checked on, and in this case, the sample position mark 350 has a color corresponding to either the stand rate or the population.

Alternatively, checking on of the count display check box 24 and the rate display check box 25 simultaneously may be prohibited.

As described above, the grid 355 is used for an operation of designating an area for which the replanting is performed.

Figure 23:
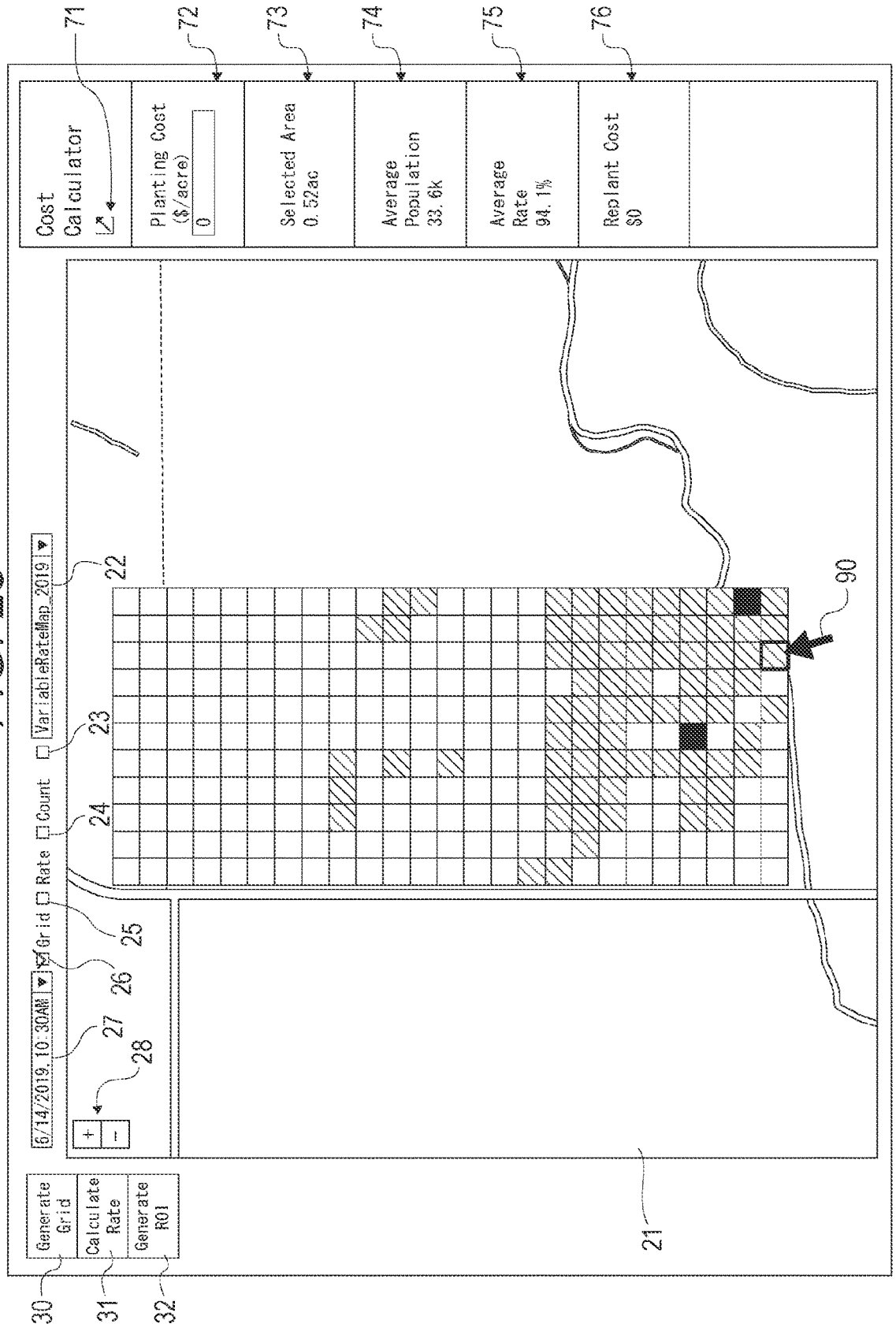
FIG. 23 is an explanatory diagram of area designation by frame selection on the grid according to the embodiment.

FIG. 23 illustrates an operation of designating a replant candidate area using the grid 355. For example, by clicking one area with the cursor 90 by the user, or the like, one replant candidate area is selected. In this case, as illustrated in the diagram, for example, it is indicated that the square of the area becomes a selected state by becoming a thick line or the like. Of course, the selected state may be indicated by changing the color or highlighting.

Figure 24:
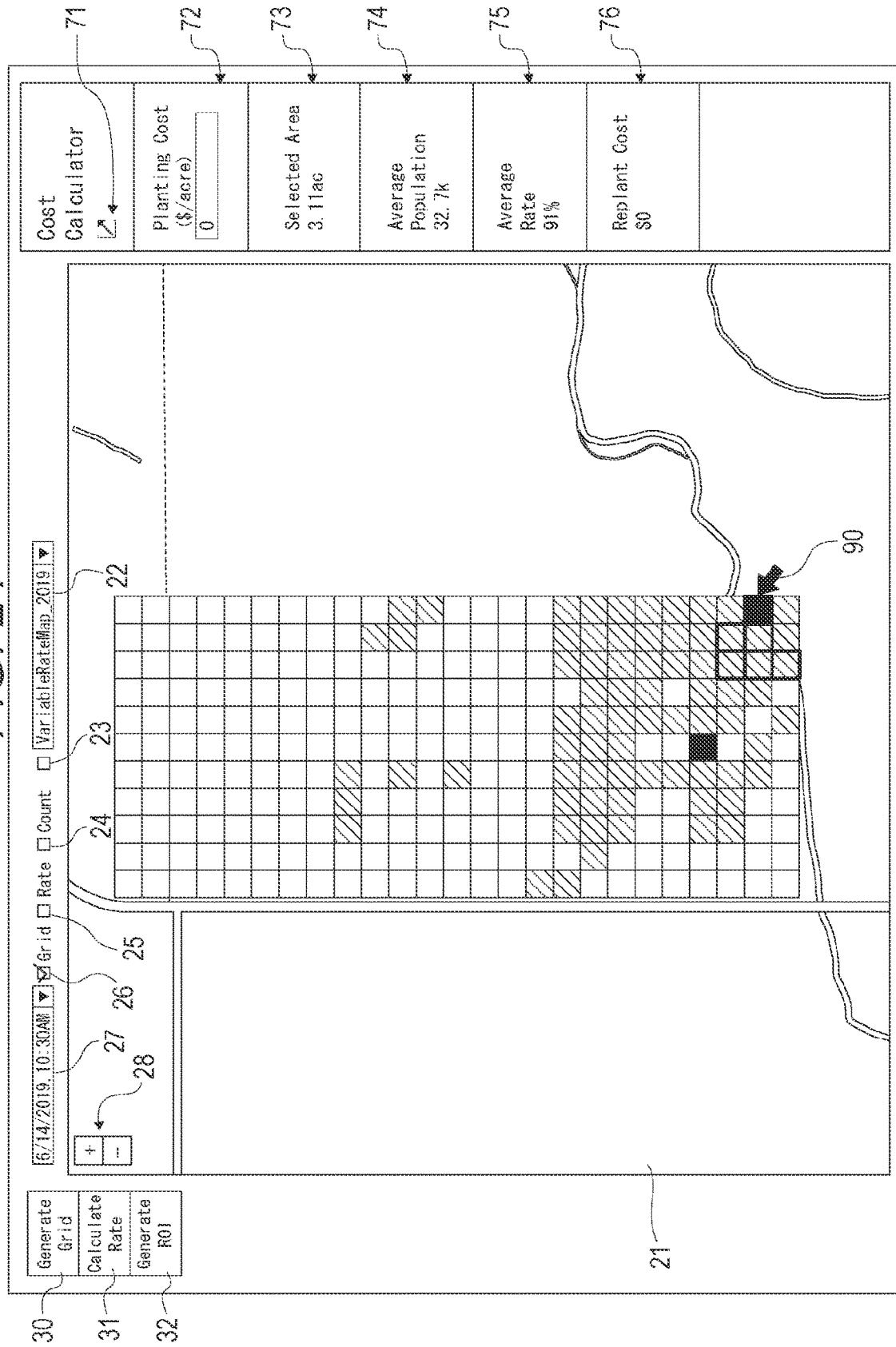
FIG. 24 is an explanatory diagram of area designation by frame selection on the grid according to the embodiment.

FIG. 24 illustrates an example in which neighboring areas are sequentially brought into a selected state by clicking or the like.

In this manner, the user can arbitrarily select an area and set the selected area as a replant candidate area.

Figure 25:
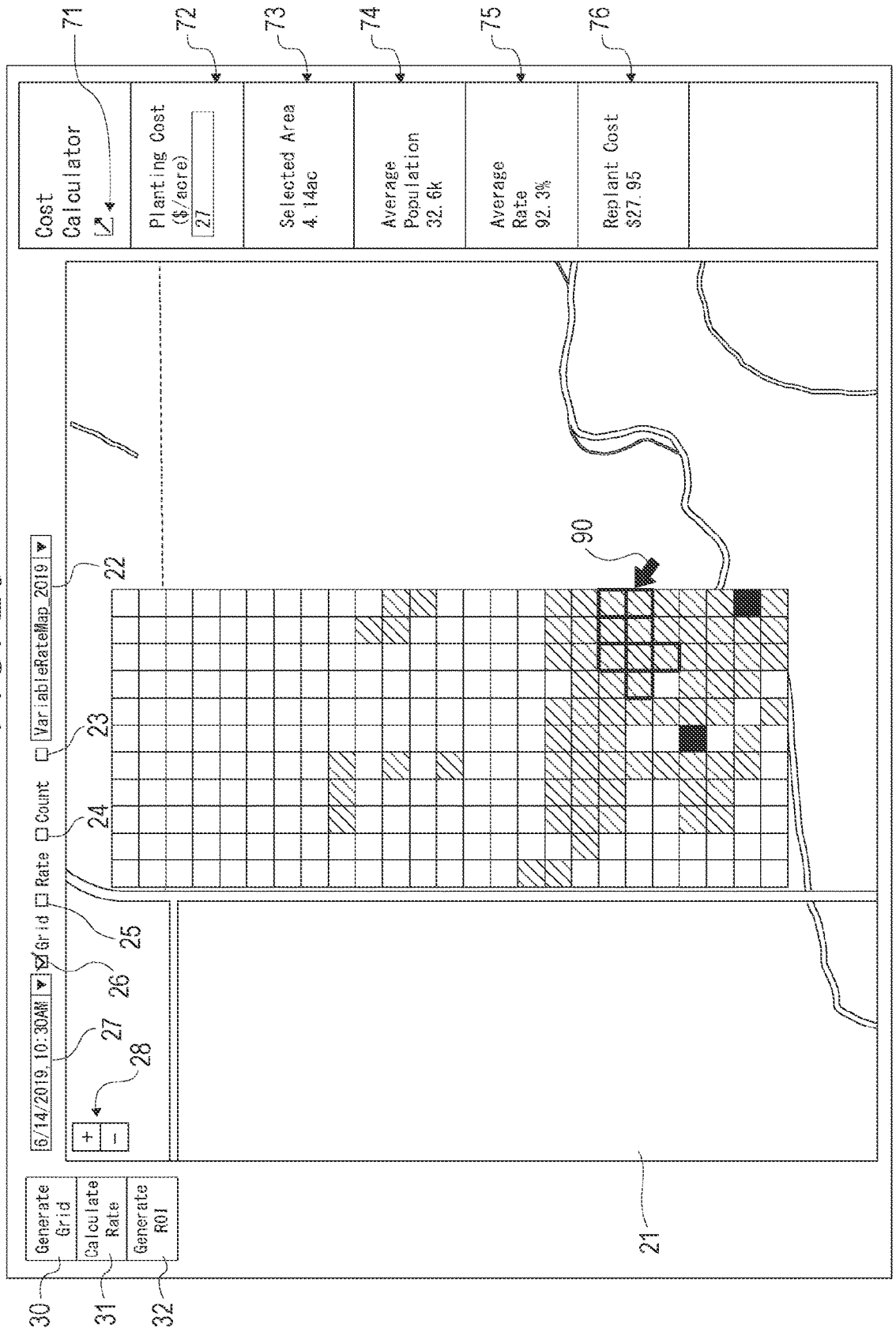
FIG. 25 is an explanatory diagram of an area designation state on a grid according to the embodiment.

FIG. 25 illustrates a state in which the user selects other eight areas as the replant candidate areas.

In a state where one or more areas are selected, specific numerical values are displayed on the selected area display section 73, the average population display section 74, the average stand rate display section 75, and the replant cost display section 76 in accordance with the area selection.

For example, as illustrated in FIG. 23, in a state where one area is selected, numerical values are displayed on the selected area display section 73, the average population display section 74, and the average stand rate display section 75, respectively, according to the selected state. That is, the area in the selected state is displayed on the selected area display section 73, the average population value of the area in the selected state is displayed on the average population display section 74, and the average stand rate of the area in the selected state is displayed on the average stand rate display section 75.

When a plurality of areas is selected as illustrated in FIG. 24, these numerical values are values corresponding to the plurality of areas.

Furthermore, the planning cost display section 72 allows the user to input a replant cost per unit area, for example, one acre.

In the replant cost display section 76, for example, as illustrated in FIG. 25, the replant cost according to the area of the area in the selected state is displayed with reference to the replant cost per acre.

As in the display examples of FIGS. 23, 24, and 25, the total area, the average population, and the average stand rate of the replant candidate areas are displayed and the cost is displayed according to area selection by the user, thereby enabling the user to select an area while checking the cost and the like.

Furthermore, in a case where the calculation button 71 is operated, a predetermined calculation window (not illustrated) is displayed, and various conditions such as a region, date and time, a current population, and a target population can be input to give an instruction on calculation execution. Consequently, whether or not to perform the replanting is calculated, and a determination result is displayed.

The user can determine execution of replanting with reference to such a display.

The ROI generation button 32 is a button to be operated by the user when determining the replant candidate area as an area for which the replanting is performed.

For example, in a case where the user desires to perform the replanting in a state where the replant candidate area is selected as illustrated in FIG. 25, the user operates the ROI generation button 32. Consequently, one or a plurality of areas determined as the replant candidate areas is determined as areas for which the replanting is performed, and an instruction file therefor is generated.

Thereafter, the instruction file generated by the information processing device 1 is exported and delivered to the tractor 270, so that the tractor 270 can perform the replant operation.

Figure 26:
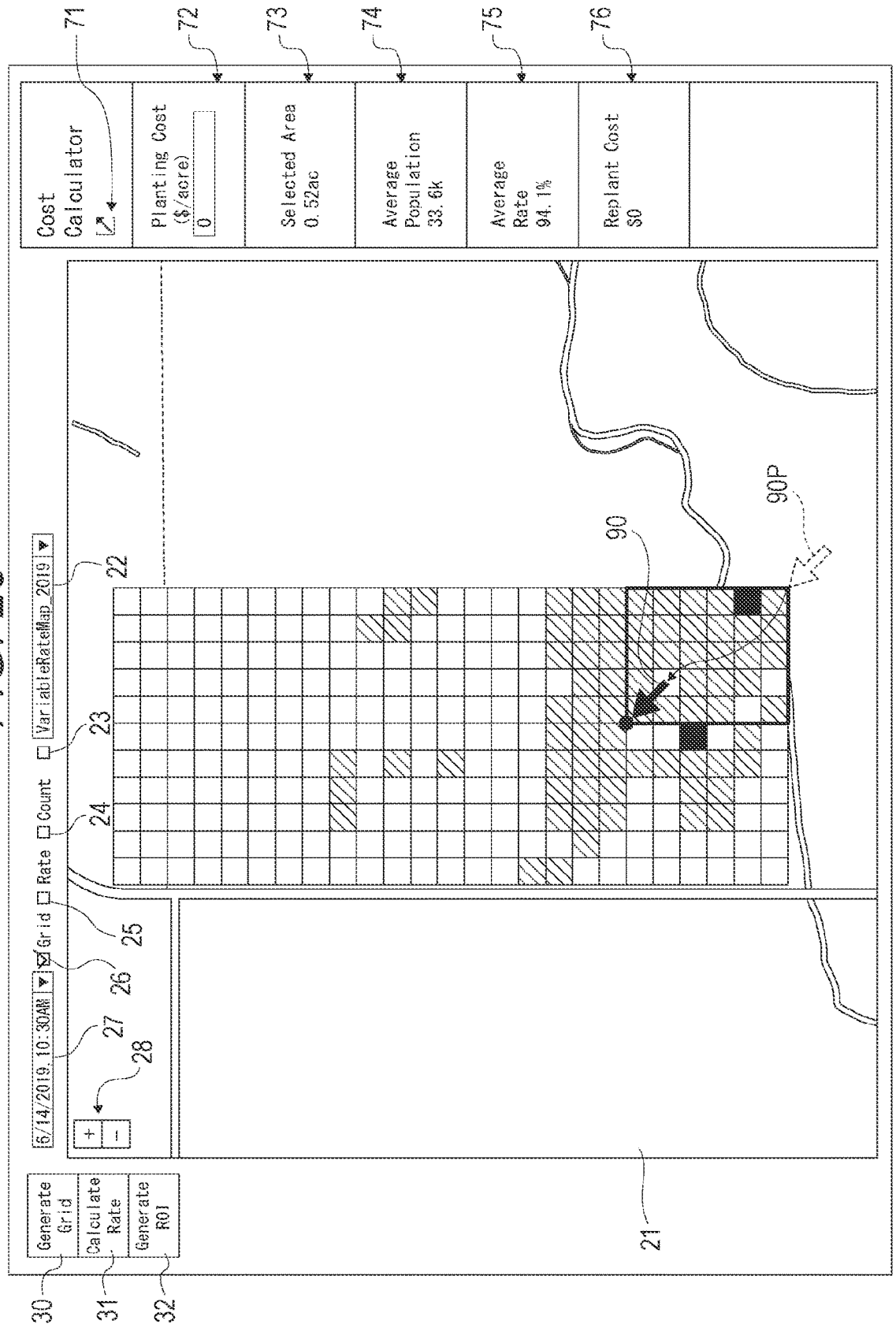
FIG. 26 is an explanatory diagram of area designation by range designation on the grid according to the embodiment.

Note that in the examples of FIGS. 23, 24, and 25, the user performs an operation to select the areas (squares) indicated by the grids 355 one by one, but the areas may be collectively selected by range designation as illustrated in FIG. 26.

For example, a plurality of areas can be designated by a drag operation of the cursor 90 from a position (cursor 90P) of a broken line. In this manner, it is possible to facilitate the operation of selecting the replant candidate area.

Furthermore, an operation method is also conceivable in which a slider, an input frame, or the like is prepared on the UI screen, and the user inputs a stand rate to be a threshold, so that an area having the stand rate equal to or lower than the threshold is selected as a replant candidate area.

5. Preparation Processing of Embodiment

A processing example of the information processing device 1 for implementing the UI screen as described above will be described.

First, preparation processing performed in step S3 of FIG. 5 will be described with reference to FIG. 27.

Figure 27:
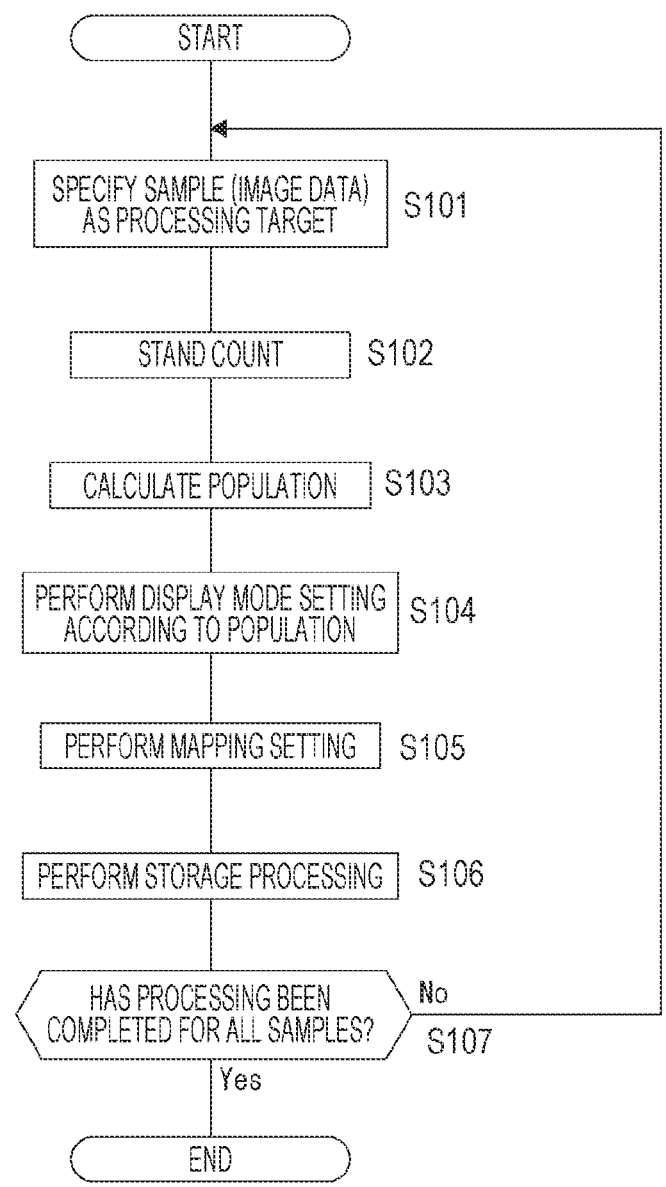
FIG. 27 is a flowchart of preparation processing according to the embodiment.

FIG. 27 illustrates processing executed by the CPU 51 of the information processing device 1 for each sample after capturing image data as the sample. This processing is implemented by the CPU 51 having the function illustrated in FIG. 4, mainly the function as the calculation unit 5.

In step S101, the CPU 51 specifies image data as a processing target. That is, one of images aerially captured by the imaging device 220 mounted on the flying object 200 is specified as a processing target. The image data in this case may be color image data by the RGB (red, green, blue) camera or image data as IR (near infrared) data and R (red) data. The image data may be the above-described NDVI image data obtained from IR (near infrared) data and R (red) data.

In step S102, the CPU 51 performs processing of calculating the number of stands for the image data as a processing target. That is, a crop portion is detected from the image, and the number of the crops is counted.

Although various methods for calculating the number of stands can be considered, for example, it is preferable to detect the row 301 in the image and detect plants growing on the row 301. Furthermore, the crops are arranged at intervals determined to some extent on the row 301, and thus it is desirable to count in consideration of the intervals. By performing such counting, the number of stands can be counted with relatively high accuracy regardless of weeds or the like.

Note that in the counting processing of the number of stands, a portion determined as a crop is detected from the image, and the portion is counted. For example, G pixel detection is assumed as a detection method in a case where an image captured by the RGB camera is used.

Since the crop mainly includes leaves, and the leaves are generally green, a green region is detected from the RGB color image. For the detection of the green region, for example, it is only required to compare each of RGB components in a certain pixel in the image, and detect only a pixel having a highest G (green).

Alternatively, RGB is converted into spaces of lightness, saturation, and hue such as HSV. Then, by providing a region having a width in green of the hue value, a pixel having a hue in the region may be detected.

Furthermore, as a detection method in a case of using an image obtained by capturing an image of near-infrared light and red light, there is a threshold detection method for an NDVI image.

NDVI, which is an index indicating the distribution of crops (plants), is calculated from near-infrared and red and takes a value range of ±1, and crops have a high NDVI value, and soils and the like have low NDVI. Thus, an NDVI image may be created from the IR data and the R data, and it is only required to detect and count pixels of the crop portion by threshold processing.

Note that in a case where the NDVI image already exists, it is only required to detect the pixels of the crop portion by threshold processing.

Plants can be detected by these G pixel detection and NDVI threshold detection, and then, by considering the detection of rows 301 and the planting interval of crops as described above, counting excluding weeds becomes possible.

After counting the number of stands, the CPU 51 calculates the population in step S103. In this case, the CPU 51 obtains the area of an image capturing range of an image as a processing target. The area can be calculated from altitude information of the flying object 200 at the time of image capturing and information of the angle of view of the imaging device 220. After obtaining the area of the image capturing range, a ratio to the unit area is obtained, and the population is calculated by multiplying the number of stands by the ratio. Of course, the unit area may be calculated from the ratio between a specific length on the image and an actual length using image recognition.

As Described Above

In step S104, the CPU 51 performs display mode setting according to the population value. This is processing of setting the color of the sample position mark 350 at the time of population display as illustrated in FIG. 9 for the image data as the processing target.

In step S105, the CPU 51 performs mapping setting. That is, latitude and longitude information is read from the tag information attached to the image data, and is set as a position to display the sample position mark 350 in the map region 21.

In step S106, the CPU 51 performs storage processing. That is, for the image data as a processing target as one sample, the number of stands, the population value, the color of the sample position mark 350, the setting of the display position, and the like are stored.

Thus, when display is requested on the UI screen described above, the sample position mark 350 can be displayed according to the population.

In step S107, the CPU 51 determines whether or not the above processing has been completed for all samples, and if there is an unprocessed sample, the CPU 51 returns to step S101 and performs similar processing for the unprocessed sample.

When the processing is completed for all the samples, the preparation processing of FIG. 27 is terminated.

Note that the "all samples" mentioned here may be all pieces of image data obtained by image capturing in one flight, or may be all the necessary samples selected in advance. For example, unnecessary image data may be captured at the start or end of a jump, or the user may go out of the farm field 300 in the course of a flight. It is not necessary to perform the processing of FIG. 27 even on the image data in such a case.

By performing the preparation processing of FIG. 27, the sample position mark 350 for each sample can be displayed in a color corresponding to the population in the map region 21.

6. User Interface Processing of First Embodiment

Next, UI processing performed by the information processing device 1 will be described with reference to FIGS. 28, 29, 30, 31, 32, 33, 34, 35A, 35B, and 35C.

FIGS. 28, 29, 30, 31, and 32 illustrate UI processing performed by the CPU 51 by the functions of the UI control unit 6 and processing performed by the functions of the calculation unit 5, the file generation unit 9, the recording control unit 7, and the communication control unit 8 in the process in a divided manner. In each drawing, a connection of the flowcharts is indicated by symbols "c1" to "c5".

Then, the UI processing illustrated in FIGS. 28 to 32 is processing performed in steps S4 to SS6 in FIG. 5, and is processing for achieving display of the UI screen and response to the user operation as described with reference to FIGS. 6 to 27.

Figure 28:
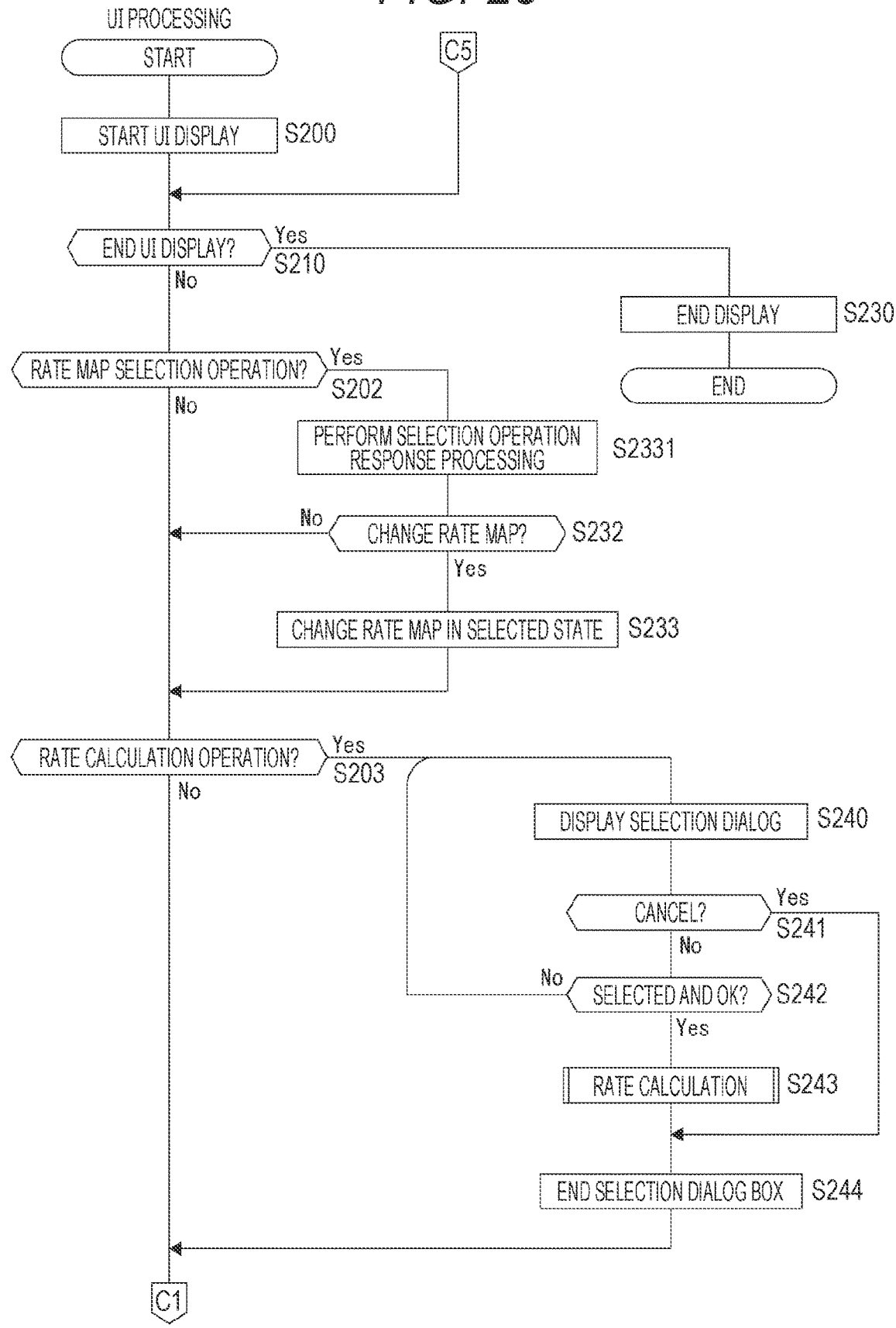
FIG. 28 is a flowchart of user interface processing according to the first embodiment.

The information processing device 1 starts display of the UI image in step S200 of FIG. 28. For example, the CPU 51 causes the display unit 56 or the like to execute the display illustrated in FIG. 6.

Note that, at the point of start of display of the UI image, display may be performed according to the on-off state or the like of the check box at the time of the previous UI image display.

Figure 32:
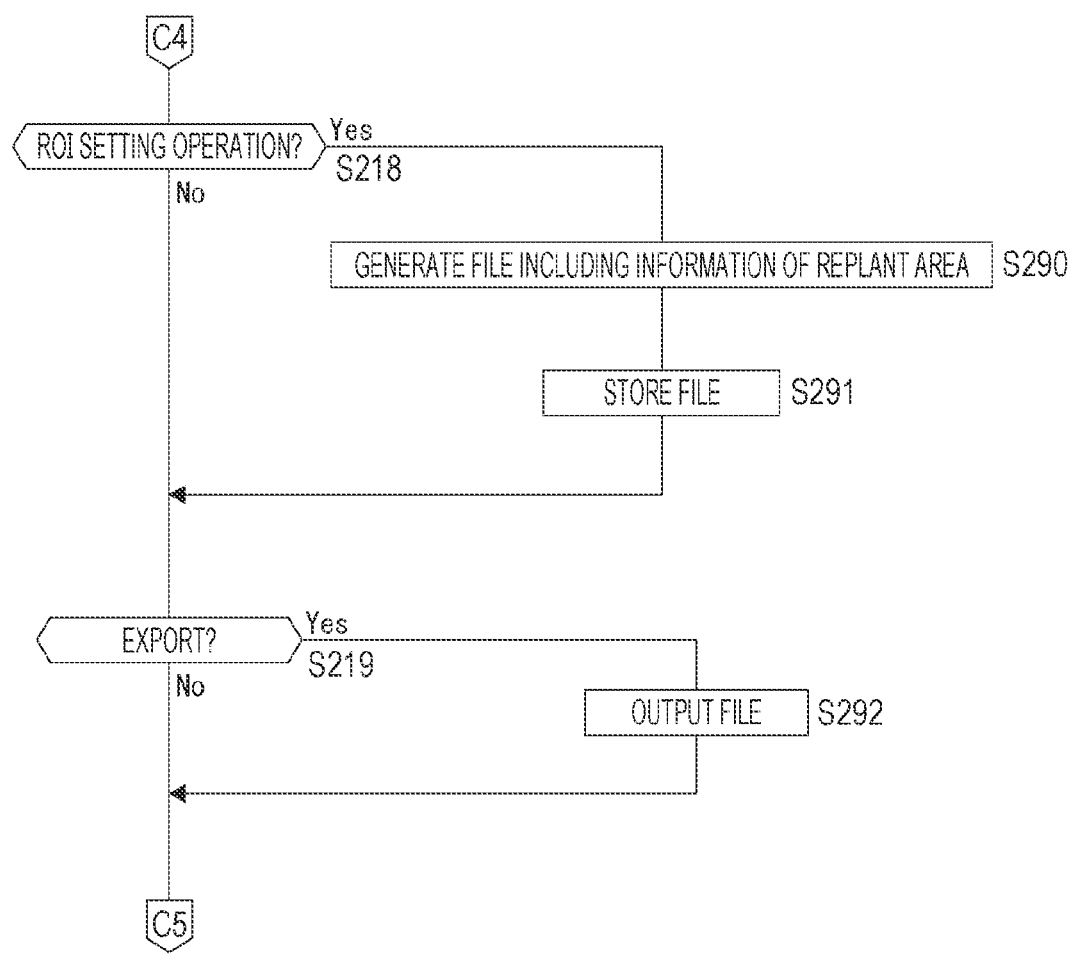
FIG. 32 is a flowchart of the user interface processing according to the first embodiment.

The CPU 51 repeatedly executes monitoring processes from step S201 to step S219 in FIG. 32 during display control of the UI image. Hereinafter, the respective monitoring processes from step S201 in FIG. 28 to step S219 in FIG. 32 will be collectively referred to as a "monitoring loop".

In step S201 of FIG. 28, the CPU 51 determines the end of the UI display. For example, the CPU 51 determines that the UI display is ended in response to an end operation by the user or occurrence of some end trigger, performs display end processing of the UI image in step S230, and ends the series of UI control processing.

In step S202, the CPU 51 monitors a rate map selection operation. Upon detecting that the user has operated the map selection section 22, the CPU 51 proceeds from step S202 to step S231 and performs processing responding to the selection operation. For example, pull-down menu display in the map selection section 22 and detection of a selection operation are performed. Then, in a case where an operation of changing the rate map from the current state by the user is detected, the CPU 51 proceeds from step S232 to step S233 and performs processing of changing the rate map in the selected state. For example, the instruction rate map 351 that has been in the selected state is switched to the selected state of the actual result rate map 352.

Even if the user performs an operation of the pull-down menu display, or the like, in a case where the rate map change instruction is not performed at last, the CPU 51 returns from step S232 to the monitoring loop.

In step S203, the CPU 51 monitors an operation of the rate calculation button 31. Upon detecting that the user has operated the rate calculation button 31, the CPU 51 proceeds from step S203 to step S240 and performs display control of the selection dialog 34 as illustrated in FIG. 11.

In a case where it is detected that the user has performed the cancel operation on the selection dialog 34, the CPU 51 proceeds from step S241 to step S244, terminates the selection dialog 34, and returns to the monitoring loop.

Upon detecting that the user has selected a rate map as a reference and then performed an OK operation on the selection dialog 34, the CPU 51 proceeds from step S242 to step S243 and performs rate calculation processing.

Figure 33:
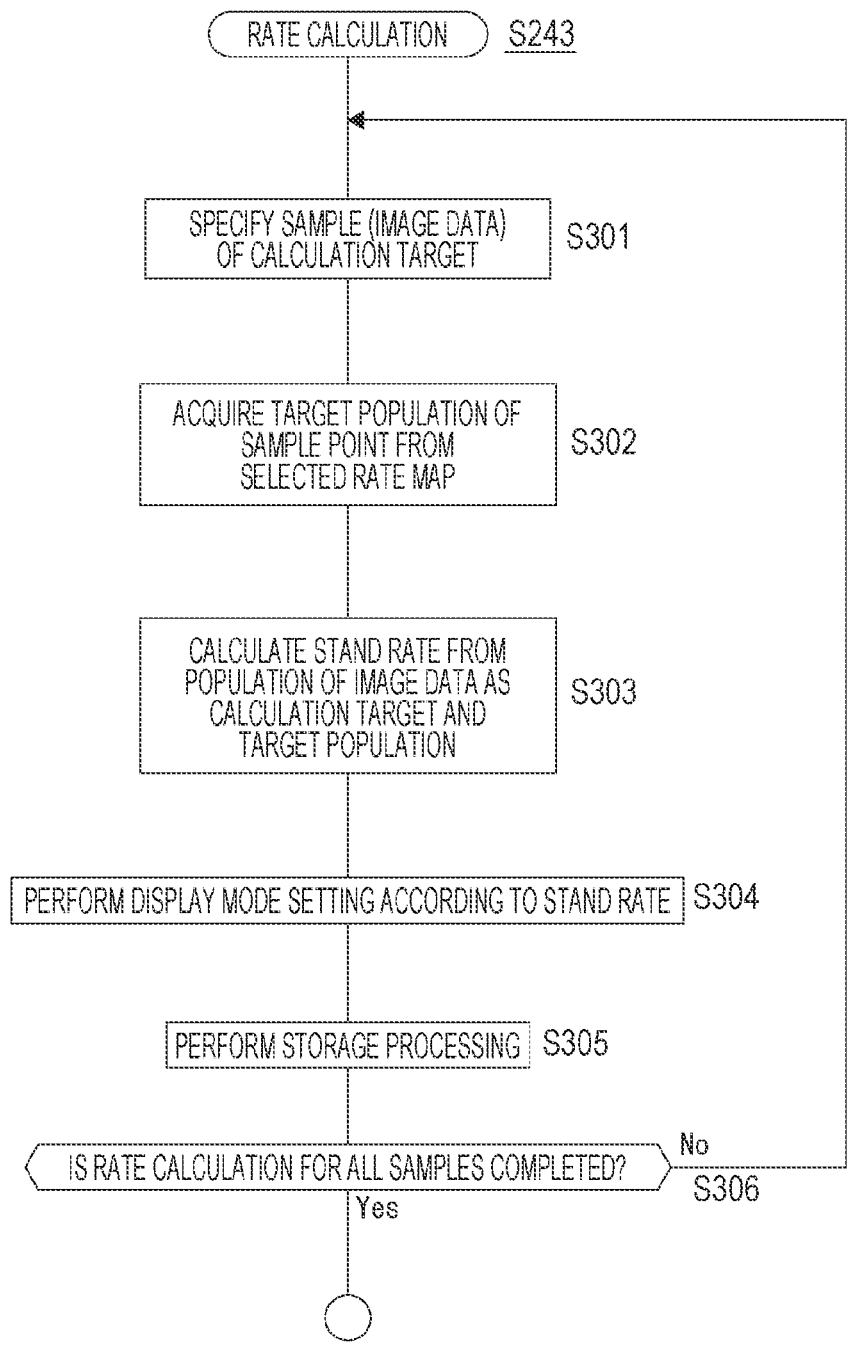
FIG. 33 is a flowchart of rate calculation processing according to the embodiment.

This rate calculation processing is a process of obtaining a stand rate for each sample. An example of the rate calculation processing is illustrated in FIG. 33.

In step S301, the CPU 51 specifies a sample as a calculation target (image data). This is processing of specifying one of the samples displayed as the sample position mark 350 as a target of calculation processing.

In step S302, the CPU 51 acquires a value of population corresponding to a position of the sample as the calculation target from the rate map (for example, either the instruction rate map 351 or the actual result rate map 352) currently selected, and sets the value as a target population. That is, it is a population scheduled at the place of the sample.

In step S303, the CPU 51 obtains the stand rate from the population obtained in the preparation processing for the sample as the calculation target and the value of the target population.

In step S304, the CPU 51 performs display mode setting according to the value of the stand rate. This is processing of setting a color of the sample position mark 350 at the time of rate display for the image data as the processing target.

In step S305, the CPU 51 performs storage processing. That is, for the image data as the calculation target as one sample, the value of the stand rate, setting of the color of the sample position mark 350 at the time of rate display, and the like are stored.

In step S306, the CPU 51 determines whether or not the above processing has been completed for all the samples to be calculated, and if there is an unprocessed sample, the CPU 51 returns to step S301 and performs similar processing for the unprocessed sample.

When the processing is completed for all the necessary samples, the rate calculation processing of FIG. 33 ends.

At this point, the sample position mark 350 can be displayed in a color corresponding to the stand rate for each sample. That is, when the rate display as illustrated in FIG. 10 is required on the UI screen described above, the sample position mark 350 according to the stand rate can be displayed.

After performing the above rate calculation processing in step S243 of FIG. 28, the CPU 51 proceeds to step S244, terminates the selection dialog 34, and returns to the monitoring loop.

Figure 29:
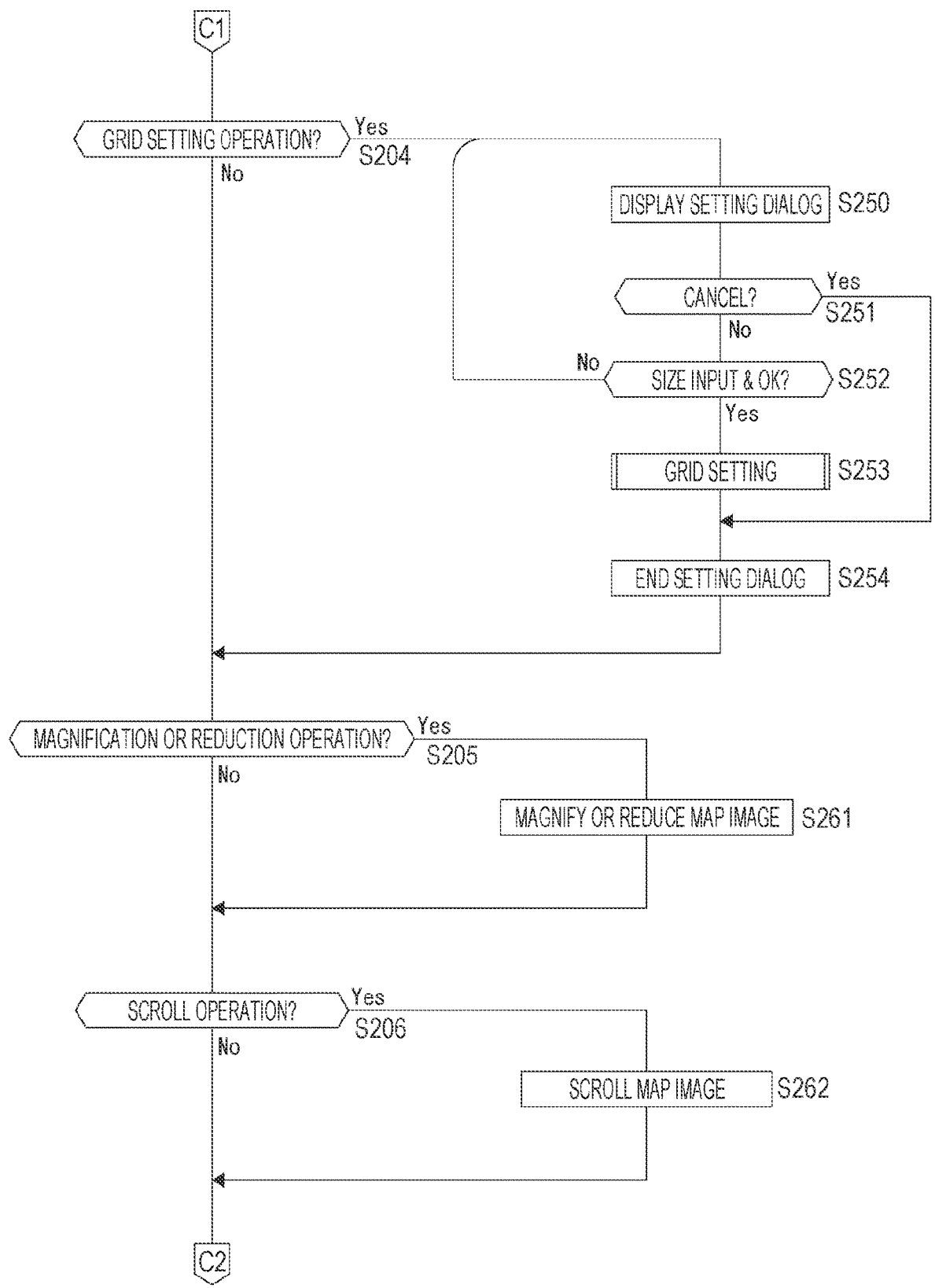
FIG. 29 is a flowchart of the user interface processing according to the first embodiment.

In step S204 of FIG. 29, the CPU 51 monitors an operation of the grid generation button 30. Upon detecting that the user has operated the grid generation button 30, the CPU 51 proceeds from step S204 to step S250 and performs display control of the setting dialog 33 as in FIG. 19.

In a case where it is detected that the user has performed the cancel operation on the setting dialog 33, the CPU 51 proceeds from step S251 to step S254, terminates the setting dialog 33, and returns to the monitoring loop.

Upon detecting that the user has selected or input the value of the size of the grid in the setting dialog 33 and then performed the OK operation, the CPU 51 proceeds from step S252 to step S253 and performs grid setting processing.

Figure 34:
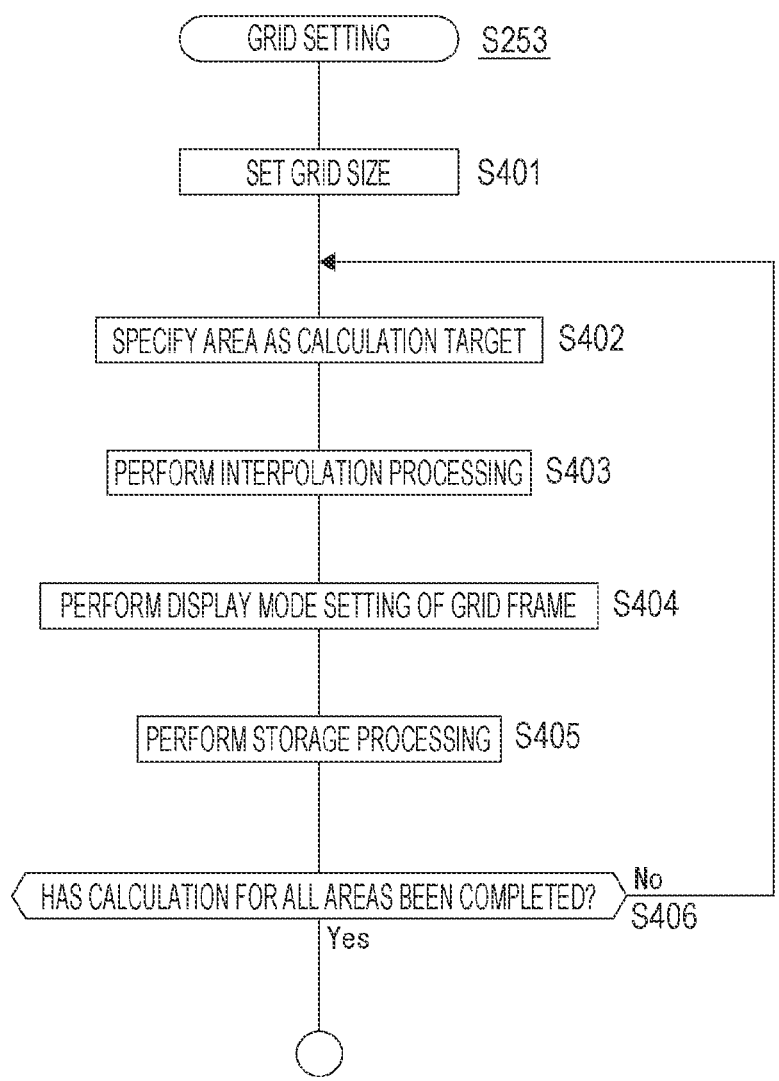
FIG. 34 is a flowchart of grid setting processing according to the embodiment.

This grid setting processing is processing of setting the size of the square of the grid 355, setting each area obtained by dividing the farm field 300, and obtaining the stand rate of each area. An example of the grid setting processing is illustrated in FIG. 34.

In step S401, the CPU 51 sets the grid size. That is, the size of the grid is set according to the user input on the setting dialog 33.

In step S402, the CPU 51 specifies an area as a calculation target. The area is indicated by one square of the grid 355. A plurality of squares is set by the grid as the grid 355, and one of the squares is specified as a calculation target.

In step S403, the CPU 51 calculates the stand rate of an area as a calculation target (square of the grid 355) by interpolation processing.

For this calculation, for example, an inverse distance weighting method using samples related to an area can be used.

That is, the rate of the area as a calculation target is calculated by the inverse distance weighting method using the stand rate for the image data related to the area.

Several examples are conceivable for sample collection and calculation used in the inverse distance weighting method.

As a first example, it is conceivable to use, as a sample (image data) related to one area as a calculation target, image data obtained by capturing an image within a predetermined distance from a center point of the area.

Figure 35C:
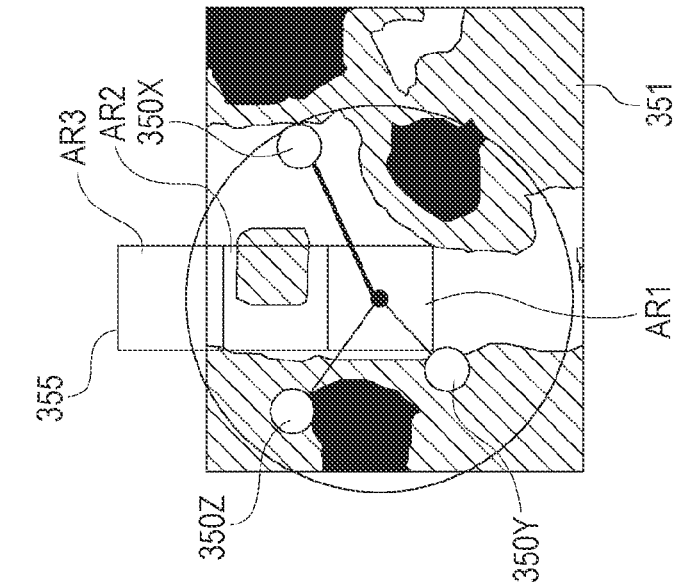
FIGS. 35A, 35B, and 35C are explanatory diagrams of a data interpolation method according to the embodiment.
Figure 35B:
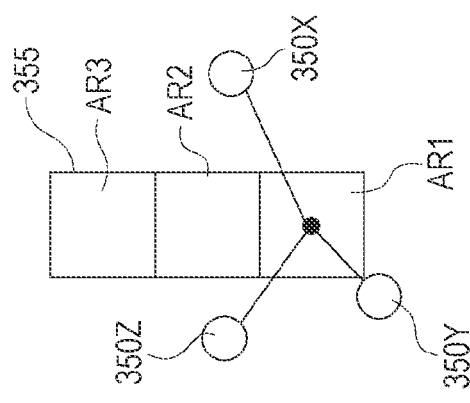
Figure 35A:
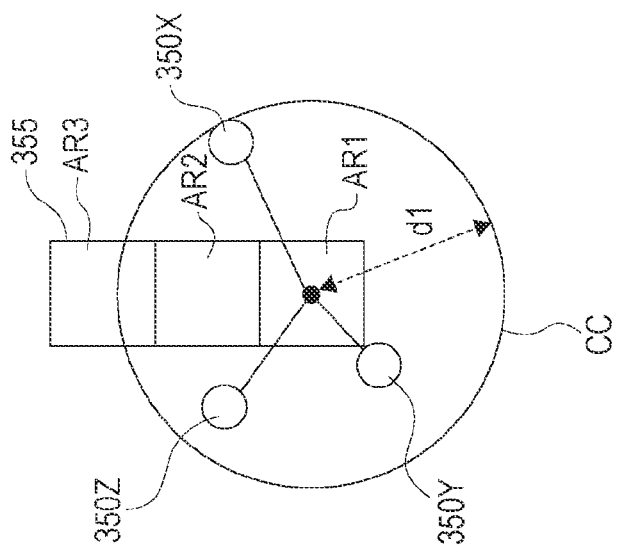

FIG. 35A illustrates three areas AR1, AR2, and AR3 as areas defined by the grid 355. Now, it is assumed that the area AR1 is a calculation target of the stand rate.

The range of a distance dl from a center point of the area AR1 is indicated by a circle CC. Surrounding respective samples are indicated by sample position marks 350X, 350Y, and 350Z.

The samples in the circle CC indicated by the sample position marks 350X, 350Y, and 350Z are samples related to the area AR1 as a calculation target. The stand rate of the area AR1 is calculated using the stand rates of these samples.

As a second example, it is conceivable to use, as a sample (image data) related to one area as a calculation target, a predetermined number (for example, three) of pieces of image data in order from one that is closest to the center point of the area.

FIG. 35B illustrates three samples (sample position marks 350X, 350Y, and 350Z) in order of decreasing distance from the center point of the area AR1 as a calculation target. The stand rate of the area AR1 is calculated using the stand rates of these samples.

A third example uses samples according to the first example and the second example, but is an example of weighting a specific sample.

That is, an interpolation calculation is performed by weighting a rate for image data obtained by capturing an image of a region having the same number of planting instructions or actual result number of plantings as one area among image data related to the one area as the calculation target.

In FIG. 35C, for example, the instruction rate map 351 is superimposed on the image of FIG. 35B. Here, the area AR1 and the sample indicated by the sample position mark 350X have the same number of planting instructions indicated by the instruction rate map 351.

Therefore, the stand rate of each sample indicated by the sample position marks 350X, 350Y, and 350Z is used, but the stand rate of the sample of the sample position mark 350X is weighted to calculate the stand rate of the area AR1.

In step S403 of FIG. 34, the CPU 51 performs interpolation calculation in the above example, and calculates the stand rate for the target area by the inverse distance weighting method.

In step S404, the CPU 51 performs display mode setting according to the calculated value of the stand rate. This is a process of setting the color of the calculation target area when the grid 355 is displayed.

In step S405, the CPU 51 performs storage processing. That is, the grid size, the setting of color of the area as a calculation target, and the like are stored.

In step S406, the CPU 51 determines whether or not the stand rate calculation has been completed for all the areas to be calculated, and if there is an uncalculated area, the CPU 51 returns to step S402 and performs similar processing for the unprocessed area.

When the processing is completed for all the areas of the grid 355, the grid setting processing of FIG. 34 is ended. At this point, it is possible to display the grids 355 color-coded for each area as illustrated in FIG. 18.

After performing the grid setting processing described above in step S253 of FIG. 29, the CPU 51 proceeds to step S254, terminates the setting dialog 33, and returns to the monitoring loop.

In step S205, the CPU 51 monitors a magnification or reduction operation by the magnification and reduction button 28. Upon detecting that the user has performed the magnification operation or the reduction operation, the CPU 51 proceeds from step S205 to step S261, and controls magnification or reduction of the display of the map image in the map region 21. Then, the processing returns to the monitoring loop.

Note that, in a case where the rate map, the sample position mark 350, or the grid 355 is displayed on the map image in the map region 21, these are also magnified or reduced in accordance with the map image.

In step S206, the CPU 51 monitors an operation of scrolling the map, such as a drag operation on the map region 21. Upon detecting that the user has performed the scrolling operation, the CPU 51 proceeds from step S206 to step S262, and scrolls the map image in the map region 21. Then, the processing returns to the monitoring loop.

Note that, in a case where the rate map, the sample position mark 350, or the grid 355 is displayed on the map image in the map region 21, these are also moved in accordance with the map image.

Figure 30:
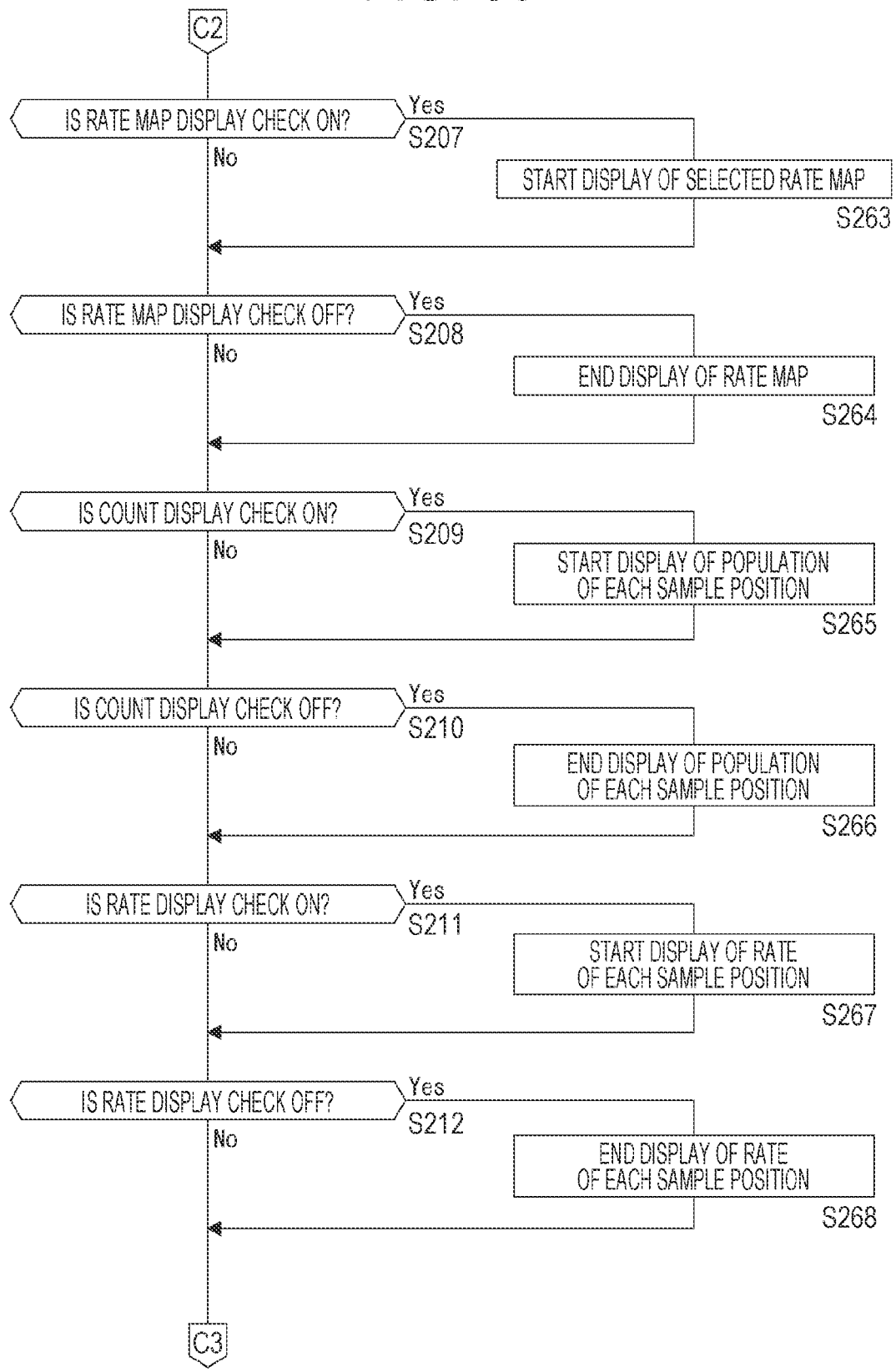
FIG. 30 is a flowchart of the user interface processing according to the first embodiment.

In step S207 of FIG. 30, the CPU 51 monitors a check on operation of the map display check box 23. Upon detecting that the user has performed the check on operation, the CPU 51 proceeds from step S207 to step S263, and performs control to display the currently selected rate map (for example, either the instruction rate map 351 or the actual result rate map 352) in the map region 21. Then, the processing returns to the monitoring loop.

In step S208, the CPU 51 monitors a check off operation of the map display check box 23. Upon detecting that the user has performed the check off operation, the CPU 51 proceeds from step S208 to step S264, and performs control to end the display of the rate map on the map region 21. Then, the processing returns to the monitoring loop.

In step S209, the CPU 51 monitors a check on operation of the count display check box 24. Upon detecting that the user has performed the check on operation, the CPU 51 proceeds from step S209 to step S265, and performs control to display the sample position mark 350 whose color is set by population in the map region 21. Then, the processing returns to the monitoring loop.

In step S210, the CPU 51 monitors a check off operation of the count display check box 24. Upon detecting that the user has performed the check off operation, the CPU 51 proceeds from step S210 to step S266, and performs control to end the display of the sample position mark 350 whose color is set by population in the map region 21. Then, the processing returns to the monitoring loop.

In step S211, the CPU 51 monitors a check on operation of the rate display check box 25. Upon detecting that the user has performed the check on operation, the CPU 51 proceeds from step S211 to step S267, and performs control to display the sample position mark 350 whose color is set by stand rate in the map region 21. Then, the processing returns to the monitoring loop.

In step S212, the CPU 51 monitors a check off operation of the rate display check box 25. Upon detecting that the user has performed the check off operation, the CPU 51 proceeds from step S212 to step S268, and performs control to end the display of the sample position mark 350 whose color is set by stand rate in the map region 21. Then, the processing returns to the monitoring loop.

Figure 31:
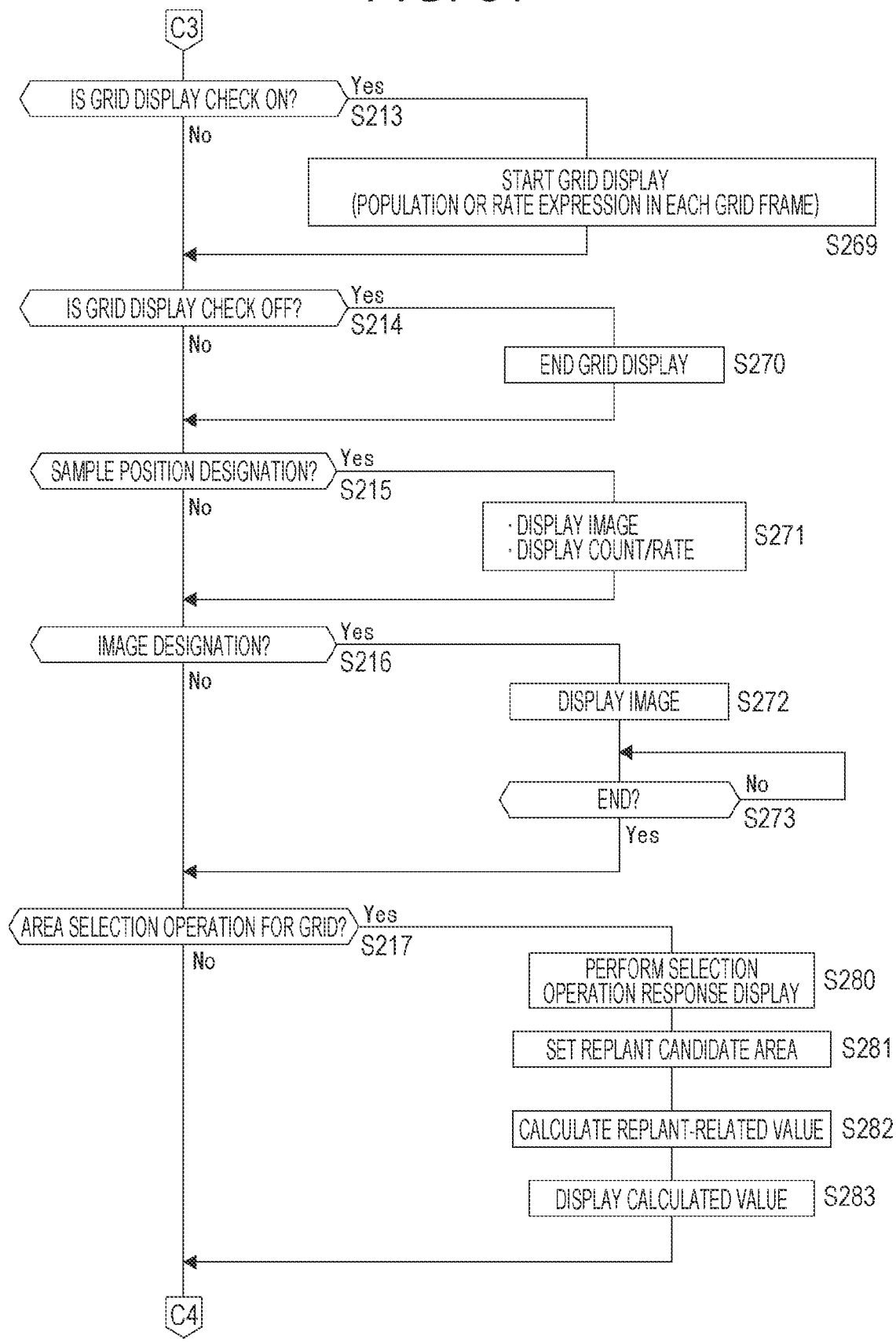
FIG. 31 is a flowchart of the user interface processing according to the first embodiment.

In step S213 of FIG. 31, the CPU 51 monitors a check on operation of the grid display check box 26. Upon detecting that the user has performed the check on operation, the CPU 51 proceeds from step S213 to step S269, and performs control to display the grid 355 in the map region 21. In this case, each area of the grid 355 is displayed with a color being set in the grid setting processing of FIG. 34 described above. Then, the processing returns to the monitoring loop.

Note that in order to display the grid 355, it is necessary to first perform the grid setting processing. Accordingly, even if the user performs a check on operation of the grid display check box 26 before operating the grid generation button 30, it is conceivable to invalidate the check on operation.

In step S214, the CPU 51 monitors a check off operation of the grid display check box 26. Upon detecting that the user has performed the check off operation, the CPU 51 proceeds from step S214 to step S270, and performs control to end the display of the grid 355 in the map region 21. Then, the processing returns to the monitoring loop.

In step S215, the CPU 51 monitors an operation of designating (clicking or the like) one of the displayed sample position marks 350.

Upon detecting an operation to designate a certain sample position mark 350, the CPU 51 proceeds from step S215 to step S271, and performs control to display details of the sample position mark 350. For example, as illustrated in FIGS. 15 and 17, the population display section 35 and the stand rate display section 36 are caused to display detailed numerical values, and an image corresponding to the sample position mark 350 is displayed on the sample image display section 37. Then, the processing returns to the monitoring loop.

In a case where an image is displayed on the sample image display section 37 as illustrated in FIGS. 15 and 17, the user may perform an operation to designate an image. In step S216, the CPU 51 monitors an operation of image designation.

Upon detecting an operation to designate a certain image, the CPU 51 proceeds from step S216 to step S272, and performs control to magnify and display the designated image as illustrated in FIG. 16.

During the image magnification display, the CPU 51 monitors an operation of the end button 45, and upon detecting the operation of the end button 45, the process returns from step S273 to the monitoring loop.

In step S217, the CPU 51 monitors an area selection operation for the grid 355. For example, it is an operation of clicking an area as described in FIGS. 25 and 26 or an operation of designating a range as described in FIG. 28. Alternatively, some other selection operation may be used.

Upon detecting the operation of selecting the area, the CPU 51 proceeds from step S217 to step S280, and causes a display for presenting the selected state as selection response display to be executed. For example, the frame of the area is displayed by a thick line as illustrated in FIG. 25.

In step S281, the CPU 51 temporarily sets the designated area as a replant candidate area.

In step S282, the CPU 51 calculates a replant-related value. For example, calculation of numerical values to be displayed on the selected area display section 73, the average population display section 74, and the average stand rate display section, calculation of cost values to be displayed on the replant cost display section 76 according to input of the planning cost display section 72, and the like are performed.

Furthermore, window display, calculation, and the like corresponding to the calculation button 71 are also performed.

In step S283, the CPU 51 performs display control of these calculation results. Then, the processing returns to the monitoring loop.

In step S218 of FIG. 32, the CPU 51 monitors an operation of the ROI generation button 32. Upon detecting the operation of the ROI generation button 32, the CPU 51 proceeds from step S218 to step S290, and generates an instruction file including instruction data of the replant area.

This is processing of determining one or a plurality of areas set as the replant candidate areas at that time as areas for which the replanting is performed, and generating an instruction file for the tractor 270 to execute the replanting.

In step S291, the CPU 51 performs a process of storing the generated instruction file. Then, the processing returns to the monitoring loop.

In step S219, the CPU 51 monitors an export operation. Upon detecting a predetermined export operation, the CPU 51 proceeds from step S219 to step S292, and performs the output processing of the instruction file. For example, the output processing is output processing for transferring to the tractor 270. Then, the processing returns to the monitoring loop.

By performing the above processing, information provision to the user by display of the UI image described above is executed, and the instruction file for the replanting according to an operation by the user is generated.

Note that the above processing example is an example, and other processing examples are also conceivable. Further, for convenience of description, not all the processes for the UI screen and the operation detection are illustrated, and other processes are actually performed.

7. User Interface Processing of Second Embodiment

As a second embodiment, an example will be described in which recommendation of an area for which the replanting is performed in the grid 355 is performed.

Figure 36:
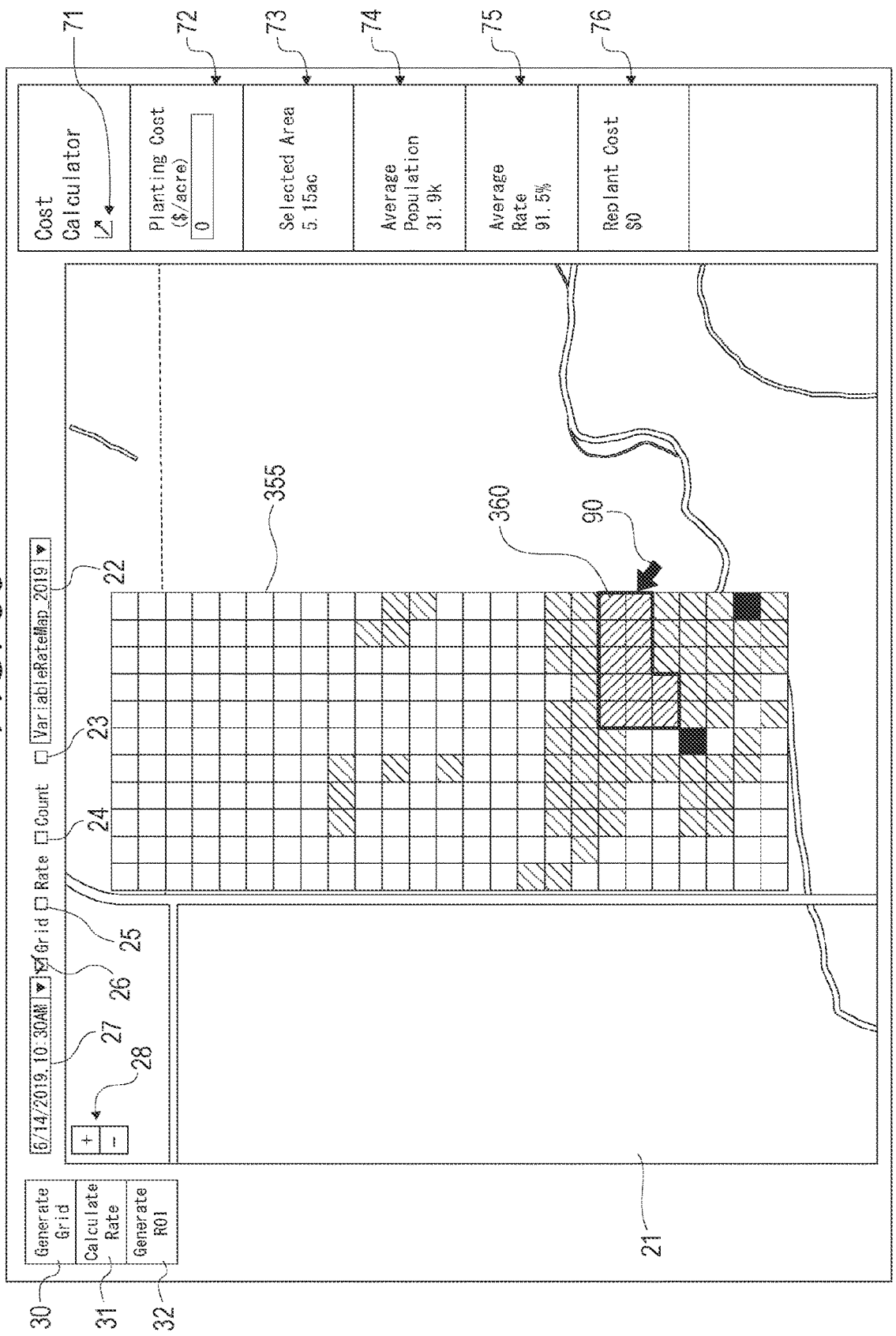
FIG. 36 is an explanatory diagram of presentation of a replant candidate area on a grid according to a second embodiment.

For example, when the grid 355 is displayed, the recommended area 360 of the replanting is presented as illustrated in FIG. 36.

For example, the CPU 51 determines an area in which the stand rate is low, an area in which the stand rate is low and at a certain degree of concentration, or the like, and displays the recommended area 360 as an area where replanting is recommended to the user when displaying the grid 355.

Figure 37:
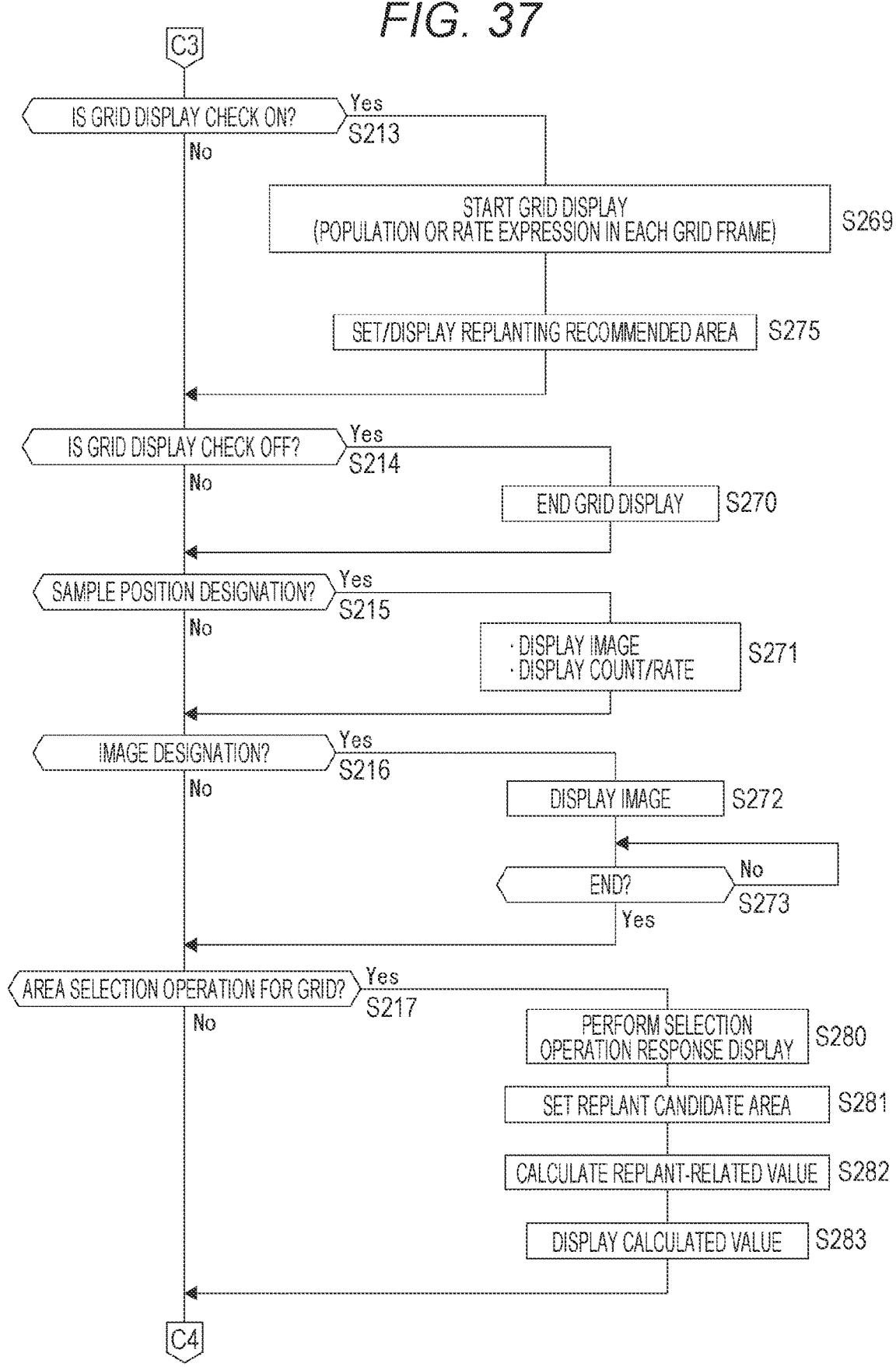
FIG. 37 is a flowchart of user interface processing according to the second embodiment.

In this case, the CPU 51 performs the processing of FIG. 37 instead of FIG. 31 described above, for example. That is, processing of step S275 is performed after processing of step S269.

In the processing of step S275, the CPU 51 sets a replanting recommended area, and performs control to display the recommended area as the recommended area 360 on the grid 355.

For example, an area where the stand rate is equal to or less than a predetermined value is set as an area where the replanting is recommended. Alternatively, in a case where a predetermined number or more of areas having a stand rate equal to or lower than a predetermined value are adjacent to each other, these areas are set as areas for which replanting is recommended.

Note that the setting of the recommended area may be executed, for example, when the grid setting processing of FIG. 34 is performed.

By presenting the recommended area 360, the user can check an area for which the replanting should be performed when displaying the grid 355, and thus replant determination becomes easy.

8. Summary and Modification Example

In the above embodiments, the following effects can be obtained.

The information processing device 1 according to the embodiment includes a calculation unit 5 that calculates a rate (for example, a stand rate) related to growth of a crop from image data obtained by capturing an image of the farm field 300, and a UI control unit 6 that performs control to display a sample position mark 350 arranged according to an image capturing position of each piece of the image data in a map region 21 of a UI screen in an image mode (for example, a color determined according to a rate) determined according to a rate calculated from each piece of the image data.

For example, in a case where the rate display check box 25 is checked and rate display is performed as illustrated in FIGS. 10 and 13, sample position images representing sample positions are displayed on the map region 21, and the respective sample position images are displayed in different colors depending on the stand rate calculated for the area including the image capturing range.

Thus, the user (for example, a staff member of the farm) can clearly and easily know the state of germination and growth near each sample position in a farm field 300. This is extremely useful information for determination of replanting.

Note that in the above example, the sample position image is a circular sample position mark 350, and the color is different depending on the stand rate, but the mark shape may be different such as square, triangle, or circle depending on the stand rate. Furthermore, even with the same mark shape, the luminance may be different depending on the stand rate. Of course, an image mode in which the color, the luminance, and the shape are different in a complicated manner according to the stand rate may be employed.

In the above example, the sample position images are displayed in three stages according to the stand rate, but the respective sample position images may be displayed in two stages or four or more stages in different image modes.

Although the example of the stand rate has been described as a rate related to the growth of the crop, the example of the rate is not limited thereto. For example, various rate calculations according to the type of crops, the growth environment, the planting environment, and the like, such as a flowering rate, a growth rate, and a positive leaf rate (the ratio of the area of leaves in the sun), and display modes expressing the various rate calculations are considered.

Note that the farm field 300 may be not only croplands of outdoor farm lands but also sites such as hydroponic cultivation and house cultivation, and the technology according to the embodiment can be used for presenting information regarding crops grown in various places.

Furthermore, in addition to the crop, the technology according to the embodiment can also be used for, for example, presentation of sensing results regarding growth of trees of fruits, weeds, and the like. Therefore, the technology can also be applied to remote sensing for forests, vacant lands, and the like.

An example of the sensing data is captured image data by the imaging device 220, but is of course not limited thereto, and detection data of various sensors such as detection data by a thermo-sensor and detection data by an ultrasonic sensor is assumed.

Furthermore, the technology according to the embodiment can be applied not only to plants but also to sensing of soil quality or the like of the farm field 300 or the like.

In the embodiment, the example has been given in which the stand rate is a ratio between a number of crops per unit area obtained from the image data and a number of planting instructions per unit area with respect to the image capturing region of the image data.

In a case where there is information regarding the number of planting instructions per acre for each place in the farm field 300 as the instruction rate map 351, the rate of the number of stands per unit area with respect to the number of planting instructions per unit area can be obtained as a rate regarding the growth of the crop.

By using this as a stand rate, the germination or growth rate with respect to the initial aim of the farm staff at each place of the farm field 300 can be checked on the UI screen.

In the embodiment, the example has been given in which the stand rate is a ratio between the number of crops per unit area obtained from image data and the actual result number of plantings per unit area with respect to an image capturing region of the image data.

In a case where information of the actual result number of plantings per acre for each place in the farm field 300 is present as an actual result rate map, the rate of the number of stands per unit area with respect to the actual result number of plantings per unit area can be obtained as the rate regarding the growth of the crop.

By using this as a stand rate, the germination or growth rate with respect to the actual result number of plantings in each place of the farm field 300 can be checked on the UI screen.

In the embodiment, an example has been described in which it is possible to select whether the stand rate is a ratio between the number of crops per unit area obtained from the image data and a number of planting instructions per unit area of the image data with respect to the image capturing region, or a ratio between the number of crops per unit area obtained from the image data and an actual result number of plantings per unit area with respect to the image capturing region of the image data.

That is, it is possible to select whether a reference value for the rate is the number of planting instructions according to the instruction rate map 351 or the actual result number of plantings according to the actual result rate map 352.

The user can select the instruction rate map 351 and the actual result rate map 352 and display them in the map region 21 (see FIGS. 7 and 8) or use them as a reference for rate calculation. That is, the reference for the rate to be calculated can be selected according to the purpose of the user.

In the embodiment, an example has been described in which the UI control unit 6 performs control to display, in the map region 21, a rate map image that presents differences in value used for calculating the stand rate in the farm field 300 together with the sample position mark 350.

For example, as illustrated in FIGS. 12 and 13, by displaying the sample position mark 350 together with the instruction rate map 351 or the actual result rate map 352, the user can check the population status and the stand rate status by the sample position mark 350 while recognizing each region indicated by the rate map. Therefore, information that makes it easy to grasp the growth situation in each place of the farm field 300 is presented.

In the embodiment, an example has been described in which the UI control unit 6 performs control to display the grid 355 as the area definition image that defines areas obtained by dividing the farm field 300 in the map region 21.

For example, as illustrated in FIGS. 18, 20, and 21, a grid 355 having a lattice pattern shape is displayed as the area definition image. Consequently, each area obtained by dividing the farm field 300 is presented to the user as a range (grid square) partitioned by the grid.

Note that in the above example, the area definition image is a grid pattern image (grid-like image), and a square area is defined as a square of a grid, but the area definition image may be an image in which an area is defined as a polygon having a triangle, a rectangle, a pentagon or more, or a curved shape.

In the embodiment, an example has been described in which the UI control unit 6 performs control to display each area indicated by the grid 355 in an image mode determined according to the rate calculated for the area.

For example, as illustrated in FIGS. 18, 20, 21, and the like, each square (that is, each area) of the grid 355 is displayed in a color corresponding to the rate calculated for the area. Consequently, the user can clearly and easily know the state of germination or the like of each area. This is extremely useful information when considering a position for which the replanting is performed. That is, the user can conceive a concept of the replanting using the grid 355.

Note that as an image mode of the grid 355, each area indicated by a square has a different color depending on the rate, but the image mode is not limited to the image mode in which the rate is presented depending on the color. For example, it is also conceivable to make brightness of the square or a contour line different or make a type or color of the contour line of the square different.

In the above example, the color of the square is displayed in three stages according to the rate, but each area may be displayed in different image modes in two stages or four or more stages.

In the embodiment, an example has been described in which the calculation unit 5 calculates a rate of the each area indicated by the grid 355 by interpolation calculation using a rate related to growth of a crop for image data related to the area (see FIG. 34).

When the grid 355 as the area definition image is displayed by color coding according to the stand rate, for example, the growth situation of each area can be recognized at a glance, and the stand rate can be obtained using a rate for related samples (sensing data such as image data). Consequently, even if the image capturing region of each sample and the area set to be divided by the grid 355 do not completely match, accurate rate representation can be performed for each area indicated by the grid 355.

Furthermore, according to this, the image data as each sample may be image data obtained by discretely capturing an image of an inside of the farm field 300. That is, since it is not necessary to perform image capturing throughout the farm field 300 and discrete image capturing is sufficient, it is possible to achieve reduction in processing load at the time of flight, reduction in data amount by reducing the number of image data (samples), and improvement in efficiency of processing in these reductions.

In the embodiment, an example has been described in which sensing data related to one area as a calculation target, which refers to the stand rate in the interpolation calculation, is image data obtained by capturing an image within a predetermined distance from a center point of the one area (see FIG. 35A).

The stand rate of each area indicated by the square of the grid 355 is calculated by performing an interpolation calculation from the stand rates of all the sample position images within the predetermined distance dl from the center point of the area, and thereby an accurate stand rate can be calculated.

In the embodiment, an example has been described in which sensing data related to one area as the calculation target, which refers to the stand rate in the interpolation calculation, is a predetermined number of pieces of image data in an order in which the image capturing region is closer to a center point of the one area (see FIG. 35B).

The stand rate of each area indicated by the square of the grid 355 can be calculated with high accuracy by calculating by performing an interpolation calculation from the stand rates of a predetermined number of samples in the order from the center point of the area. Furthermore, in this case, a predetermined number of samples to be used for calculation can always be secured.

In the embodiment, the example has been described in which the calculation unit 5 performs the interpolation calculation by weighting a rate for sensing data (image data) obtained by capturing an image of a region having the same number of planting instructions or actual result number of plantings as the same one area among the sensing data (image data) related to the one area as the calculation target (see FIG. 35C).

Since conditions of image data obtained by capturing an image of a region in which the number of planting instructions or the actual result number of plantings is the same are approximate to those of the area for calculating the rate, it is expected that the rate for the image data is close to the rate of this area. Therefore, by performing weighting, the rate calculation of the area can be made more accurate.

In the embodiment, an example has been described in which the UI control unit 6 performs the interface control for performing a setting operation of the grid 355.

For example, the setting dialog 33 of FIG. 19 is presented so that the user can designate the size of one side of the square of the grid 355 that is the area definition image. Thus, it is possible to set an area according to the convenience of the user, and it is possible to display the grid 355 suitable for the replant planning.

In the embodiment, an example has been described in which the UI control unit 6 performs interface control to perform an operation of designating a replant candidate area for each area defined by the grid 355.

For example, as described with reference to FIGS. 23 to 26, by designating the square of the grid 355 or designating the range, the replant candidate area candidates can be set.

The user can select the replant position while checking rate presentation by color or the like for each area, and an interface suitable for the replant concept can be achieved.

In the embodiment, an example has been described in which the UI control unit 6 performs interface control to perform an operation of designating a replant candidate area for each area defined by the grid 355, and performs control to present cost information regarding replanting in response to an operation of designating the replant candidate area.

For example, as described with reference to FIGS. 23 to 26, cost display is performed when considering a replant candidate area. Thus, the user can consider the range and execution or non-execution of the replanting while referring to the cost. The information processing device 1 can provide the user with extremely useful information when considering replanting.

In the embodiment, an example has been described in which the UI control unit 6 performs interface control to enable individual designation of each area defined by the grid 355 as a replant candidate area.

For example, as described with reference to FIGS. 23 and 24, by designating the square of the grid 355, it is possible to select an area for which the replanting is performed, which is suitable for work considering a range for which the replanting is performed.

In the embodiment, an example has been described in which the UI control unit 6 performs interface control to enable designation of a plurality of areas as replant candidate areas by a range designation operation on the image of the grid 355.

For example, by performing range designation as described with reference to FIG. 26, a plurality of areas for which the replanting is performed can be easily designated.

The information processing device 1 according to the embodiment includes a file generation unit 9 that generates a replant instruction file in response to determination of a replant execution area in the grid 355 (see step S290 in FIG. 32).

Thus, file data including the ROI to be transferred to the tractor 270 is generated. That is, a control file for executing a planned replant using the grid 355 on the UI screen is automatically generated.

Note that, although the file output in step S292 in FIG. 32 is output to the tractor 270, it is also conceivable to generate an instruction file for reflight of the flying object 200 and transfer the instruction file to the flying object 200 as control data.

For example, the present technology can also be applied to a case where an area that has been determined as a replant candidate area is imaged again to check the situation.

In the second embodiment, an example has been described in which the UI control unit 6 performs control to present a determination result as to whether or not to perform the replanting for each area indicated by the grid 355. That is, an example in which the recommended area 360 of replanting is displayed has been described.

For example, as described with reference to FIGS. 36 and 37, a display that clearly indicates an area for which replanting is recommended is performed. This serves as a guide for the user to determine execution of replanting and to select an area, and also makes it easy for the user to determine execution of the replanting and to select an area.

In the embodiment, an example has been described in which the imaging device 220 is mounted on the flying object 200 capable of being wirelessly operated or operating autonomously.

Examples of the flying object 200 capable of being wirelessly operated or operating autonomously include what are called drones, small wireless-piloted fixed-wing airplanes, and small wireless-piloted helicopters.

A program according to the embodiment is a program causing an information processing device 1 to execute a process of calculating a rate (stand rate or the like) related to growth of a crop from image data obtained by capturing an image of the farm field 300, and a control process of displaying a sample position mark 350 arranged according to an image capturing position of each piece of the image data in a map region 21 of a UI screen in an image mode determined according to a rate calculated from each piece of the image data.

That is, the program causes the information processing device to execute processes described with reference to FIGS. 27 to 34 and 36.

Such a program facilitates implementation of the information processing device 1 according to the present embodiment.

Then, such a program can be stored in advance in a recording medium built in a device such as a computer device, a ROM in a microcomputer having a CPU, or the like. Alternatively, the program can be temporarily or permanently stored in a removable recording medium such as a semiconductor memory, a memory card, an optical disk, a magneto-optical disk, or a magnetic disk. Such a removable recording medium can also be provided as what is called package software.

Furthermore, such a program can be installed from the removable recording medium into a personal computer or the like, or can be downloaded from a download site via a network such as a LAN or the Internet.

Note that effects described in the present description are merely examples and are not limited, and other effects may be provided.

Note that the present technology can employ configurations as follows.

(1)

An information processing device including:

a calculation unit that calculates a rate related to growth of a plant from sensing data; and a user interface control unit that performs control to display a sample position image arranged according to a sensing position of each piece of the sensing data in a map region of a user interface screen in an image mode determined according to a rate calculated from each piece of the sensing data.

(2)

The information processing device according to (1) above, in which the sensing data is image data obtained by capturing an image of a farm field, and the rate is a ratio between a number of crops per unit area obtained from the image data and a number of planting instructions per unit area with respect to an image capturing region of the image data.

(3)

The information processing device according to (1) above, in which the sensing data is image data obtained by capturing an image of a farm field, and the rate is a ratio between a number of crops per unit area obtained from the image data and an actual result number of plantings per unit area with respect to an image capturing region of the image data.

(4)

The information processing device according to (1) above, in which the sensing data is image data obtained by capturing an image of a farm field, and whether the rate is a ratio between a number of crops per unit area obtained from the image data and a number of planting instructions per unit area with respect to an image capturing region of the image data or a ratio between a number of crops per unit area obtained from the image data and an actual result number of plantings per unit area with respect to an image capturing region of the image data is selectable.

(5)
The information processing device according to any one of (1) to (4) above, in which
the user interface control unit
performs control to display, in the map region, a rate map image that presents differences in values used for calculating the rate in a farm field together with the sample position image.

(6)
The information processing device according to any one of (1) to (5) above, in which
the user interface control unit
performs control to display an area definition image that defines areas obtained by dividing a farm field in the map region.

(7)
The information processing device according to (6) above, in which
the user interface control unit
performs control to display each area indicated by the area definition image in an image mode determined according to a rate calculated for the area.

(8)
The information processing device according to (7) above, in which
the calculation unit
calculates a rate of the each area indicated by the area definition image by interpolation calculation using a rate related to growth of a crop for sensing data related to the area.

(9)
The information processing device according to (8) above, in which
sensing data related to one area that refers to the rate related to growth of the crop in the interpolation calculation is sensing data obtained by sensing within a predetermined distance from a center point of the one area.

(10)
The information processing device according to (8) above, in which
sensing data related to one area that refers to the rate related to growth of the crop in the interpolation calculation is a predetermined number of pieces of sensing data in an order in which an image capturing region is closer to a center point of the one area.

(11)
The information processing device according to any one of (8) to (10) above, in which
the calculation unit performs the interpolation calculation by weighting a rate for sensing data obtained by sensing a region having a same number of planting instructions or actual result number of plantings as one area among the sensing data related to the one area.

(12)
The information processing device according to any one of (6) to (11) above, in which
the user interface control unit
performs interface control for performing a setting operation of the area definition image.

(13)
The information processing device according to any one of (6) to (12) above, in which
the user interface control unit
performs interface control to perform an operation of designating a replant candidate area for each area defined by the area definition image.

(14)
The information processing device according to (13) above, in which
the user interface control unit
performs interface control to perform an operation of designating a replant candidate area for each area defined by the area definition image, and performs control to present cost information regarding replanting in response to an operation of designating the replant candidate area.

(15)
The information processing device according to (13) or (14) above, in which
the user interface control unit
performs interface control to enable individual designation of each area defined by the area definition image as a replant candidate area.

(16)
The information processing device according to any one of (13) to (15) above, in which
the user interface control unit
performs interface control to enable designation of a plurality of areas as replant candidate areas by a range designation operation on the area definition image.

(17)
The information processing device according to any one of (6) to (16) above, further including
a file generation unit that generates a replant instruction file in response to determination of a replant execution area in the area definition image.

(18)
The information processing device according to any one of (6) to (17) above, in which
the user interface control unit
performs control to present a determination result as to whether or not to perform replanting for each area indicated by the area definition image.

(19)
An information processing method including:
calculating a rate related to growth of a plant from sensing data; and
performing control to display a sample position image arranged according to a sensing position of each piece of the sensing data in a map region of a user interface screen in an image mode determined according to a rate calculated from each piece of the sensing data.

(20)
A program causing an information processing device to execute:
a process of calculating a rate related to growth of a plant from sensing data; and
a control process of displaying a sample position image arranged according to a sensing position of each piece of the sensing data in a map region of a user interface screen in an image mode determined according to a rate calculated from each piece of the sensing data.

REFERENCE SIGNS LIST

1 Information processing device
2 Image acquisition unit
5 Calculation unit
6 UI control unit
7 Recording control unit
8 Communication control unit
9 File generation unit
21 Map region 22 Map selection section
23 Map display check box
24 Count display check box
25 Rate display check box
26 Grid display check box
27 Date and time selection section
28 Magnification and reduction button
30 Grid generation button
31 Rate calculation button
32 ROI generation button
35 Population display section
36 Stand rate display section
37 Sample image display section
51 CPU
71 Calculation button
72 Planning cost display section
73 Selected area display section
74 Average population display section
75 Average stand rate display section
76 Replant cost display section
200 Flying object
220 Imaging device
270 Tractor
300 Farm field
350 Sample position mark
351 Instruction rate map
352 Actual result rate map
355 Grid
360 Recommended area

The invention claimed is:

1. An information processing device, comprising:
a central processing unit (CPU) configured to:
 calculate, based on image data, a rate related to growth of a plant, wherein the image data includes a plurality of images; and
 control a user interface to display an arrangement of each of a plurality of sample position marks in a map region in an image mode, wherein
  the arrangement of the plurality of sample position marks on the map region is based on an image capturing position of each of the plurality of images at a time of execution of an image capturing operation of a respective image of the plurality of images, and
  the image mode is based on the rate.

2. The information processing device according to claim 1, wherein
the image data is based on capture of the plurality of images of a farm field,
the CPU is further configured to obtain a number of crops per unit area based on the image data, and
the rate is a ratio between the number of crops per unit area and a number of planting instructions per unit area with respect to an image capturing region of the image data.

3. The information processing device according to claim 1, wherein
the image data is based on capture of the plurality of images of a farm field,
the CPU is further configured to obtain a number of crops per unit area based on the image data, and
the rate is a ratio between the number of crops per unit area and an actual result number of plantings per unit area with respect to an image capturing region of the image data.

4. The information processing device according to claim 1, wherein
the image data is based on capture of the plurality of images of a farm field,
the CPU is further configured to obtain a number of crops per unit area based on the image data, and
the rate is based on one of a first ratio between the number of crops per unit area and a number of planting instructions per unit area with respect to an image capturing region of the image data or a second ratio between the number of crops per unit area obtained from the image data and an actual result number of plantings per unit area with respect to the image capturing region of the image data.

5. The information processing device according to claim 1, wherein
the CPU is further configured to control the user interface to display, in the map region, a rate map image that presents differences in values utilized for the calculation of the rate in a farm field together with the plurality of sample position marks.

6. The information processing device according to claim 1, wherein
the CPU is further configured to control the user interface to display an area definition image, and
the area definition image defines a plurality of areas based on division of a farm field in the map region.

7. The information processing device according to claim 6, wherein
the CPU is further configured to:
calculate a stand rate for a specific area of the plurality of areas of the area definition image, and
control the user interface to display each of the plurality of areas of the area definition image in the image mode, wherein the image mode is based on the stand rate calculated for the specific area.

8. The information processing device according to claim 7, wherein
the CPU is further configured to calculate a stand rate of the each of the plurality of areas of the area definition image based on interpolation calculation that utilizes the stand rate related to growth of a crop for the image data associated with the specific area.

9. The information processing device according to claim 8, wherein
the image data associated with the specific area is based on capture of an image within a specific distance from a center point of the specific area.

10. The information processing device according to claim 8, wherein
the image data associated with the specific area is a specific number of pieces of image data in an order in which an image capturing region is closer to a center point of the specific area.

11. The information processing device according to claim 8, wherein
the CPU is further configured to execute the interpolation calculation based on a weighting operation of a rate for the image data associated with a region that has a same number of planting instructions or actual result number of plantings as one area among the image data related to the specific area.

12. The information processing device according to claim 6, wherein
the CPU is further configured to control the user interface to present a setting operation of the area definition image.

13. The information processing device according to claim 6, wherein the CPU is further configured to control the user interface to execute an operation that designates a replant candidate area for each of the plurality of areas defined by the area definition image.

14. The information processing device according to claim 13, wherein the CPU is further configured to:
control the user interface to execute an operation that designates a replant candidate area for each of the plurality of areas defined by the area definition image, and
control the user interface to present cost information associated with replantation based on the operation that designates the replant candidate area.

15. The information processing device according to claim 13, wherein
the CPU is further configured to control the user interface to enable individual designation of each of the plurality of areas defined by the area definition image as a replant candidate area.

16. The information processing device according to claim 13, wherein
the CPU is further configured to control to enable designation of the plurality of areas as replant candidate areas by a range designation operation on the area definition image.

17. The information processing device according to claim 6, wherein the CPU is further configured to generate a replant instruction file based on determination of a replant execution area in the area definition image.

18. The information processing device according to claim 6, wherein
the CPU is further configured to control the user interface to present a determination result as to whether to execute a replanting process for each of the plurality of areas indicated by the area definition image.

19. An information processing method, comprising:
in an information processing device that includes a central processing unit (CPU):
calculating, by the CPU, a rate related to growth of a plant based on image data, wherein the image data includes a plurality of images; and
controlling, by the CPU, a user interface to display an arrangement of each of a plurality of sample position marks in a map region in an image mode, wherein
the arrangement of the plurality of sample position marks on the map region is based on an image capturing position of each of the plurality of images at a time of execution of an image capturing operation of a respective image of the plurality of images, and
the image mode is based on the rate.

20. A non-transitory computer-readable medium having stored thereon, computer-executable instructions, which when executed a processor, cause the processor to execute operations, the operations comprising:
calculating, based on image data, a rate related to growth of a plant, wherein the image data includes a plurality of images; and
controlling a user interface for displaying an arrangement of each of a plurality of sample position marks in a map region in an image mode, wherein
the arrangement of the plurality of sample position marks on the map region is based on an image capturing position of each of the plurality of images at a time of execution of an image capturing operation of a respective image of the plurality of images, and
the image mode is based on the rate.

* * * * *